US012771654B2

(12) United States Patent
Xin et al.

(10) Patent No.: US 12,771,654 B2
(45) Date of Patent: Oct. 20, 2026

(54) POLICY DETERMINING METHOD AND APPARATUS, AND SYSTEM

(71) Applicant: Huawei Technologies Co., Ltd., Shenzhen (CN)

(72) Inventors: Yang Xin, Shanghai (CN); Xiaobo Wu, Shenzhen (CN); Yali Yan, Shanghai (CN); Weiwei Chong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 795 days.

(21) Appl. No.: 17/957,785

(22) Filed: Sep. 30, 2022

(65) Prior Publication Data

US 2023/0040486 A1 Feb. 9, 2023

Related U.S. Application Data

(63) Continuation of application No. PCT/CN2021/086727, filed on Apr. 12, 2021.

(30) Foreign Application Priority Data

Apr. 10, 2020 (CN) ......................... 202010281629.3

(51) Int. Cl.
*H04L 47/70* (2022.01)
*H04W 28/02* (2009.01)

(52) U.S. Cl.
CPC ....... *H04L 47/822* (2013.01); *H04W 28/0289* (2013.01)

(58) Field of Classification Search
CPC ......................... H04L 47/822; H04W 28/0289
See application file for complete search history.

(56) References Cited

U.S. PATENT DOCUMENTS 10,211,995 B2 2/2019 Wang et al.
2016/0205622 A1* 7/2016 Ronneke ........... H04W 52/0203 370/311

(Continued)

FOREIGN PATENT DOCUMENTS

CA 3100862 A1 11/2019
CN 109756423 A 5/2019

(Continued)

OTHER PUBLICATIONS

3GPP TS 23.503 V16.4.1 (Apr. 2020), 3rd Generation Partnership Project; Technical Specification Group Services and System Aspects; Policy and charging control framework for the5G System (5GS); Stage 2 (Release 16) (Year: 2020).*

(Continued)

*Primary Examiner* — Siming Liu
(74) *Attorney, Agent, or Firm* — Slater Matsil, LLP

(57) ABSTRACT

Embodiments of this application provide a policy determining method and apparatus, and a system, and relate to the field of communication technologies, to formulate a first policy for a subarea more accurately. The solution includes: A first network element sends, to a data analytics network element, a first request for requesting network performance information. The first request includes information about a first area and information about a first time period. The first network element receives first network performance information in a second area from the data analytics network element. The first network element determines a first policy based on the first network performance information. In this solution, a subarea may be used as a granularity, and the first policy may be accurately determined based on first network performance information in the subarea.

20 Claims, 17 Drawing Sheets

(56) References Cited

U.S. PATENT DOCUMENTS

| | | | |
|---|---|---|---|
| 2017/0214536 | A1 | 7/2017 | Wang et al. |
| 2019/0053104 | A1 | 2/2019 | Qiao et al. |
| 2021/0076261 | A1 | 3/2021 | Xin et al. |

FOREIGN PATENT DOCUMENTS

| | | | |
|---|---|---|---|
| CN | 110519795 | A | 11/2019 |
| CN | 110650034 | | 1/2020 |
| CN | 110830542 | | 2/2020 |
| WO | 2015184609 | | 12/2015 |
| WO | 2016054777 | A1 | 4/2016 |
| WO | 2018161850 | A1 | 9/2018 |

OTHER PUBLICATIONS

3rd Generation Partnership Project; Technical Specification Group Services and System Aspects; Architecture enhancements for 5G System (5GS) to support network data analytics services (Release 16), 3GPP TS 23.288 16.3.0, Mar. 2020, 62 pages. (Year: 2020).*

"3rd Generation Partnership Project; Technical Specification Group Services and System Aspects; Architecture enhancements for 5G System (5GS) to support network data analytics services (Release 16)," 3GPP TS 23.288 V16.3.0, Mar. 2020, 62 pages.

"3rd Generation Partnership Project; Technical Specification Group Services and System Aspects; Procedures for the 5G System (5GS); Stage 2 (Release 16)," 3GPP TS 23.502 V16.4.0, Mar. 2020, 582 pages.

"3rd Generation Partnership Project; Technical Specification Group Services and System Aspects; Policy and charging control framework for the 5G System (5GS); Stage 2 (Release 16)," 3GPP TS 23.503 V16.4.1, Apr. 2020, 115 pages.

"Solution Update and Merging: Solution 18," Source: KDDI, Toyota ITC, Huawei, HiSilicon, Document for: Approval, Agenda Item: 6.11, Work Item / Release: FS_eNA/Rel-16, SA WG2 Temporary Document, 3GPP TSG SA WG2 Meeting #129BIS, S2-1811694, (revision of S2-18xxxx), Nov. 26-30, 2018, 5 pages.

"Adding Support for Delivering Background Data Transfer Polices to the UE," Source to WG: Convida Wireless LLC, KDDI, Samsung, Ericsson, Toyota Motor Corporation, ZTE, Source to TSG: SA2, Work item code: xBDT, Date: May 16, 2019, Category: B, Release: Rel-16, 3GPP TSG-SA2 Meeting #133, S2-1905893, (Revision of S2-1905882, 05368, 04376, 03389 and 4337), May 13-17, 2019, 12 pages.

"BDT renegotiation upon expected network performance change," Source to WG: Ericsson, Source to TSG: SA2, Work item code: eNA, Date: Oct. 11, 2019, Category: F, Release: Rel-16, Change Request, 3GPP TSG SA2 Meeting #136, 82-1912646, Reno, NV, USA, Nov. 18-22, 2019, 6 pages.

"Clarification of the BDT policy re-negotiation procedure," Source to WG: Huawei, HiSilicon, Ericsson Source to TSG: SA2, Work item code: eNA, Date: Feb. 28, 2020, Category: F, Release: Rel-16, SA WG2 Meeting #137E, S2-2002458 revision of S2-2000419, 1928), Electronic meeting, Feb. 24-27, 2020, 7 pages.

3GPP TS 23.503 V16.1.0 (Jun. 2019), 3rd Generation Partnership Project; Technical Specification Group Services and System Aspects; Policy and Charging Control Framework for the 5G System; Stage 2 (Release 16), 99 pages.

* cited by examiner

FIG. 4
TA list requested by an AF network element, where there is an actual requirement for 10000 terminals
TA1 (00:00–01:00)
Actual requirement: 1500 terminals
Recommended capacity: 1000 terminals
TA2 (03:00–05:00)
Actual requirement: 3500 terminals
Recommended capacity: 3000 terminals
TA3 (02:00–03:00)
Actual requirement: 5000 terminals
Recommended capacity: 6000 terminals

POLICY DETERMINING METHOD AND APPARATUS, AND SYSTEM

CROSS-REFERENCE TO RELATED APPLICATIONS

This is a continuation of International Patent Application No. PCT/CN2021/086727, filed on Apr. 12, 2021, which claims priority to Chinese Patent Application No. 202010281629.3, filed on Apr. 10, 2020. The disclosures of the aforementioned applications are hereby incorporated by reference in their entireties.

TECHNICAL FIELD

Embodiments of this application relate to the field of communication technologies, and in particular, to a policy determining method and apparatus, and a system.

BACKGROUND

In the big data era, massive data is generated on a terminal side, and such data needs to be uploaded to a cloud server sometimes. Although this type of data has no requirement on timeliness, it is very sensitive to a tariff. Therefore, the cloud server may need to negotiate with an operator network to transmit this type of data in network idle time. This can avoid a waste of network resources and reduce traffic fees caused by transmitting this type of data. Usually, traffic generated during transmission of this type of data is referred to as background data. For example, for automobile enterprises, map information can be uploaded to the cloud server through the operator network to formulate high-definition maps.

Before background data is transmitted, a third-party application function (AF) network element requests a background data transfer policy from an operator network, and then a policy control function (PCF) network element in the operator network formulates, based on requirement information from the AF network element, a background data transfer policy for an area requested by the AF network element. Subsequently, the AF network element may send, to a terminal in the requested area, the background data transfer policy provided by the PCF network element, so that the terminal transmits the background data according to the background data transfer policy provided by the PCF network element.

Although the PCF network element may formulate the background data transfer policy based on the area requested by the AF network element, because terminals are unevenly distributed in some different areas and some time periods in the area and a time period that are requested by the AF network element, if all terminals in the requested area transmit the background data according to the background data transfer policy formulated by the PCF network element for the requested area and time period, network resources in some areas in the area requested by the AF network element may be congested in some time periods or network resources in some areas may be wasted in some time periods.

SUMMARY

Embodiments of this application provide a policy determining method and apparatus, and a system, to accurately formulate respective first policies for different areas based on respective network performance information in the different areas.

To achieve the foregoing objective, the following technical solutions are used in this application.

According to a first aspect, an embodiment of this application provides a policy determining method, including: sending, by a first network element to a data analytics network element, a first request for requesting network performance information, where the first request includes information about a first area and information about a first time period; receiving, by the first network element, first network performance information in a second area from the data analytics network element, where the first network performance information includes one or both of first information in the second area in a second time period and a quantity of terminals in the second area in the second time period, the second time period is a sub-period of the first time period, the second area is a subarea of the first area, and there are one or more second areas; and determining, by the first network element, a first policy based on the first network performance information.

This embodiment of this application provides the policy determining method. In the method, the first network element requests the network performance information in the first area in the first time period from the data analytics network element by using the first request. Then, the data analytics network element feeds back the first network performance information in each of the one or more second areas included in the first area to the first network element based on the first request, where the first network performance information includes first information in the second area in the second time period or the quantity of terminals in the second area in the second time period. In this way, the first network element determines the first policy based on the first network performance information. In this solution, the first network element requests network performance information in a large range (for example, the first area or the first time period) from the data analytics network element. However, the data analytics network element provides the first network element with first network performance information in different areas (for example, one or more second areas) included in the first area or different second time periods (for example, one or more second time periods) included in the first time period. This can help the first network element formulate, by using a subarea as a granularity, the first policy more accurately based on first network performance information in the subarea, and ensure that a background data transfer policy formulated for the subarea in a sub-period meets a requirement of the subarea in the sub-period, thereby resolving a problem of network resource congestion or network resource waste in some areas in some time periods, saving resources, and improving transmission efficiency.

In a possible implementation, the first information includes one or more of the following information of a network in the second area in the second time period: a session creation success rate, a terminal handover success rate, a terminal registration success rate, resource usage of a base station or a core network element, a usage ratio of the base station or the core network element, and load of the base station or the core network element. In this embodiment of this application, the first information may alternatively be load information, for describing load of the network in the second area in the second time period.

In a possible implementation, the first policy is a first policy for a third area, the third area includes one or more second areas, there are one or more third areas, and the first policy for the third area includes one or more background data transfer policies.

In a possible implementation, when the third area includes one second area, the third area is the second area.

In a possible implementation, when the third area includes a plurality of second areas, the plurality of second areas included in the third area have same first network performance information.

In a possible implementation, the method provided in this embodiment of this application further includes: determining, by the first network element, a first target background data transfer policy for the third area, where the first target background data transfer policy is one of the one or more background data transfer policies; and sending, by the first network element, the first target background data transfer policy and one or both of an identifier of the first target background data transfer policy and information about the third area to a network storage network element. In this embodiment of this application, the first target background data transfer policy and one or both of the identifier of the first target background data transfer policy and the information about the third area are stored in the network storage network element. In this way, after network performance in the third area changes subsequently, the first network element only needs to obtain the first target background data transfer policy for the third area from the network storage network element, and does not need to obtain all background data transfer (BDT) policies, thereby reducing subsequent interaction pressure between the network storage network element and the first network element.

In a possible implementation, when the first policy for the third area includes one background data transfer policy, the determining, by the first network element, a first target background data transfer policy for the third area in this embodiment of this application includes: determining, by the first network element, the background data transfer policy as the first target background data transfer policy.

In a possible implementation, when the first policy for the third area includes a plurality of background data transfer policies, the method provided in this embodiment of this application further includes: receiving, by the first network element, the first target background data transfer policy from a requesting device.

In a possible implementation, the method provided in this embodiment of this application further includes: receiving, by the first network element, second network performance information of the network in the second area from the data analytics network element, where the second network performance information is updated network performance information in the second area. determining, by the first network element, a second policy for the third area based on the second network performance information, where the second policy for the third area includes one or more background data transfer policies.

In a possible implementation, the second network performance information is network performance information, in the second area, updated relative to the first network performance, and the updated network performance information includes upgraded network performance information or degraded network performance information.

In a possible implementation, the method provided in this embodiment of this application further includes: sending, by the first network element, the second policy for the third area and time information to the requesting device; or setting, by the first network element, time information when the first network element sends the second policy for the third area to the requesting device, where the time information is used to indicate a maximum response time period of the requesting device for the second policy that is for the third area. After determining that the first target background data transfer policy for the third area is unavailable, the first network element sets the time information (for example, a timer or a time window) to ensure a time period for policy negotiation between the first network element and the requesting device, thereby improving reliability of the solution. It may be understood that, that the first network element sets the time information may be understood as: The first network element sets a timer or a time window, where a time length of the timer is equal to a time length indicated by the time information.

In a possible implementation, the method provided in this embodiment of this application further includes: receiving, by the first network element in the maximum response time period, a second target background data transfer policy fed back by the requesting device, where the second target background data transfer policy is one of the plurality of background data transfer policies included in the second policy; and sending, by the first network element, the second target background data transfer policy and one or both of an identifier of the second target background data transfer policy and information about the third area to a network storage network element. In this solution, after receiving the second target background data transfer policy, the network storage network element may update the first target background data transfer policy to the second target background data transfer policy based on the identifier of the first target background data transfer policy or the information about the third area.

In a possible implementation, the method provided in this embodiment of this application further includes: determining, by the first network element, to delete a first target background data transfer policy that is for the third area; and sending, by the first network element, a first deletion message to a network storage network element, where the first deletion message is used to notify the network storage network element to delete the first target background data transfer policy that is for the third area.

In a possible implementation, the determining, by the first network element, to delete a first target background data transfer policy that is for the third area includes: if the first network element does not receive, from the requesting device in the maximum response time period, a second target background data transfer policy selected by the requesting device from the plurality of background data transfer policies included in the second policy, determining, by the first network element, to delete the first target background data transfer policy that is for the third area. In this solution, if the first network element does not receive, in the maximum response time period, the second target background data transfer policy selected by the requesting device from the second policy that is for the third area, the first network element notifies the network storage network element to delete the first target background data transfer policy that is for the third area. Compared with a case in a conventional technology in which the first network element directly deletes, when a policy for the third area changes from the first policy to the second policy, the first target background data transfer policy for the third area in the network storage network element without negotiating with the requesting device, the solution provided in this embodiment of this application is more flexible and avoids a case in which a user cannot obtain the first target background data transfer policy in a renegotiation process.

In a possible implementation, the determining, by the first network element, to delete a first target background data transfer policy that is for the third area includes: receiving, by the first network element, first indication information of the requesting device, where the first indication information is used to indicate that the requesting device has not selected a target background data transfer policy from the plurality of background data transfer policies included in the second policy; and determining, by the first network element based on the first indication information, to delete the first target background data transfer policy that is for the third area.

It may be understood that the first indication information is received by the first network element in the maximum response time period.

In a possible implementation, the determining, by the first network element, to delete a first target background data transfer policy that is for the third area includes: after the first network element sends the second policy for the third area to the requesting device, if the first network element determines that the requesting device has not selected a target background data transfer policy from the second policy for the third area, determining, by the first network element, to delete the first target background data transfer policy that is for the third area.

For example, that the first network element determines that the requesting device has not selected a target background data transfer policy from the second policy for the third area includes: If the first network element determines that feedback indicating that the requesting device selects a target background data transfer policy from the second policy for the third area is not received, the first network element determines that the requesting device has not selected a target background data transfer policy from the second policy for the third area. Alternatively, the first network element determines, based on the first indication information, that the requesting device has not selected a target background data transfer policy from the second policy for the third area.

In a possible implementation, the method provided in this embodiment of this application further includes: determining, by the first network element, to obtain a background data transfer policy corresponding to the first area.

In a possible implementation, the determining, by the first network element, to obtain a background data transfer policy corresponding to the first area includes: receiving, by the first network element from the requesting device, a second request for requesting a background data transfer policy corresponding to the first area, where the second request includes the information about the first area and the information about the first time period; and determining, by the first network element based on the second request, that the background data transfer policy corresponding to the first area needs to be obtained.

In a possible implementation, the second request may further include one or more of the following information in the first area: a quantity of terminals, an amount of data transmitted by each terminal, an identifier of the requesting device, and a group identifier of the terminal.

In a possible implementation, the method provided in this embodiment of this application further includes: sending, by the first network element, the first policy and one or both of the information about the third area and an identifier of the first policy to the requesting device.

In a possible implementation, the method provided in this embodiment of this application further includes: If the first network element determines, based on the second network performance information, that the first policy for the third area is unavailable, but cannot determine the second policy for the third area based on the second network performance information, the first network element does not delete the first policy for the third area that is stored in the network storage network element. In other words, the first network element needs to reserve the first policy for the third area that is stored in the network storage network element. In this way, when the first network element cannot determine the second policy for the third area, the first policy for the third area is still available.

According to a second aspect, an embodiment of this application provides a policy determining method, where the method includes: A data analytics network element receives, from a first network element, a first request for requesting network performance information, where the first request includes information about a first area and information about a first time period; and the data analytics network element sends first network performance information in each of one or more second areas to the first network element, where the first network performance information in any second area includes one or both of first information in the second area in a second time period and a quantity of terminals in the second area in the second time period, the second time period is a sub-period of the first time period, and the second area is a subarea of the first area.

In a possible implementation, the first information includes one or more of the following information of a network in the second area in the second time period: a session creation success rate, a terminal handover success rate, a terminal registration success rate, resource usage of a base station or a core network element, a usage ratio of the base station or the core network element, and load of the base station or the core network element. In this embodiment of this application, the first information may alternatively be load information, for describing load of the network in the second area in the second time period.

In a possible implementation, the data analytics network element sends second network performance information in the second area to the first network element, where the second network performance information is updated network performance information in the second area.

In a possible implementation, the second network performance information is network performance information, in the second area, updated relative to the first network performance, and the updated network performance information includes upgraded network performance information or degraded network performance information.

According to a third aspect, an embodiment of this application provides a policy determining method, where the method includes: A requesting device receives a first policy for a third area and one or both of information about the third area and an identifier of the first policy from a first network element; the requesting device determines a first target background data transfer policy for the third area based on the first policy for the third area; and the requesting device transmits background data according to the first target background data transfer policy for the third area, where there are one or more third areas, the third area includes one or more second areas, and the second area is a subarea of a first area.

In a possible implementation, the first policy for the third area includes one or more background data transfer policies.

In a possible implementation, when the third area includes one second area, the third area is the second area.

In a possible implementation, when the third area includes a plurality of second areas, the plurality of second areas have same first network performance information.

In a possible implementation, when the first policy for the third area includes one background data transfer policy, that the requesting device determines a first target background data transfer policy for the third area includes: The requesting device determines the background data transfer policy as the first target background data transfer policy that is for the third area.

In a possible implementation, when the first policy for the third area includes a plurality of background data transfer policies, that the requesting device determines a first target background data transfer policy for the third area includes: The requesting device determines, as the first target background data transfer policy for the third area, a background data transfer policy selected from the plurality of background data transfer policies.

In a possible implementation, the method provided in this embodiment of this application may further include: The requesting device sends a response message to the first network element, where the response message is used to reflect the first target background data transfer policy selected by the requesting device from the plurality of background data transfer policies for the third area.

In a possible implementation, the method provided in this embodiment of this application may further include: The requesting device sends, to the first network element, a second request for requesting a background data transfer policy corresponding to the first area, where the second request includes information about the first area and information about the first time period.

In a possible implementation, the second request may further include one or more of the following information in the first area: a quantity of terminals, an amount of data transmitted by each terminal, an identifier of the requesting device, and a group identifier of the terminal.

In a possible implementation, the method provided in this embodiment of this application may further include: The requesting device receives a second policy for the third area and time information from the first network element, where the time information is used to indicate a maximum response time period of the requesting device for the second policy that is for the third area; and the requesting device feeds back, to the first network element in the maximum response time period, a second target background data transfer policy selected by the requesting device from the second policy that is for the third area, where the second policy includes one or more transfer policies.

In a possible implementation, the method provided in this embodiment of this application may further include: The requesting device sends first indication information to the first network element, where the first indication information is used to indicate that the requesting device has not selected a target background data transfer policy from the plurality of background data transfer policies included in the second policy.

In a possible implementation, the requesting device in this embodiment of this application sends the first indication information to the first network element in the maximum response time period.

In a possible implementation, the requesting device is an application function network element.

According to a fourth aspect, an embodiment of this application provides a policy determining apparatus. The policy determining apparatus can implement the policy determining method according to any one of the first aspect or the possible implementations of the first aspect, and therefore can implement beneficial effects according to any one of the first aspect or the possible implementations of the first aspect. The policy determining apparatus may be a first network element, or may be an apparatus that can support the first network element in implementing any one of the first aspect or the possible implementations of the first aspect, for example, a chip used in the first network element. The policy determining apparatus may implement the foregoing method by using software or hardware, or by executing corresponding software by hardware.

In an example, an embodiment of this application provides a policy determining apparatus, including: a communication unit, configured to send, to a data analytics network element, a first request for requesting network performance information, where the first request includes information about a first area and information about a first time period; the communication unit is configured to receive first network performance information in a second area from the data analytics network element, where the first network performance information includes one or both of first information in the second area in a second time period and a quantity of terminals in the second area in the second time period, the second time period is a sub-period of the first time period, the second area is a subarea of the first area, and there are one or more second areas; and a processing unit, configured to determine a first policy based on the first network performance information.

In a possible implementation, the first information includes one or more of the following information of a network in the second area in the second time period: a session creation success rate, a terminal handover success rate, a terminal registration success rate, resource usage of a base station or a core network element, a usage ratio of the base station or the core network element, and load of the base station or the core network element. In this embodiment of this application, the first information may alternatively be load information, for describing load of the network in the second area in the second time period.

In a possible implementation, the first policy is a first policy for a third area, the third area includes one or more second areas, there are one or more third areas, and the first policy for the third area includes one or more background data transfer policies.

In a possible implementation, when the third area includes one second area, the third area is the second area.

In a possible implementation, when the third area includes a plurality of second areas, the plurality of second areas have same first network performance information.

In a possible implementation, the processing unit is further configured to determine a first target background data transfer policy for the third area, where the first target background data transfer policy is one of the one or more background data transfer policies. The communication unit is further configured to send the first target background data transfer policy and one or both of an identifier of the first target background data transfer policy and information about the third area to a network storage network element. The first target background data transfer policy may be determined by the policy determining apparatus from the first policy for the third area, or may be determined by a requesting device from the first policy for the third area.

In a possible implementation, when the first policy for the third area includes one background data transfer policy, the processing unit is configured to determine the background data transfer policy as the first target background data transfer policy.

In a possible implementation, when the first policy for the third area includes a plurality of background data transfer policies, the processing unit is further configured to receive the first target background data transfer policy from the requesting device via the communication unit.

In a possible implementation, the communication unit is configured to receive second network performance information of a network in the second area from the data analytics network element, where the second network performance information is updated network performance information in the second area. The processing unit is configured to determine a second policy for the third area based on the second network performance information, where the second policy for the third area includes one or more background data transfer policies.

In a possible implementation, the second network performance information is network performance information, in the second area, updated relative to the first network performance, and the updated network performance information includes upgraded network performance information or degraded network performance information.

In a possible implementation, the communication unit is further configured to send the second policy for the third area and time information to the requesting device; or the first network element sets time information when the first network element sends the second policy for the third area to the requesting device, where the time information is used to indicate a maximum response time period of the requesting device for the second policy that is for the third area. After determining that the first target background data transfer policy for the third area is unavailable, the first network element sets the time information (for example, a timer or a time window) to ensure a time period for policy negotiation between the first network element and the requesting device, thereby improving reliability of the solution.

In a possible implementation, the processing unit is further configured to receive, from the requesting device in the maximum response time period by using the communication unit, a second target background data transfer policy fed back by the requesting device, where the second target background data transfer policy is one of the plurality of background data transfer policies included in the second policy. The communication unit is further configured to send the second target background data transfer policy and one or both of an identifier of the second target background data transfer policy and information about the third area to a network storage network element.

In a possible implementation, the processing unit is further configured to determine to delete the first target background data transfer policy for the third area. The communication unit is further configured to send a first deletion message to a network storage network element, where the first deletion message is used to notify the network storage network element to delete the first target background data transfer policy that is for the third area.

In a possible implementation, the processing unit is configured to: if the communication unit does not receive, from the requesting device in the maximum response time period, a second target background data transfer policy selected by the requesting device from the plurality of background data transfer policies included in the second policy, determine to delete the first target background data transfer policy that is for the third area.

In a possible implementation, the communication unit is further configured to receive first indication information from the requesting device, where the first indication information is used to indicate that the requesting device has not selected a target background data transfer policy from the plurality of background data transfer policies included in the second policy. The processing unit is configured to determine, based on the first indication information, to delete the first target background data transfer policy that is for the third area.

In a possible implementation, the first indication information is received by the communication unit in the maximum response time period.

In a possible implementation, that the processing unit is configured to determine to delete the first target background data transfer policy that is for the third area includes: after the communication unit sends the second policy for the third area to the requesting device, if the processing unit determines that the requesting device has not selected a target background data transfer policy from the second policy for the third area, the processing unit is configured to determine to delete the first target background data transfer policy that is for the third area.

For example, that the processing unit determines that the requesting device has not selected a target background data transfer policy from the second policy for the third area includes: If the processing unit determines that feedback indicating that the requesting device selects a target background data transfer policy from the second policy for the third area is not received, the processing unit determines that the requesting device has not selected a target background data transfer policy from the second policy for the third area. Alternatively, the processing unit determines, based on the first indication information, that the requesting device has not selected a target background data transfer policy from the second policy for the third area.

In a possible implementation, the processing unit is further configured to determine that a background data transfer policy corresponding to the first area needs to be obtained.

In a possible implementation, the communication unit is further configured to receive, from the requesting device, a second request for requesting the background data transfer policy corresponding to the first area, where the second request includes the information about the first area and the information about the first time period. The processing unit is configured to determine, based on the second request, that the background data transfer policy corresponding to the first area needs to be obtained.

In a possible implementation, the second request may further include one or more of the following information in the first area: a quantity of terminals, an amount of data transmitted by each terminal, an identifier of the requesting device, and a group identifier of the terminal.

In a possible implementation, the communication unit is further configured to send the first policy and one or both of the information about the third area and an identifier of the first policy to the requesting device.

In a possible implementation, if the processing unit determines, based on the second network performance information, that the first policy for the third area is unavailable, but cannot determine the second policy for the third area based on the second network performance information, the processing unit does not delete the first policy for the third area that is stored in the network storage network element. In other words, the processing unit needs to reserve the first policy for the third area that is stored in the network storage network element. In this way, when the processing unit cannot determine the second policy for the third area, the first policy for the third area is still available.

In another example, an embodiment of this application provides a policy determining apparatus. The policy determining apparatus may be a first network element, or may be a chip in the first network element. The policy determining apparatus may include a processing unit and a communication unit. When the policy determining apparatus is the first network element, the processing unit may be a processor. The communication unit may be an interface circuit. The policy determining apparatus may further include a storage unit. The storage unit may be a memory. The storage unit is configured to store computer program code. The computer program code includes instructions. The processing unit executes the instructions stored in the storage unit, to enable the policy determining apparatus to implement the method according to any one of the first aspect or the possible implementations of the first aspect. When the policy determining apparatus is the chip in the first network element, the processing unit may be a processor, and the communication unit may also be referred to as a communication interface. For example, the communication interface may be an input/output interface, a pin, or a circuit. The processing unit executes the computer program code stored in the storage unit, so that the first network element implements the method according to any one of the first aspect or the possible implementations of the first aspect. The storage unit may be a storage unit (for example, a register or a cache) in the chip, or may be a storage unit (for example, a read-only memory or a random access memory) that is in the first network element and that is outside the chip.

Optionally, the processor, the communication interface, and the memory are coupled to each other.

According to a fifth aspect, an embodiment of this application provides a policy determining apparatus. The policy determining apparatus can implement the policy determining method according to any one of the second aspect or the possible implementations of the second aspect, and therefore can implement beneficial effects according to any one of the second aspect or the possible implementations of the second aspect. The policy determining apparatus may be a data analytics network element, or may be an apparatus that can support the data analytics network element in implementing any one of the second aspect or the possible implementations of the second aspect, for example, a chip used in the data analytics network element. The policy determining apparatus may implement the foregoing method by using software or hardware, or by executing corresponding software by hardware.

In an example, an embodiment of this application provides a policy determining apparatus. The apparatus includes: a communication unit, configured to receive, from a first network element, a first request for requesting network performance information, where the first request includes information about a first area and information about a first time period; and a processing unit, configured to determine first network performance information in each of one or more second areas. The communication unit is further configured to send the first network performance information in each of the one or more second areas to the first network element, where the first network performance information in any second area includes one or both of first information in the second area in a second time period and a quantity of terminals in the second area in the second time period, the second time period is a sub-period of the first time period, and the second area is a subarea of the first area.

In a possible implementation, the first information includes one or more of the following information of a network in the second time period: a session creation success rate, a terminal handover success rate, a terminal registration success rate, resource usage of a base station or a core network element, a usage ratio of the base station or the core network element, and load of the base station or the core network element. In this embodiment of this application, the first information may alternatively be load information, for describing load of the network in the second area in the second time period.

In a possible implementation, the communication unit is further configured to send second network performance information in the second area to the first network element, where the second network performance information is updated network performance information in the second area.

In a possible implementation, the second network performance information is network performance information, in the second area, updated relative to the first network performance, and the updated network performance information includes upgraded network performance information or degraded network performance information.

In another example, an embodiment of this application provides a policy determining apparatus. The policy determining apparatus may be a data analytics network element, or may be a chip in the data analytics network element. The policy determining apparatus may include a processing unit and a communication unit. When the policy determining apparatus is the data analytics network element, the processing unit may be a processor. The communication unit may be an interface circuit. The policy determining apparatus may further include a storage unit. The storage unit may be a memory. The storage unit is configured to store computer program code. The computer program code includes instructions. The processing unit executes the instructions stored in the storage unit, to enable the policy determining apparatus to implement the method according to any one of the second aspect or the possible implementations of the second aspect. When the policy determining apparatus is the chip in the data analytics network element, the processing unit may be a processor, and the communication unit may also be referred to as a communication interface. For example, the communication interface may be an input/output interface, a pin, or a circuit. The processing unit executes the computer program code stored in the storage unit, so that the data analytics network element implements the method according to any one of the second aspect or the possible implementations of the second aspect. The storage unit may be a storage unit (for example, a register or a cache) in the chip, or may be a storage unit (for example, a read-only memory or a random access memory) that is in the data analytics network element and that is outside the chip.

Optionally, the processor, the communication interface, and the memory are coupled to each other.

According to a sixth aspect, an embodiment of this application provides a policy determining apparatus. The policy determining apparatus can implement the policy determining method according to any one of the third aspect or the possible implementations of the third aspect, and therefore can implement beneficial effects according to any one of the third aspect or the possible implementations of the third aspect. The policy determining apparatus may be a requesting device, or may be an apparatus that can support the requesting device in implementing any one of the third aspect or the possible implementations of the third aspect, for example, a chip used in the requesting device. The policy determining apparatus may implement the foregoing method by using software or hardware, or by executing corresponding software by hardware.

In an example, an embodiment of this application provides a policy determining apparatus. The apparatus includes: a communication unit, configured to receive a first policy for a third area and one or both of information about the third area and an identifier of the first policy from a first network element; and a processing unit, configured to determine a first target background data transfer policy for the third area based on the first policy for the third area. The processing unit is configured to transmit background data according to the first target background data transfer policy for the third area, where there are one or more third areas, the third area includes one or more second areas, and the second area is a subarea of a first area.

In a possible implementation, the first policy for the third area includes one or more background data transfer policies.

In a possible implementation, when the third area includes one second area, the third area is the second area.

In a possible implementation, when the third area includes a plurality of second areas, the plurality of second areas have same first network performance information.

In a possible implementation, when the first policy for the third area includes one background data transfer policy, the processing unit is configured to determine the background data transfer policy as the first target background data transfer policy that is for the third area.

In a possible implementation, when the first policy for the third area includes a plurality of background data transfer policies, the processing unit is configured to determine, as the first target background data transfer policy for the third area, a background data transfer policy selected from the plurality of background data transfer policies.

In a possible implementation, the communication unit is further configured to send a response message to the first network element, where the response message is used to reflect the first target background data transfer policy selected by the requesting device from the plurality of background data transfer policies for the third area.

In a possible implementation, the communication unit is further configured to send, to the first network element, a second request for requesting a background data transfer policy corresponding to the first area, where the second request includes information about the first area and information about the first time period.

In a possible implementation, the second request may further include one or more of the following information in the first area: a quantity of terminals, an amount of data transmitted by each terminal, an identifier of the requesting device, and a group identifier of the terminal.

In a possible implementation, the communication unit is further configured to receive the second policy for the third area from the first network element; or the first network element sets time information when the first network element sends the second policy for the third area to the requesting device, where the time information is used to indicate a maximum response time period of the requesting device for the second policy that is for the third area. The communication unit is further configured to feed back, to the first network element in the maximum response time period, a second target background data transfer policy selected by the requesting device from the second policy that is for the third area.

In a possible implementation, the communication unit is further configured to send first indication information to the first network element, where the first indication information is used to indicate that the requesting device has not selected a target background data transfer policy from the plurality of background data transfer policies included in the second policy.

In a possible implementation, the communication unit is further configured to send the first indication information to the first network element in the maximum response time period.

In a possible implementation, the policy determining apparatus is an application function network element.

In another example, an embodiment of this application provides a policy determining apparatus. The policy determining apparatus may be a requesting device, or may be a chip in the requesting device. The policy determining apparatus may include a processing unit and a communication unit. When the policy determining apparatus is the requesting device, the processing unit may be a processor. The communication unit may be an interface circuit. The policy determining apparatus may further include a storage unit. The storage unit may be a memory. The storage unit is configured to store computer program code. The computer program code includes instructions. The processing unit executes the instructions stored in the storage unit, to enable the policy determining apparatus to implement the method according to any one of the third aspect or the possible implementations of the third aspect. When the policy determining apparatus is the chip in the requesting device, the processing unit may be a processor, and the communication unit may also be referred to as a communication interface. For example, the communication interface may be an input/output interface, a pin, or a circuit. The processing unit executes the computer program code stored in the storage unit, so that the requesting device implements the method according to any one of the third aspect or the possible implementations of the third aspect. The storage unit may be a storage unit (for example, a register or a cache) in the chip, or may be a storage unit (for example, a read-only memory or a random access memory) that is in the requesting device and that is outside the chip.

Optionally, the processor, the communication interface, and the memory are coupled to each other.

According to a seventh aspect, an embodiment of this application provides a computer-readable storage medium. The computer-readable storage medium stores a computer program or instructions. When the computer program or the instructions is or are run on a computer, the computer is enabled to perform the policy determining method according to any one of the first aspect or the possible implementations of the first aspect.

According to an eighth aspect, an embodiment of this application provides a computer-readable storage medium. The computer-readable storage medium stores a computer program or instructions. When the computer program or the instructions is or are run on a computer, the computer is enabled to perform the policy determining method according to any one of the second aspect or the possible implementations of the second aspect.

According to a ninth aspect, an embodiment of this application provides a computer-readable storage medium. The computer-readable storage medium stores a computer program or instructions. When the computer program or the instructions is or are run on a computer, the computer is enabled to perform the policy determining method according to any one of the third aspect or the possible implementations of the third aspect.

According to a tenth aspect, an embodiment of this application provides a computer program product including instructions. When the instructions are run on a computer, the computer is enabled to perform the policy determining method according to any one of the first aspect or the possible implementations of the first aspect.

According to an eleventh aspect, this application provides a computer program product including instructions. When the instructions are run on a computer, the computer is enabled to perform the policy determining method according to any one of the second aspect or the possible implementations of the second aspect.

According to a twelfth aspect, this application provides a computer program product including instructions. When the instructions are run on a computer, the computer is enabled to perform the policy determining method according to any one of the third aspect or the possible implementations of the third aspect.

According to a thirteenth aspect, an embodiment of this application provides a communication system. The communication system includes any one or both of: the policy determining apparatus according to the fourth aspect and the possible implementations of the fourth aspect and the policy determining apparatus according to the fifth aspect and the possible implementations of the fifth aspect.

In a possible implementation, the system may further include the policy determining apparatus according to the sixth aspect or the possible implementations of the sixth aspect.

According to a fourteenth aspect, an embodiment of this application provides a communication apparatus. The communication apparatus includes a processor and a storage medium. The storage medium stores instructions. When the instructions are run by the processor, the processor implements the policy determining method according to any one of the first aspect or the possible implementations of the first aspect.

According to a fifteenth aspect, an embodiment of this application provides a communication apparatus. The communication apparatus includes a processor and a storage medium. The storage medium stores instructions. When the instructions are run by the processor, the processor implements the policy determining method according to any one of the second aspect or the possible implementations of the second aspect.

According to a sixteenth aspect, an embodiment of this application provides a communication apparatus. The communication apparatus includes a processor and a storage medium. The storage medium stores instructions. When the instructions are run by the processor, the processor implements the policy determining method according to any one of the third aspect or the possible implementations of the third aspect.

According to a seventeenth aspect, an embodiment of this application provides a communication apparatus. The communication apparatus includes one or more modules, configured to implement the methods according to the first aspect, the second aspect, the third aspect, and the twenty-fourth aspect, and the one or more modules may correspond to the steps in the methods according to the first aspect, the second aspect, the third aspect, and the twenty-fourth aspect.

According to an eighteenth aspect, an embodiment of this application provides a chip. The chip includes a processor and a communication interface. The communication interface is coupled to the processor. The processor is configured to run a computer program or instructions, to implement the policy determining method according to any one of the first aspect or the various possible implementations of the first aspect. The communication interface is configured to communicate with a module outside the chip.

According to a nineteenth aspect, an embodiment of this application provides a chip. The chip includes a processor and a communication interface. The communication interface is coupled to the processor. The processor is configured to run a computer program or instructions, to implement the policy determining method according to any one of the second aspect or the various possible implementations of the second aspect. The communication interface is configured to communicate with a module outside the chip.

According to a twentieth aspect, an embodiment of this application provides a chip. The chip includes a processor and a communication interface. The communication interface is coupled to the processor. The processor is configured to run a computer program or instructions, to implement the policy determining method according to any one of the third aspect or the various possible implementations of the third aspect. The communication interface is configured to communicate with a module outside the chip.

Specifically, the chip provided in embodiments of this application further includes a memory, configured to store the computer program or the instructions.

According to a twenty-first aspect, an embodiment of this application provides a communication apparatus. The communication apparatus includes at least one processor, the at least one processor is configured to run a computer program or instructions stored in a memory, to implement the policy determining method according to the first aspect or the possible implementations of the first aspect.

According to a twenty-second aspect, an embodiment of this application provides a communication apparatus. The communication apparatus includes at least one processor, the at least one processor is configured to run a computer program or instructions stored in a memory, to implement the policy determining method according to the second aspect or the possible implementations of the second aspect.

According to a twenty-third aspect, an embodiment of this application provides a communication apparatus. The communication apparatus includes at least one processor, the at least one processor is configured to run a computer program or instructions stored in a memory, to implement the policy determining method according to the third aspect or the possible implementations of the third aspect.

According to a twenty-fourth aspect, an embodiment of this application provides a policy determining method, where the method includes: A first network element sends, to a data analytics network element, a first request for requesting network performance information, where the first request includes information about a first area; the first network element receives first network performance information in a second area from the data analytics network element, where the first network performance information includes one or both of first information and a quantity of terminals, the second area is a subarea of the first area, and there are one or more second areas; the first network element determines a first policy for a third area based on the first network performance information, where the third area includes one or more second areas, there are a plurality of third areas, and the third area is a subarea of the first area; and the first network element sends the first policy corresponding to each of the plurality of third areas to a requesting device.

In a possible implementation, the first policy corresponding to the third area includes one or more background data transfer policies.

In a possible implementation, when the third area includes a plurality of second areas, the plurality of second areas included in the third area have same first network performance information.

In a possible implementation, when the third area includes one second area, the third area is the second area.

In a possible implementation, the method provided in this embodiment of this application further includes: The first network element determines a first target background data transfer policy for any third area in the plurality of third areas, where the first target background data transfer policy for the third area is one of the one or more background data transfer policies for the third area; and the first network element sends the first target background data transfer policy for any third area and one or both of an identifier of the first target background data transfer policy and information about the third area to a network storage network element.

In a possible implementation, that the first network element determines a first target background data transfer policy for any third area in the plurality of third areas includes: When the first policy for the third area includes one background data transfer policy, the first network element determines the background data transfer policy as the first target background data transfer policy that is for the third area. Alternatively, when the first policy for the third area includes a plurality of background data transfer policies, the first network element receives the first target background data transfer policy for the third area from the requesting device.

In a possible implementation, the method provided in this embodiment of this application further includes: the first network element receives second network performance information in the second area from the data analytics network element, where the second network performance information is updated network performance information in the second area; and the first network element determines a second policy for the third area based on the second network performance information, where the second policy for the third area includes one or more background data transfer policies.

In a possible implementation, the method provided in this embodiment of this application further includes: The first network element sends the second policy for the third area and time information to the requesting device. Alternatively, the first network element sets time information when the first network element sends the second policy for the third area to the requesting device. The time information is used to indicate a maximum response time period of the requesting device for the second policy that is for the third area.

In a possible implementation, the method provided in this embodiment of this application further includes: The first network element receives, in the maximum response time period, a second target background data transfer policy fed back by the requesting device, where the second target background data transfer policy is one of the plurality of background data transfer policies included in the second policy; and the first network element sends the second target background data transfer policy and one or both of an identifier of the second target background data transfer policy and information about the third area to a network storage network element.

In a possible implementation, the method provided in this embodiment of this application further includes: The first network element determines to delete the first target background data transfer policy that is for the third area; and the first network element sends a first deletion message to a network storage network element, where the first deletion message is used to notify the network storage network element to delete the first target background data transfer policy that is for the third area.

In a possible implementation, that the first network element determines to delete the first target background data transfer policy that is for the third area includes: If the first network element does not receive, from the requesting device in the maximum response time period, a second target background data transfer policy selected by the requesting device from the plurality of background data transfer policies included in the second policy, the first network element determines to delete the first target background data transfer policy that is for the third area. In this solution, if the first network element does not receive, in the maximum response time period, the second target background data transfer policy selected by the requesting device from the second policy that is for the third area, the first network element notifies the network storage network element to delete the first target background data transfer policy that is for the third area. Compared with a case in a conventional technology in which the first network element directly deletes, when a policy for the third area changes from the first policy to the second policy, the first target background data transfer policy for the third area in the network storage network element without negotiating with the requesting device, the solution provided in this embodiment of this application is more flexible and avoids a case in which a user cannot obtain the first target background data transfer policy in a renegotiation process.

In a possible implementation, that the first network element determines to delete the first target background data transfer policy that is for the third area includes: The first network element receives first indication information of the requesting device, where the first indication information is used to indicate that the requesting device has not selected a target background data transfer policy from the plurality of background data transfer policies included in the second policy; and the first network element determines, based on the first indication information, to delete the first target background data transfer policy that is for the third area.

It may be understood that the first indication information is received by the first network element in the maximum response time period.

In a possible implementation, that the first network element determines to delete the first target background data transfer policy that is for the third area includes: After the first network element sends the second policy for the third area to the requesting device, if the first network element determines that the requesting device has not selected a target background data transfer policy from the second policy for the third area, the first network element determines to delete the first target background data transfer policy that is for the third area.

For example, that the first network element determines that the requesting device has not selected a target background data transfer policy from the second policy for the third area includes: If the first network element determines that feedback indicating that the requesting device selects a target background data transfer policy from the second policy for the third area is not received, the first network element determines that the requesting device has not selected a target background data transfer policy from the second policy for the third area. Alternatively, the first network element determines, based on the first indication information, that the requesting device has not selected a target background data transfer policy from the second policy for the third area.

In a possible implementation, before the first network element sends, to the data analytics network element, the first request for requesting network performance information, the method provided in this embodiment of this application may further include: The first network element receives, from the requesting device, a second request for requesting a background data transfer policy corresponding to the first area, where the second request includes the information about the first area and information about a first time period; and the first network element determines, based on the second request, that the background data transfer policy corresponding to the first area needs to be obtained.

Correspondingly, the first network performance information includes one or more of the first information in the second area in a second time period or a quantity of terminals in the second area in the second time period.

In a possible implementation, the second request may further include one or more of the following information in the first area: a quantity of terminals, an amount of data transmitted by each terminal, an identifier of the requesting device, and a group identifier of the terminal.

In a possible implementation, the method provided in this embodiment of this application further includes: If the first network element determines, based on the second network performance information, that the first policy for the third area is unavailable, but cannot determine the second policy for the third area based on the second network performance information, the first network element does not delete the first policy for the third area that is stored in the network storage network element. In other words, the first network element needs to reserve the first policy for the third area that is stored in the network storage network element. In this way, when the first network element cannot determine the second policy for the third area, the first policy for the third area is still available.

According to a twenty-fifth aspect, an embodiment of this application provides a policy determining apparatus. The policy determining apparatus can implement the policy determining method according to any one of the twenty-fourth aspect or the possible implementations of the twenty-fourth aspect, and therefore can implement beneficial effects according to any one of the twenty-fourth aspect or the possible implementations of the twenty-fourth aspect. The policy determining apparatus may be a first network element, or may be an apparatus that can support the first network element in implementing any one of the twenty-fourth aspect or the possible implementations of the twenty-fourth aspect, for example, a chip used in the first network element. The policy determining apparatus may implement the foregoing method by using software or hardware, or by executing corresponding software by hardware.

In an example, an embodiment of this application provides a policy determining apparatus. The apparatus includes: a communication unit, configured to send, to a data analytics network element, a first request for requesting network performance information, where the first request includes information about a first area, where the communication unit is further configured to receive first network performance information in a second area from the data analytics network element, where the first network performance information includes one or both of first information and a quantity of terminals, the second area is a subarea of the first area, and there are one or more second areas; and a processing unit, configured to determine a first policy for a third area based on the first network performance information, where the third area includes one or more second areas, there are a plurality of third areas, and the third area is a subarea of the first area. The first network element sends the first policy corresponding to each of the plurality of third areas to a requesting device.

In a possible implementation, the first policy corresponding to the third area includes one or more background data transfer policies.

In a possible implementation, when the third area includes a plurality of second areas, the plurality of second areas included in the third area have same first network performance information.

In a possible implementation, when the third area includes one second area, the third area is the second area.

In a possible implementation, the processing unit is further configured to determine a first target background data transfer policy for any third area in the plurality of third areas, where the first target background data transfer policy for the third area is one of the one or more background data transfer policies for the third area. The communication unit is further configured to send the first target background data transfer policy for any third area and one or both of an identifier of the first target background data transfer policy and information about the third area to a network storage network element.

In a possible implementation, when the first policy for the third area includes one background data transfer policy, the processing unit is further configured to determine the background data transfer policy as the first target background data transfer policy that is for the third area. Alternatively, when the first policy for the third area includes a plurality of background data transfer policies, the processing unit is further configured to receive, via the communication unit, the first target background data transfer policy for the third area from the requesting device.

In a possible implementation, the communication unit is further configured to receive second network performance information in the second area from the data analytics network element, where the second network performance information is updated network performance information in the second area. The processing unit is further configured to determine a second policy for the third area based on the second network performance information, where the second policy for the third area includes one or more background data transfer policies.

In a possible implementation, the communication unit is further configured to send the second policy for the third area and time information to the requesting device. Alternatively, when the second policy for the third area is sent to the requesting device, the processing unit is further configured to set time information. The time information is used to indicate a maximum response time period of the requesting device for the second policy that is for the third area.

In a possible implementation, in the maximum response time period, the processing unit is further configured to: when receiving a second target background data transfer policy fed back by the requesting device, send the second target background data transfer policy and one or both of an identifier of the second target background data transfer policy and information about the third area to a network storage network element, where the second target background data transfer policy is one of the plurality of background data transfer policies included in the second policy.

In a possible implementation, the processing unit is further configured to determine to delete the first target background data transfer policy for the third area. The communication unit is further configured to send a first deletion message to a network storage network element, where the first deletion message is used to notify the network storage network element to delete the first target background data transfer policy that is for the third area.

In a possible implementation, the processing unit is configured to: if the communication unit does not receive, from the requesting device in the maximum response time period, a second target background data transfer policy selected by the requesting device from the plurality of background data transfer policies included in the second policy, determine to delete the first target background data transfer policy that is for the third area.

In a possible implementation, the communication unit is further configured to receive first indication information from the requesting device, where the first indication information is used to indicate that the requesting device has not selected a target background data transfer policy from the plurality of background data transfer policies included in the second policy. The processing unit is configured to determine, based on the first indication information, to delete the first target background data transfer policy that is for the third area.

In a possible implementation, the first indication information is received by the communication unit in the maximum response time period.

In a possible implementation, that the processing unit is configured to determine to delete the first target background data transfer policy that is for the third area includes: after the communication unit sends the second policy for the third area to the requesting device, if the processing unit determines that the requesting device has not selected a target background data transfer policy from the second policy for the third area, the processing unit is configured to determine to delete the first target background data transfer policy that is for the third area.

For example, that the processing unit determines that the requesting device has not selected a target background data transfer policy from the second policy for the third area includes: If the processing unit determines that feedback indicating that the requesting device selects a target background data transfer policy from the second policy for the third area is not received, the processing unit determines that the requesting device has not selected a target background data transfer policy from the second policy for the third area. Alternatively, the processing unit determines, based on the first indication information, that the requesting device has not selected a target background data transfer policy from the second policy for the third area.

In a possible implementation, the communication unit is further configured to: before the first network element sends, to the data analytics network element, the first request for requesting the network performance information, receive, from the requesting device, a second request for requesting a background data transfer policy corresponding to the first area, where the second request includes the information about the first area and information about a first time period. The processing unit is further configured to determine, based on the second request, that the background data transfer policy corresponding to the first area needs to be obtained. Correspondingly, the first network performance information includes one or more of the first information in the second area in a second time period or a quantity of terminals in the second area in the second time period.

In a possible implementation, the second request may further include one or more of the following information in the first area: a quantity of terminals, an amount of data transmitted by each terminal, an identifier of the requesting device, and a group identifier of the terminal.

In a possible implementation, if the processing unit determines, based on the second network performance information, that the first policy for the third area is unavailable, but cannot determine the second policy for the third area based on the second network performance information, the processing unit does not delete the first policy for the third area that is stored in the network storage network element. In other words, the processing unit needs to reserve the first policy for the third area that is stored in the network storage network element. In this way, when the processing unit cannot determine the second policy for the third area, the first policy for the third area is still available.

In another example, an embodiment of this application provides a policy determining apparatus. The policy determining apparatus may be a first network element, or may be a chip in the first network element. The policy determining apparatus may include a processing unit and a communication unit. When the policy determining apparatus is the first network element, the processing unit may be a processor. The communication unit may be an interface circuit. The policy determining apparatus may further include a storage unit. The storage unit may be a memory. The storage unit is configured to store computer program code. The computer program code includes instructions. The processing unit executes the instructions stored in the storage unit, to enable the policy determining apparatus to implement the method according to any one of the twenty-fourth aspect or the possible implementations of the twenty-fourth aspect. When the policy determining apparatus is the chip in the first network element, the processing unit may be a processor, and the communication unit may also be referred to as a communication interface. For example, the communication interface may be an input/output interface, a pin, or a circuit. The processing unit executes the computer program code stored in the storage unit, so that the first network element implements the method according to any one of the twenty-fourth aspect or the possible implementations of the twenty-fourth aspect. The storage unit may be a storage unit (for example, a register or a cache) in the chip, or may be a storage unit (for example, a read-only memory or a random access memory) that is in the first network element and that is outside the chip.

Optionally, the processor, the communication interface, and the memory are coupled to each other.

According to a twenty-sixth aspect, an embodiment of this application provides a communication apparatus. The communication apparatus includes a processor and a storage medium. The storage medium stores instructions. When the instructions are run by the processor, the processor implements the policy determining method according to any one of the twenty-fourth aspect or the possible implementations of the twenty-fourth aspect.

According to a twenty-seventh aspect, an embodiment of this application provides a chip. The chip includes a processor and a communication interface. The communication interface is coupled to the processor. The processor is configured to run a computer program or instructions, to implement the policy determining method according to any one of the twenty-fourth aspect or the various possible implementations of the twenty-fourth aspect. The communication interface is configured to communicate with a module outside the chip.

According to a twenty-eighth aspect, an embodiment of this application provides a computer program product including instructions. When the instructions are run on a computer, the computer is enabled to perform the policy determining method according to any one of the twenty-fourth aspect or the possible implementations of the twenty-fourth aspect.

According to a twenty-ninth aspect, an embodiment of this application provides a computer-readable storage medium. The computer-readable storage medium stores a computer program or instructions. When the computer program or the instructions is or are run on a computer, the computer is enabled to perform the policy determining method according to any one of the twenty-fourth aspect or the possible implementations of the twenty-fourth aspect.

According to a thirtieth aspect, an embodiment of this application provides a communication apparatus. The communication apparatus includes at least one processor, the at least one processor is configured to run a computer program or instructions stored in a memory, to implement the policy determining method according to the twenty-fourth aspect or the possible implementations of the twenty-fourth aspect.

Any apparatus, computer storage medium, computer program product, chip, or communication system provided above is configured to perform the corresponding method provided above. Therefore, for beneficial effects that can be achieved by the apparatus, computer storage medium, computer program product, chip, or communication system provided above, refer to the beneficial effects of the corresponding solution in the corresponding method provided above. Details are not described herein again.

DETAILED DESCRIPTION OF ILLUSTRATIVE EMBODIMENTS

Figure 1:
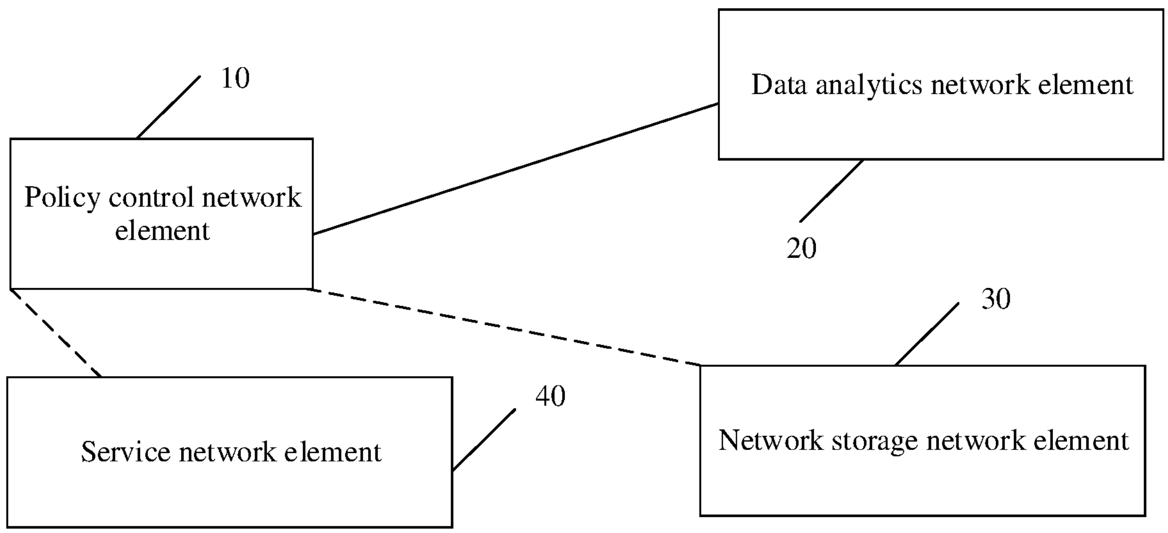
FIG. 1 is a diagram of an architecture of a communication system according to an embodiment of this application.

To clearly describe the technical solutions in embodiments of this application, terms such as "first" and "second" are used in embodiments of this application to distinguish between same items or similar items that provide basically same functions or purposes. For example, a first request and a second request are merely used to distinguish between different requests, and a sequence of the first request and the second request is not limited. A person skilled in the art may understand that the terms such as "first" and "second" do not limit a quantity or an execution sequence, and that the terms such as "first" and "second" do not indicate a definite difference.

It should be noted that, in this application, words such as "example" or "for example" are used to represent giving an example, an illustration, or a description. Any embodiment or design solution described by using "for example" or "example" in this application shall not be construed as being more preferred or more advantageous than another embodiment or design solution. Exactly, use of the word "for example" or "example" or the like is intended to present a relative concept in a specific manner.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

In this application, at least one means one or more, and a plurality of means two or more. And/or describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

Before embodiments of this application are described, related terms used in embodiments of this application are first explained.

1. Foreground data is terminal interactive traffic, for example, traffic generated when a payment service or instant messaging software (for example, WeChat) is running. Foreground data transfer has a high requirement on real-time performance. If interaction cannot be performed in time, user experience is affected. Generally, the foreground data is traffic generated by a foreground service of a terminal, that is, traffic generated by a service that can be viewed on the terminal through a screen or is being used by the terminal.

2. Background data may also be referred to as background data. In the big data era, massive data is generated on a terminal side, and such data needs to be uploaded to a cloud server. The data that needs to be uploaded to the cloud server has no requirement on timeliness but is sensitive to tariffs. For example, an automobile enterprise uploads map information to a cloud server, and the map information is used by the cloud server to formulate a high-definition map. There is no service level agreement (SLA) requirement for background data transfer. Therefore, idle network resources can be used for background data transfer. Operators can reduce tariffs to achieve a win-win situation between third parties and operators.

FIG. 1 is a diagram of an architecture of a communication system according to an embodiment of this application. The system includes a policy control network element 10 and a data analytics network element 20 that communicates with the policy control network element 10.

In a possible implementation, the communication system may further include a network storage network element 30 and a service network element 40.

The service network element 40 may request a background data transfer policy from the policy control network element 10 through an interface between the service network element 40 and the policy control network element 10. Alternatively, the service network element 40 may send, to the policy control network element 10 by using an intermediate network element (for example, a network exposure function network element), a request for requesting a background data transfer policy. The policy control network element 10 is configured to request network performance information in a first area in a first time period from the data analytics network element 20. The data analytics network element 20 may provide the policy control network element 10 with first network performance information in each of one or more second areas included in the first area in a second time period, so that the policy control network element 10 formulates a first policy based on the first network performance information in each second area in the second time period, thereby feeding back the first policy to the service network element 40. The network storage network element 30 is configured to store a target background data transfer policy for a subarea.

The data analytics network element 20 in this embodiment of this application may be an independently deployed network element. Certainly, the data analytics network element 20 may alternatively be deployed together with another network element (for example, the policy control network element 10), or the policy control network element 10 has a function of performing an action performed by the data analytics network element 20 in this embodiment of this application. Alternatively, the data analytics network element 20 is deployed together with a second network element, and the data analytics network element 20 may interact with the policy control network element 10. In this case, the policy control network element 10 and the second network element are different network elements. For example, the second network element may be a control plane network element (for example, an SMF network element) or a UPF network element in a 5G network architecture.

Optionally, the communication system shown in FIG. 1 may be applied to a current 5G network architecture and another network architecture that emerges in the future. This is not specifically limited in embodiments of this application.

Figure 2:
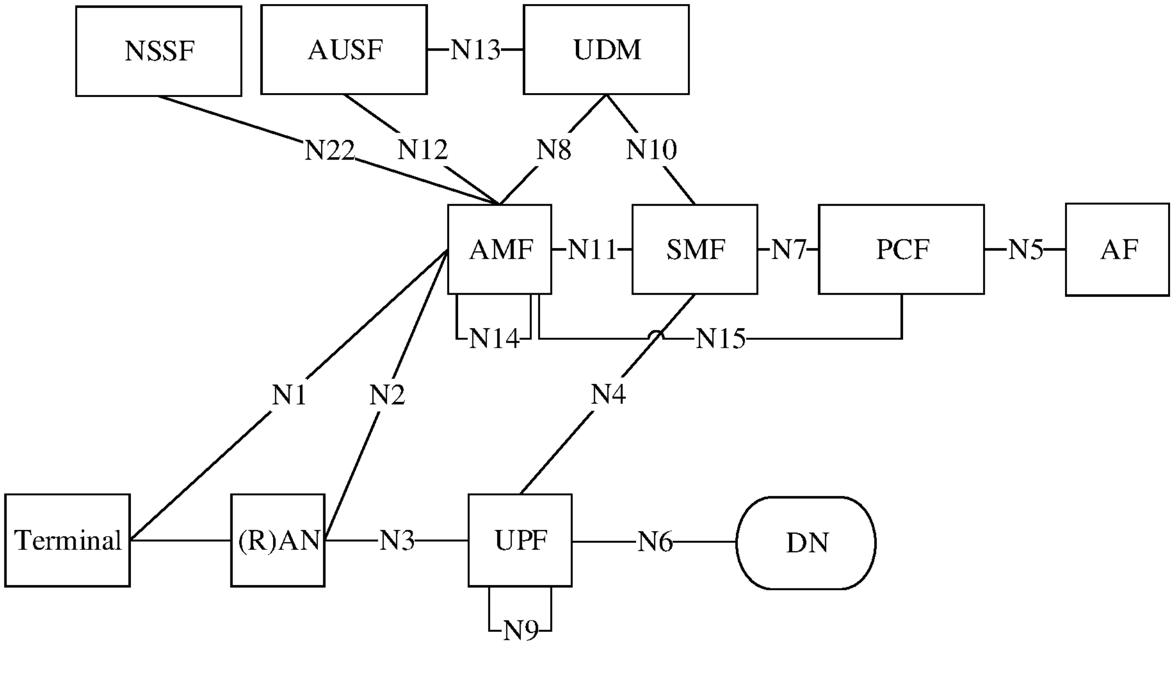
FIG. 2 is a diagram of a system architecture of a 5G network according to an embodiment of this application.

The following uses an example in which the communication system shown in FIG. 1 is applicable to the 5G network architecture, for example, uses an example in which the communication system shown in FIG. 1 is applicable to a 5G network architecture shown in FIG. 2.

For example, the communication system shown in FIG. 1 is applied to an interface-based architecture in the 5G network architecture. As shown in FIG. 2, a network element or an entity corresponding to the policy control network element 10 may be a policy control function (PCF) network element, a session management function (SMF) network element, or a network management network element in a 5GC in the structure shown in FIG. 2. For example, the network management network element may be an operation, administration, and maintenance (OAM) network element. A network element or an entity corresponding to the service network element 40 may be an application function (AF) network element in the 5GC in the structure shown in FIG. 2. The AF network element may be an operator AF, for example, a proxy-call session control function (P-CSCF), or may be a third-party AF, for example, a third-party server that needs to transmit background data, such as an automobile enterprise server, a Tencent server, or a WeChat server.

In the 5G network, as shown in FIG. 2, the data analytics network element 20 may be a network data analytics function (NWDAF) network element in the 5G Core, a management data analytics function (MDAF) network element in a network management system, or even a data analytics network element on a RAN side.

In the 5G network, as shown in FIG. 2, the network storage network element 30 may be a user data management network element or a user data storage network element. For example, the network storage network element 30 may be a unified data repository (UDR) or a unified data management (UDM).

In addition, as shown in FIG. 2, the 5G network architecture may further include a terminal, an access device (for example, an access network (AN) device or a radio access network (RAN) device), a user plane function (UPF) network element, a data network (DN), an access and mobility management function (AMF) network element, an authentication server function (AUSF) network element, a session management function (SMF) network element, a network exposure function (NEF) network element, and the like. This is not specifically limited in embodiments of this application.

The terminal communicates with the AMF network element through a next generation (N1) interface (N1 for short). The access device communicates with the AMF network element through an N2 interface (N2 for short). The access device communicates with the UPF network element through an N3 interface (N3 for short). The UPF network element communicates with the DN through an N6 interface (N6 for short). The UPF network element communicates with the SMF network element through an N4 interface (N4 for short). The AMF network element communicates with the SMF network element through an N11 interface (N11 for short). The AMF network element communicates with the UDM network element through an N8 interface (N8 for short). The SMF network element communicates with the PCF network element through an N7 interface (N7 for short). The SMF network element communicates with the UDM network element through an N10 interface (N10 for short). The AMF network element communicates with the AUSF network element through an N12 interface (N12 for short). The UDM network element communicates with the UDR network element. The PCF network element communicates with the UDR network element.

Figure 3:
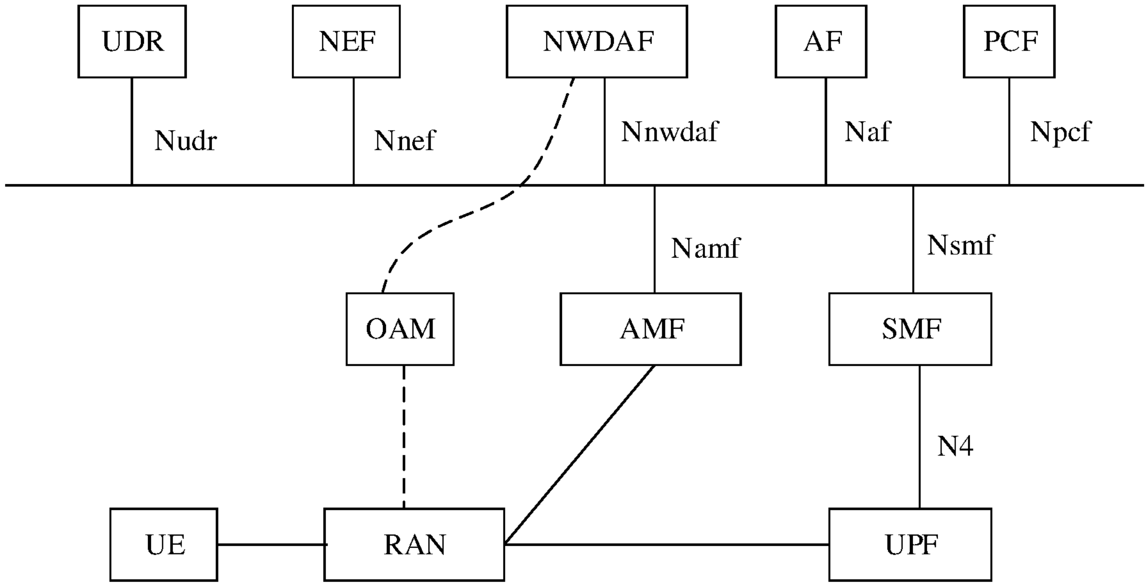
FIG. 3 is a diagram of a system architecture of another 5G network according to an embodiment of this application.

FIG. 3 shows a service-based architecture of a 5G network architecture. A difference between the architecture and that in FIG. 2 lies in that control plane network elements in a 5GC in FIG. 3 may interact with each other through service-based interfaces. For example, an AMF network element, an AUSF network element, an SMF network element, a UDM network element, a UDR network element, an NEF network element, and a PCF network element interact with each other through service-based interfaces. For example, an external service-based interface provided by the AMF network element may be Namf. An external service-based interface provided by the SMF network element may be Nsmf. An external service-based interface provided by the UDM network element may be Nudm. An external service-based interface provided by the UDR network element may be Nudr. An external service-based interface provided by the PCF network element may be Npcf. An external service-based interface provided by the NEF network element may be Nnef. An external service-based interface provided by the NRF network element may be Nnrf. An external service-based interface provided by an NWDAF network element may be Nnwdaf. It should be understood that for related descriptions of names of various service-based interfaces in FIG. 3, refer to a diagram of a 5G system architecture in the 23.501 standard. Details are not described herein.

It should be noted that FIG. 2 and FIG. 3 merely provide examples of one PCF network element. Certainly, the 5G network architecture may include a plurality of PCF network elements, for example, include a PCF network element 1 and a PCF network element 2. This is not specifically limited in embodiments of this application. For a manner of connection between the network elements, refer to the 5G network architecture shown in FIG. 2 or FIG. 3. Details are not described herein again.

The AMF network element is mainly responsible for mobility management in a mobile network, such as user location update, registration of a user with a network, and user switching.

The SMF network element is mainly responsible for session management in the mobile network, such as session establishment, modification, and release. For example, specific functions are allocation of an IP address to a user and selection of a UPF network element that provides a packet forwarding function.

The PCF network element is configured to formulate a background data transfer policy.

The UDM network element or the UDR network element is configured to store user data, for example, a background data transfer policy.

The UPF network element is mainly responsible for processing a user packet, such as forwarding and charging for the user packet.

The DN refers to an operator network that provides a data transmission service for a terminal, for example, an IP multimedia service (IMS) or the Internet.

The data analytics network element is a network element device that can perform big data analytics, and may be but is not limited to a network data analytics function network element. For example, the network data analytics function network element may be an NWDAF. In embodiments of this application, the data analytics network element can determine, through analytics, network performance information in each of one or more subareas, to assist the PCF network element in specifying a background data transfer policy based on the network performance information in each subarea.

The service network element may be an application network element. Specifically, the application network element may be but is not limited to an AF network element of an operator, a terminal, or a third-party device such as an AF network element of a non-operator (which may also be referred to as a third-party AF network element). The AF network element of the operator may be but is not limited to a service management and control server of the operator, and the third-party AF network element may be but is not limited to a third-party service server. The background data is usually defined as non-real-time interactive traffic, and may be specifically classified into uplink background data and downlink background data. For example, the downlink background data may be transmitted traffic such as video buffering, file downloading, a software update package, and a software notification message. The uplink background data may be transmitted traffic such as information, stored by a vehicle, about a driving map.

Figure 4:
FIG. 4 is a schematic diagram of terminal distribution according to an embodiment of this application.

FIG. 4 is a schematic diagram of a terminal distribution scenario according to an embodiment of this application. In the scenario shown in FIG. 4, there are three tracking areas (tracking area, TA): TA1, TA2, and TA3. Currently, a service network element may request a background data transfer policy for a TA list (for example, a TA list shown in FIG. 4 includes TA1, TA2, and TA3) from a PCF network element. Then, the PCF network element may formulate a background data transfer policy for the TA list based on network performance information, obtained from an NWDAF network element, in the TA list. It is assumed that an AF network element sends, to the PCF network element, a request indicating that 10000 terminals need to transmit background data from 00:00 to 05:00. After obtaining the network performance information in the TA list, the PCF network element determines, based on the network performance information in the TA list, that the background data of the 10000 terminals can be transmitted from 00:00 to 05:00.

However, in an actual transmission process, congestion may occur in some areas in the TA list. For example, in the background data transfer policy formulated by the PCF network element, 1000 terminals transmit background data in TA1 from 00:00 to 01:00, but a quantity of terminals that actually need to transmit background data is 1500. In the background data transfer policy formulated by the PCF network element, 3000 terminals transmit background data in TA2 from 03:00 to 05:00, but a quantity of terminals that actually need to transmit background data is 3500. In the background data transfer policy formulated by the PCF network element, 6000 terminals transmit background data in TA3 from 02:00 to 03:00, but a quantity of terminals that actually need to transmit background data is 5000. As a result, congestion occurs when the terminals in TA1 and TA2 transmit background data, and there are remaining resources that are allocated by a network to TA3 for transmitting background data. This is because the PCF network element determines the background data transfer policy per TA list, but the PCF network element does not determine a requirement for each TA.

It should be understood that the network recommends that a quantity of terminals performing transmission in the TA is 6000, indicating that a resource allocated by the network to the TA can ensure reliable background data transfer by the 6000 terminals.

In view of the foregoing problem, embodiments of this application provide a policy determining method. In the method, a PCF network element (corresponding to the following first network element) formulates a background data transfer policy for each subarea or an aggregation area based on network performance information in a subarea (for example, a second area) included in a first area and/or a sub-period (for example, a second time period) included in a first time period. This can ensure that a background data transfer policy formulated for a subarea in a sub-period meets a requirement of the subarea in the sub-period, and avoid network resource congestion or network resource waste in some areas in some time periods, thereby saving resources and improving transmission efficiency.

B corresponding to A in embodiments of this application may be understood as that A is associated with B.

The following describes the policy determining method provided in embodiments of this application with reference to FIG. 1 to FIG. 4.

It should be noted that names of messages between network elements, names of parameters in the messages, or the like in the following embodiments of this application are merely examples, and there may be other names in a specific implementation. This is not specifically limited in embodiments of this application.

It should be noted that mutual reference may be made between embodiments of this application. For example, for same or similar steps, mutual reference may be made between a method embodiment, a communication system embodiment, and an apparatus embodiment. This is not limited.

The policy determining method in embodiments of this application may be performed by a first network element, or may be performed by a chip used in the first network element. The policy determining method may be a data analytics network element, or may be a chip used in the data analytics network element. The following embodiment is described by using an example in which the policy determining method is performed by the data analytics network element and the first network element.

Figure 5:
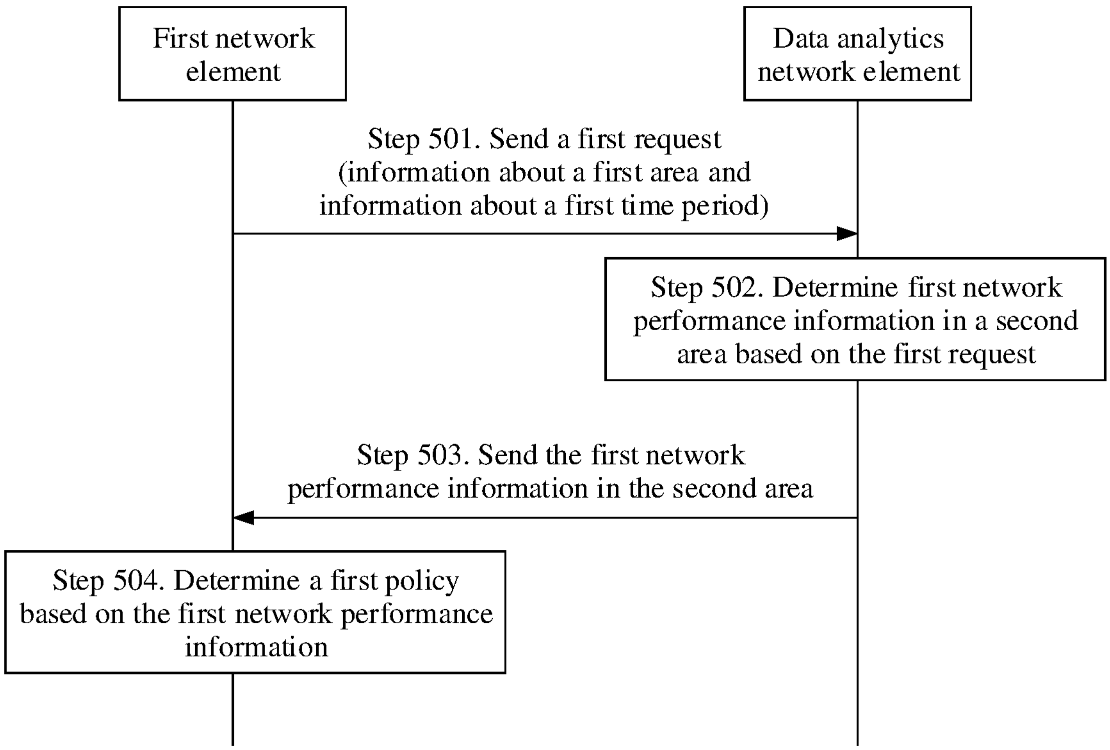
FIG. 5 is a schematic flowchart of a policy determining method according to an embodiment of this application.

An example in which the policy determining method provided in embodiments of this application is applied to the communication system shown in FIG. 1 is used. FIG. 5 is a schematic interaction diagram of a policy determining method according to an embodiment of this application. The method includes the following steps.

Step 501. A first network element sends a first request to a data analytics network element. Correspondingly, the data analytics network element receives the first request from the first network element. The first request is for requesting network performance information. The first request includes information about a first area and information about a first time period.

For example, the information about the first area is used to determine the first area. For example, the first area may be at least one of a tracking area TA, a tracking area list (TA list), a routing area (RA), an RA list, a cell, a cell list, a global positioning system (GPS (global positioning system, physical area)), or a GPS list. Descriptions are uniformly provided herein, and details are not described subsequently. The GPS list includes one or more physical areas. The TA list includes one or more TAs. The cell list includes one or more cells. The information about the first time period is used to determine the first time period (for example, 00:00 to 05:00). For example, the first time period may be at least one of a time window, a timestamp, or a time interval.

The first request in this embodiment of this application is specifically for requesting the network performance information in the first area in the first time period from the data analytics network element.

For example, the first network element may be a network element (a core network element (for example, a PCF network element or an SMF network element) or a network management network element (a network slice management function (NSMF))) configured to determine a background data transfer policy, the first network element may be a network element (for example, an AF network element) that requests a background data transfer policy, or the first network element may be a network element that performs background data transfer according to a background data transfer policy. This is not limited in this embodiment of this application.

In a possible implementation, the first request may further include second indication information, and the second indication information is used to indicate to request the network performance information.

Step 502. The data analytics network element determines first network performance information in a second area based on the first request. The first area includes one or more second areas.

For example, when the first area includes one second area, the second area is the first area. When the first area includes a plurality of second areas, the data analytics network element determines first network performance information in each of the plurality of second areas.

The first network performance information in the second area includes one or both of first information in the second area in a second time period and a quantity of terminals in the second area in the second time period. The second time period is a sub-period of the first time period, the second area is a subarea of the first area, and there are one or more second areas.

The one or more second areas may be obtained through division by the first network element, or the one or more second areas may be obtained through division by the data analytics network element. This is not limited in this embodiment of this application. For example, the data analytics network element or the first network element may perform division at a granularity of a TA or a cell in a TA list. Alternatively, the data analytics network element performs, based on data analytics, clustering or classification on different TAs or cells in a TA list depending on whether network performance information is similar or the same, where an area corresponding to each category is used as a subarea of the first area.

An area obtained by aggregating one or more second areas in this embodiment of this application may be all or a part of the first area. This is not limited in this embodiment of this application. For example, that the data analytics network element divides the first area is used as an example. If the first area provided by the first network element is a TA list, the data analytics network element may obtain subareas through division at a granularity of a TA included in the TA list.

For example, the first area is area A, and the first time period is T1 to T10. In this case, the data analytics network element may divide area A into area 1, area 2, and area 3. In this way, the data analytics network element may determine first network performance information in area 1 in a time period T1 to T3, first network performance information in area 2 in a time period T2 to T5, and first network performance information in area 3 in a time period T7 to T8.

Alternatively, for another example, the first area is area B, and the first time period is T11 to T20. In this case, the data analytics network element may divide area B into one area, that is, the second area is area B. In this way, the data analytics network element may determine first network performance information in the second area in a time period T11 to T14 and first network performance information in the second area in a time period T16 to T20.

The first time period in this embodiment of this application includes one or more second time periods. Because network performance in a same second area varies in different time periods, first network performance information in the same second area includes network performance information in the same second area in each of the one or more second time periods. For example, first network performance information in area 1 may include network performance information in area 1 in the time period T1 to T3 and network performance information in area 1 in a time period T5 to T6.

Second time periods corresponding to different second areas may be the same or may be different. In other words, for area 1 and area 2, the data analytics network element may determine the first network performance information in area 1 in the time period T1 to T3 and first network performance information in area 2 in the time period T1 to T3. Certainly, for area 1 and area 2, the data analytics network element may determine first network performance information in area 1 in a time period T1 to T4 and first network performance information in area 2 in the time period T5 to T6.

Second time periods corresponding to different second areas may be continuous time periods, or may be discontinuous time periods. This is not limited in this embodiment of this application.

It may be understood that the first information in the second area in the second time period is used to indicate whether a network, a network element (for example, a core network element (for example, a UPF network element, an AMF network element, or an SMF network element), or an access network element (for example, a gNB or a RAN)) in the second area in the second time period is in an idle state. For example, the first information in the second area in the second time period includes load of a network in the second area in the second time period, or load of a network element in the second area in the second time period. The load of the network in the second area in the second time period is used to indicate whether the network in the second area in the second time period is in an idle state. If the load of the network in the second area in the second time period indicates that the network in the second area in the second time period is in an idle state, it means that the network in the second area in the second time period has an idle resource. If the load of the network in the second area in the second time period indicates that the network in the second area in the second time period is in a non-idle state, it means that the network in the second area in the second time period does not have an idle resource.

It may be understood that the first information may alternatively be load information, for describing load of a network in the second area in the second time period. In other descriptions in embodiments of this application, the first information may be replaced with the load information. Details are not described again.

It may be understood that the quantity of terminals in the second area in the second time period is used to reflect a quantity of terminals that access the second area in the second time period. It should be noted that the quantity of terminals may be a real value (which may have undergone special processing, for example, normalization processing) at a time point (timestamp) or an average value or a variance in a time period (time window, time interval, or time period). For any description of a quantity of terminals in embodiments of this application, refer to understanding herein. Details are not described subsequently.

For example, the load of the network in the second area in the second time period may be at least one of a congestion level of the network in the second area in the second time period, a load level (slice load level) of the network in the second area in the second time period, or network performance in the second area in the second time period. For specific implementation of step 502, refer to a step in FIG. 6. Details are not described herein.

Step 503. The data analytics network element sends the first network performance information in the second area to the first network element. Correspondingly, the first network element receives the first network performance information in the second area from the data analytics network element.

Optionally, the data analytics network element sends one or more pieces of first network performance information and information about a second area corresponding to each of the one or more pieces of first network performance information to the first network element. Correspondingly, the first network element receives, from the data analytics network element, the one or more pieces of first network performance information and the information about the second area corresponding to each of the one or more pieces of first network performance information.

In a possible implementation, the first information in this embodiment of this application includes one or more of the following information of the network in the second area in the second time period: a session creation success rate, a terminal handover success rate, a terminal registration success rate, resource usage of a base station or a core network element, a usage ratio of the base station or the core network element, and load of the base station or the core network element. It should be noted that the session creation success rate, the terminal handover success rate, the terminal registration success rate, the resource usage of the base station or the core network element, the usage ratio of the base station or the core network element, and the load of the base station or the core network element each may be a real value (which may have undergone special processing, for example, normalization processing) at a time point (timestamp) or an average value or a variance in a time period (time window, time interval, or time period). For the first information in embodiments of this application, refer to understanding herein. Details are not described subsequently.

The session creation success rate in this embodiment of this application may be obtained based on a total quantity of sessions created by the network in the second area in the second time period and a quantity of successfully created sessions in the second area in the second time period. For example, the quantity of successfully created sessions is divided by the total quantity of sessions created by the network in the second area in the second time period, to obtain the session creation success rate. The terminal handover success rate may be determined by a quantity of terminals handed over in the second area in the second time period and a quantity of terminals successfully handed over in the second area in the second time period. For example, the quantity of terminals successfully handed over is divided by the quantity of terminals handed over, to obtain the terminal handover success rate. The resource usage of the base station or the core network element may be determined by a total quantity of resources that the base station or the core network element in the second area has in the second time period and a quantity of resources used by the base station or the core network element in the second area in the second time period. For example, the quantity of resources used by the base station or the core network element in the second area in the second time period is divided by the total quantity of resources that the base station or the core network element in the second area has in the second time period, to obtain the resource usage of the base station or the core network element. The terminal registration success rate may be determined by a total quantity of terminals registered in the second area in the second time period and a quantity of terminals successfully registered in the second area. For example, the quantity of terminals successfully registered in the second area in the second time period is divided by the total quantity of terminals registered in the second area in the second time period, to obtain the terminal registration success rate.

Step 504. The first network element determines a first policy based on the first network performance information.

The first policy in this embodiment of this application is a policy used when a terminal transmits uplink background data (BD), or the first policy is a policy used when a service server transmits downlink background data (BD) to the terminal. The background data in this embodiment of this application may also be referred to as background traffic.

An uplink background data transfer scenario is described by using an example. For example, when a vehicle is delivered from a factory, a vehicle control center of a vehicle enterprise may install a subscriber identity module (SIM) card on a vehicle-mounted device of the vehicle. In a running process of the vehicle, the vehicle-mounted device may store information such as driving map information and a running status of the vehicle, and then transmit the information to the vehicle control center, to help the vehicle control center make a high-definition map and track a running status of an engine in real time. The information is used for further analytics, for example, driving route planning during self-driving and engine improvement.

In this embodiment of this application, both the uplink background data and the downlink background data are traffic generated in a transmission process of service data that has no requirement on (or is insensitive to) transmission timeliness. Alternatively, the background data is traffic generated in a transmission process of service data that has no requirement on transmission timeliness but has a high requirement on (or is sensitive to) tariffs. Alternatively, a network slice used for background data transfer has no SLA requirement, that is, provided that the network slice allows background data transfer, there is no transmission quality (for example, transmission delay or transmission bandwidth) requirement. Therefore, the background data may be transmitted when the network slice is in an idle state.

In a possible implementation, the first policy in this embodiment of this application is a first policy for a third area. The third area includes one or more second areas. There are one or more third areas. The first policy for the third area includes one or more background data transfer policies.

The background data transfer policy in this embodiment of this application includes one or more of the following information: a recommended time window, a charging rate, and a maximum aggregated bitrate. The recommended time window is a time window in which the network recommends transmitting background data in the third area. The charging rate is determined by the network for transmitting background data in the recommended time window, for example, fees generated by traffic per MB (MByte, MB). The maximum aggregated bitrate indicates a maximum bandwidth for transmitting background data in the recommended time window.

To reduce tariffs generated during background data transfer, in this embodiment of this application, the terminal may transmit background data when the network is in an idle state. Therefore, that the first network element determines the first policy based on the first network performance information includes: If the first network element determines, based on the first network performance information, that the network in the second area is in an idle state in the second time period, the first network element determines that the recommended time window included in the first policy is the second time period. In addition, if a quantity of terminals that need to transmit background data in the second area is 5000, and the first network element determines, based on the first network performance information in the second area, that the second area can accommodate 4000 terminals for transmitting background data in time period 1 but the second area can accommodate 5500 terminals for transmitting background data in time period 2, the first network element determines that the recommended time window included in the first policy is time period 2.

Specifically, the first network element determines, based on first network performance information in area 1, that a network serving area 1 is in an idle state in a time period from 00:00 to 01:00, that is, the network serving area 1 has an idle resource that can be used to transmit background data in the time period from 00:00 to 01:00. The first network element may use the time period from 00:00 to 01:00 as a background data transfer policy for area 1. The first network element determines, based on first network performance information in area 2, that a network serving area 2 is in an idle state in a time period from 01:00 to 03:00, that is, the network serving area 2 has an idle resource that can be used to transmit background data in the time period from 01:00 to 03:00. The first network element may use the time period from 01:00 to 03:00 as a background data transfer policy for area 2.

In this embodiment of this application, a plurality of background data transfer policies corresponding to a same area are different. For example, the plurality of background data transfer policies include background data transfer policy 1 and background data transfer policy 2. In this case, a recommended time window included in background data transfer policy 1 is time window 1, and a recommended time window included in background data transfer policy 2 is time window 2.

For example, if the first network performance information in the second area includes network performance information in the second area in time period 1 and network performance information in the second area in time period 2, the first network element may determine background data transfer policy 1 for the second area based on the network performance information in the second area in time period 1, and the first network element determines background data transfer policy 2 for the second area based on the network performance information in the second area in time period 2. In this way, the first network element can determine that the first policy for the third area includes background data transfer policy 1 and background data transfer policy 2.

In a possible implementation, that the third area includes one second area in this embodiment of this application may be understood as that the third area and the second area are a same area, in other words, the second area is the third area. In this way, the first network element determines the first network performance information in the second area in the second time period as the first network performance information in the third area. Then, the first network element determines the first policy for the third area based on the first network performance information in the third area in the second time period.

In a possible implementation, in this embodiment of this application, the third area includes a plurality of second areas, and the plurality of second areas have same first network performance information in the second time period. That the third area includes a plurality of second areas may be understood as that the third area is obtained by aggregating the plurality of second areas. In this case, the first network performance information in the third area in the second time period may be the first network performance information common to the plurality of areas in the second time period.

For example, the first area includes a plurality of second areas, and the second time period is time period 2. For example, the plurality of second areas are TA1, TA2, and TA3, where first network performance information in TA1 in time period 2 is the same as first network performance information in TA2 in time period 2, and first network performance information in TA3 in time period 2 is different from first network performance information in TA1 in time period 2. In this case, TA1 and TA2 may be aggregated to obtain a third area (for example, TA12). In this case, the first network element may determine the first network performance information in TA1 in time period 2 or the first network performance information in TA2 in time period 2 as first network performance information in TA12. Then, the first network element determines a first policy for TA12 based on the first network performance information in TA12. Then, terminals in TA1 and TA2 may transmit background data according to the first policy for the TA12. In addition, the first network element may use TA3 as the third area, and determine a first policy for TA3 based on the first network performance information in TA3 in time period 2.

For example, the first area includes a plurality of second areas. For example, the plurality of second areas are TA1, TA2, and TA3, and first network performance information in TA1, TA2, and TA3 is different from each other, but the first network performance information in TA1 is the lowest or highest in the first network performance information in TA1, TA2, and TA3. In this case, the first network element may use the first network performance information in TA1 as the first network performance information in TA2 and TA3. In this case, TA1 to TA3 have same network performance information.

This embodiment of this application provides the policy determining method. In the method, the first network element requests the network performance information in the first area in the first time period from the data analytics network element by using the first request. Then, the data analytics network element feeds back the first network performance information in each of the one or more second areas included in the first area to the first network element based on the first request, where the first network performance information includes the first information in the second area in the second time period or the quantity of terminals in the second area in the second time period. In this way, the first network element determines the first policy based on the first network performance information in the subarea. In this solution, the first network element requests network performance information in a large range (for example, the first area or the first time period) from the data analytics network element. However, the data analytics network element provides the first network element with first network performance information in different areas (for example, one or more second areas) included in the first area or different second time periods (for example, one or more second time periods) included in the first time period. This can help the first network element formulate, by using a subarea as a granularity, the first policy more accurately based on first network performance information in the subarea, and ensure that a background data transfer policy formulated for the subarea in a sub-period meets a requirement of the subarea in the sub-period, thereby resolving a problem of network resource congestion or network resource waste in some areas in some time periods, saving resources, and improving transmission efficiency.

It should be noted that, if a part of the plurality of second areas included in the first area have same first network performance information, and the other part of second areas have different first network performance information, for the second areas that have the same first network performance information, the data analytics network element may send, to the first network element, the first network performance information and information about the part of second areas associated with the first network performance information. In this way, the first network element may determine that the part of second areas have same first network performance information. Compared with a case in which first network performance information in all second areas is sent regardless of whether the first network performance information in the second areas is the same, this solution can reduce signaling overheads.

If a plurality of subareas may be aggregated into the first area, and the first area is divided into a plurality of subareas by the first network element, the information about the first area in the first request may be replaced with information about one or more second areas. In other words, the first network element requests, from the data analytics network element, network performance information in each of one or more subareas included in the first area.

Figure 6:
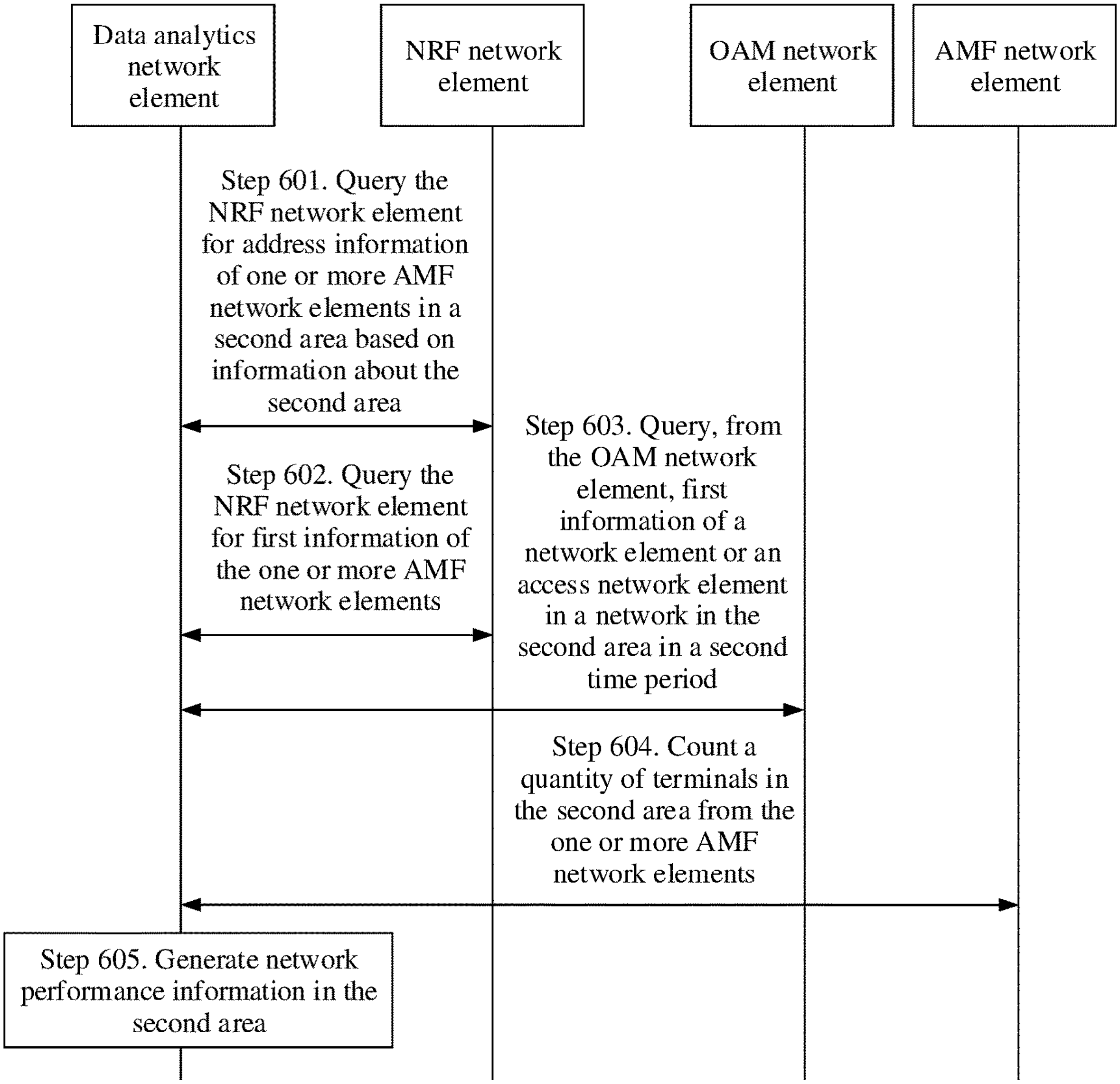
FIG. 6 is a schematic flowchart of determining network performance information by a data analytics network element according to an embodiment of this application.

FIG. 6 shows a process in which a data analytics network element determines first network performance information in a second area according to an embodiment of this application. The method includes the following steps.

Step 601. A data analytics network element queries an NRF network element for address information of one or more AMF network elements in a second area based on information about the second area.

For example, the data analytics network element sends a query request message 1 to the NRF network element, where the query request message 1 includes the information about the second area. The query request message 1 is used to query the address information or an identifier of the one or more AMF network elements in the second area.

Step 602. The data analytics network element queries the NRF network element for first information of the one or more AMF network elements.

For example, the data analytics network element sends a query request message 2 to the NRF network element, where the query request message 2 includes the information about the second area. The query request message 2 is used to query the first information of the one or more AMF network elements in the second area, or the query request message 2 includes the identifier of the one or more AMF network elements.

Step 603. The data analytics network element queries, from an OAM network element, first information of a network element (including a core network element (for example, a UPF network element, an AMF network element, or an SMF network element) or an access network element (for example, a next generation NodeB (gNB))) in a network serving the second area in a second time period, a first time period, or another different time period.

Step 604. The data analytics network element counts a quantity of terminals in the second area from the one or more AMF network elements.

It may be understood that the quantity of terminals in the second area may be understood as a quantity of terminals that access or register with a network in the second area. Alternatively, the quantity of terminals in the second area may be understood as a quantity of terminals that access the network in the second area in a specified time period (for example, a first time period or a second time period).

Step 605. The data analytics network element generates network performance information in the second area based on the first information of the network element (including the core network element (for example, a UPF network element, an AMF network element, or an SMF network element) or the access network element (for example, a gNB)) in the second time period and/or a quantity of terminals served by the one or more AMF network elements.

In a possible embodiment, before step 501, the method provided in embodiments of this application may further include: The first network element determines that the network performance information in the first area in the first time period needs to be obtained.

In a possible embodiment, that the first network element determines that the network performance information in the first area in the first time period needs to be obtained may be implemented in the following manner: The first network element has requirement information, where the requirement information is used to indicate that the network performance information in the first area in the first time period needs to be obtained. For example, the requirement information includes the information about the first time period and the information about the first area.

Figure 7A:
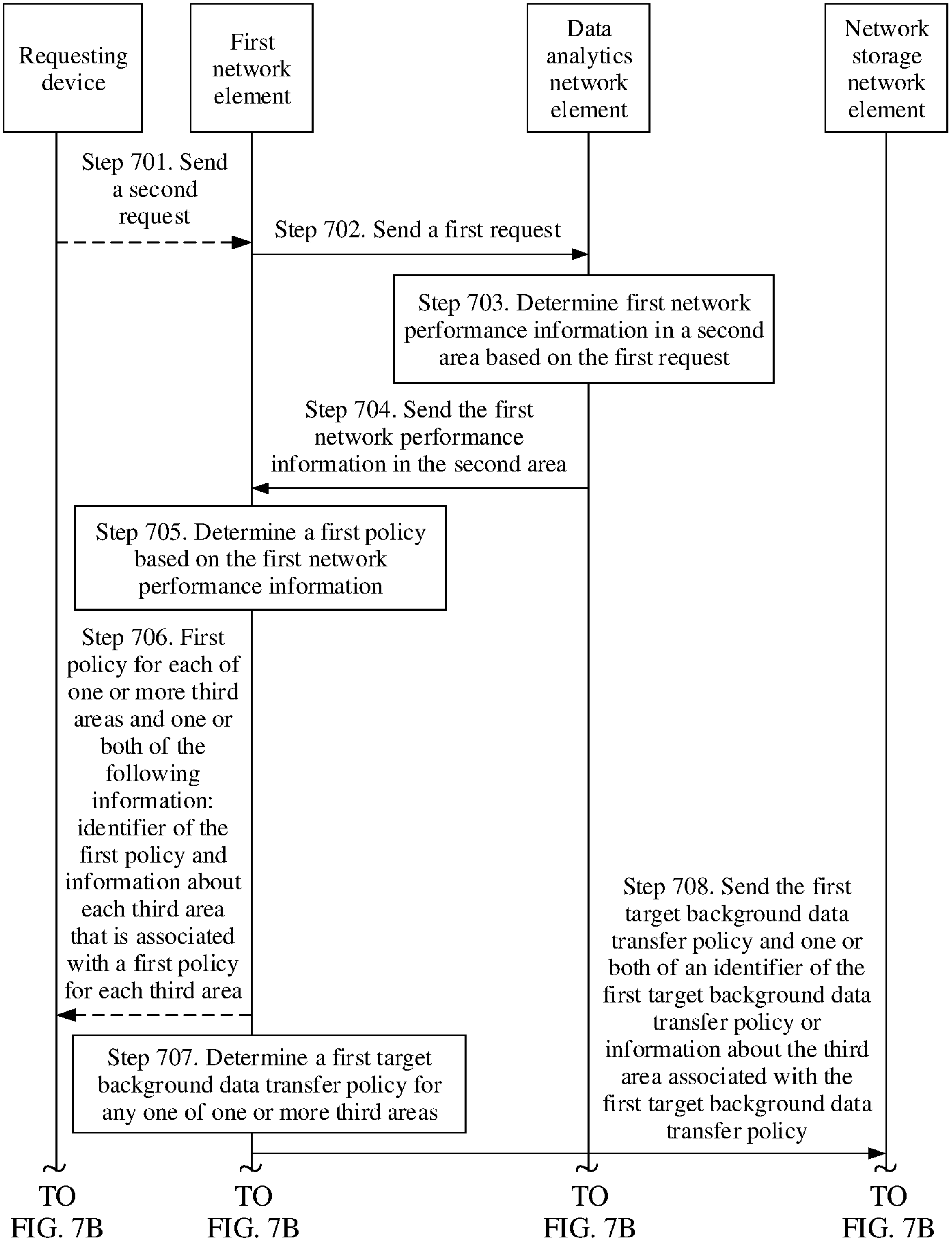
FIG. 7A and FIG. 7B are a schematic flowchart of another policy determining method according to an embodiment of this application.
Figure 7B:
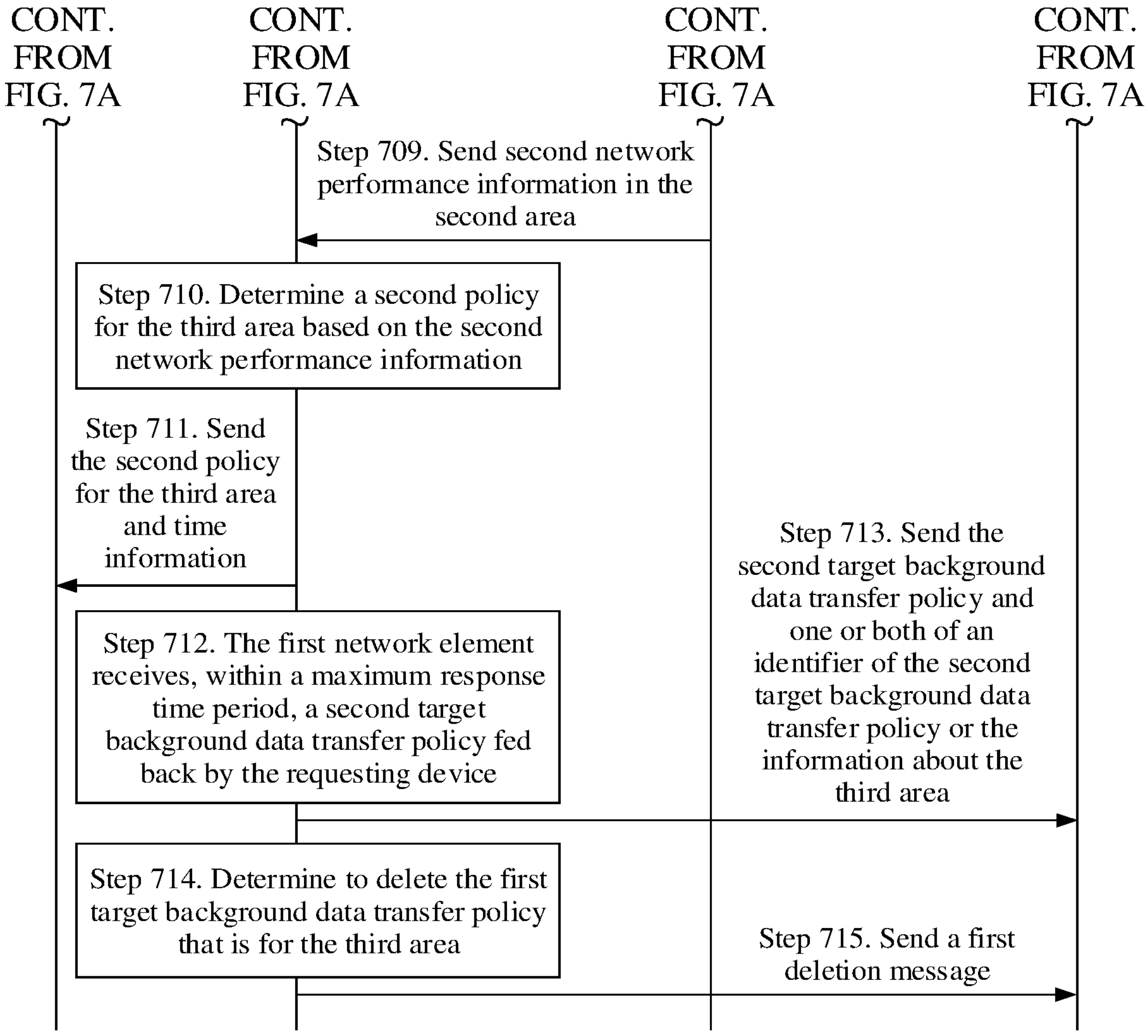

In a possible embodiment, that the first network element determines that the network performance information in the first area in the first time period needs to be obtained may be implemented by using the following step 701:

In a possible embodiment, as shown in FIG. 7A and FIG. 7B, the method provided in this embodiment of this application includes step 701 to step 715. Step 701. A requesting device sends a second request to the first network element. Correspondingly, the first network element receives the second request from the requesting device. The second request is for requesting a background data transfer policy corresponding to the first area, and the second request includes the information about the first area and the information about the first time period.

In a possible implementation, the second request may further include one or more of the following information in the first area: a quantity of terminals, an amount of data transmitted by each terminal, an identifier of the requesting device, and a group identifier of the terminal.

It may be understood that the group identifier of the terminal may be an internal group identifier, or may be an external group identifier. If the group identifier is an external group identifier, the requesting device sends the external group identifier to an NEF network element, and the NEF network element converts the external group identifier into an internal group identifier. The group identifier of the terminal is used to determine a group to which the terminal belongs. The group to which the terminal belongs includes one or more terminals.

For example, the requesting device may be a terminal or an AF network element. The second request carries third indication information, where the third indication information is for requesting the background data transfer policy corresponding to the first area. Alternatively, the information about the first area is used to determine the first area. For example, the information about the first area may be an identifier of the first area, or the information about the first area is an identifier of a terminal that needs to transmit background data in the first area.

It may be understood that, in step 701, the first network element may determine, based on the second request, that the network performance information in the first area in the first time period needs to be obtained.

It should be noted that if the first area is divided by the first network element (for example, a PCF network element) or the NEF network element, the information about the first area included in the second request may be replaced with information about one or more second areas.

It should be noted that if the first time period is divided by the first network element (for example, a PCF network element) or the NEF network element, the information about the first time period included in the second request may be replaced with information about one or more second time periods.

Correspondingly, in step 501, the first request sent by the first network element to the data analytics network element may carry the information about the one or more second areas and/or the information about the one or more second time periods. In this way, the data analytics network element does not need to further obtain a subarea and/or a sub-period through division. In addition, the first network element may obtain the network performance information in the second areas in the second time period from the data analytics network element.

Step 702 to step 705 are the same as step 501 to step 504. Details are not described herein again.

In a possible implementation, if the first network element is a PCF network element, and the requesting device is an AF network element or a terminal, after step 705, the method provided in this embodiment of this application may further include the following step.

Step 706. The first network element sends a first policy for each of one or more third areas and one or both of the following information to the requesting device: an identifier of the first policy and information about each third area that is associated with a first policy for the third area. Correspondingly, the requesting device receives, from the first network element, the first policy for each of the one or more third areas and one or both of the following information: the identifier of the first policy and the information about each third area that is associated with the first policy for the third area.

It may be understood that, in step 706, the first network element sends, to the requesting device, the information about each third area and the first policy corresponding to each third area. Based on step 706, the requesting device can determine the first policy determined by the first network element for each third area.

In a possible embodiment, after the first network element provides the first policy that is for each of the one or more third areas for the requesting device, as shown in FIG. 7A and FIG. 7B, the method provided in this embodiment of this application may further include the following steps.

Step 707. The first network element determines a first target background data transfer policy for any one of the one or more third areas, where the first target background data transfer policy is one of one or more background data transfer policies for the third area.

In a possible implementation, step 707 in this embodiment of this application may be implemented in the following manner: If the first policy for any third area includes one background data transfer policy, the first network element determines the background data transfer policy as the first target background data transfer policy that is for the third area.

In a possible implementation, step 707 in this embodiment of this application may be implemented in the following manner: If the first policy for the third area includes a plurality of background data transfer policies, the first network element receives the first target background data transfer policy from the requesting device. In other words, when the first policy for the third area includes a plurality of background data transfer policies, the first target background data transfer policy is selected by the requesting device.

Step 708. The first network element sends the first target background data transfer policy and one or both of the following information to a network storage network element: an identifier of the first target background data transfer policy and information about the third area associated with the first target background data transfer policy. Correspondingly, the network storage network element receives the first target background data transfer policy and one or both of the following information from the first network element: the identifier of the first target background data transfer policy and the information about the third area associated with the first target background data transfer policy.

In a possible implementation, if the requesting device is an AF network element, after the requesting device determines the first target background data transfer policy, the requesting device may send the first target background data transfer policy to one or more terminals in the third area, so that the one or more terminals in the third area transmit background data according to the first target background data transfer policy. Alternatively, the requesting device obtains the first target background data transfer policy from the network storage network element via the first network element according to the identifier of the first target background data transfer policy and/or the information about the third area, and then the first network element sends the first target background data transfer policy to the terminal according to a UE route selection policy (URSP).

It may be understood that if there are a plurality of third areas, the first network element stores a first target background data transfer policy that is for each third area in the network storage network element. In this embodiment of this application, the first network element stores the first target background data transfer policy that is for any third area in the network storage network element, to subsequently query the network storage network element for the first target background data transfer policy that is for any third area. For example, for terminal A that newly joins a third area, the first network element may obtain a first target background data transfer policy for the third area from the network storage network element based on an identifier of the first target background data transfer policy and/or information about the third area. Then, the first network element feeds back the first target background data transfer policy that is for the third area to terminal A.

In a possible embodiment, as shown in FIG. 7A and FIG. 7B, the method provided in this embodiment of this application may further include the following steps.

Step 709. The data analytics network element sends second network performance information in the second area to the first network element. Correspondingly, the first network element receives the second network performance information in the second area from the data analytics network element. The second network performance information is updated network performance information in the second area.

In a possible implementation, the second network performance information is updated network performance information in the second area relative to the first network performance information. The updated network performance information includes upgraded network performance information or degraded network performance information.

For example, in this embodiment of this application, network performance in the second area reflected by the second network performance information is poorer than network performance in the second area reflected by the first network performance information. In other words, compared with the first network performance information, the second network performance information is degraded network performance information. For example, average load (or resource usage, where the resource is a memory, a CPU, a hard disk, or a physical resource block (physical resource block, PRB)), reflected by the first network performance information, of a gNB or a UPF network element of a network in the second area in the second time period is 80%, and average load (or resource usage, where the resource is a memory, a CPU, a hard disk, or a PRB), reflected by the second network performance information, of the gNB or the UPF of the network in the second area in the second time period is 90%. Alternatively, a quantity of terminals, reflected by the first network performance information, of the network in the second area is 500 in the second time period, and a quantity of terminals, reflected by the second network performance information, of the network in the second area is 800 in the second time period.

It may be understood that the second area in step 709 is an area, in the one or more second areas, in which network performance information changes.

In a possible implementation, the second network performance information is network performance information, in the second area, updated in a third time period relative to the first network performance information, where the third time period may not be a sub-period of the first time period, or may not be in a range of the first time period.

Step 710. The first network element determines a second policy for the third area based on the second network performance information, where the second policy for the third area includes one or more background data transfer policies.

It may be understood that the second policy for the third area is an updated policy for the third area.

It should be noted that, if the third area is obtained by aggregating a plurality of second areas, but network performance information in only some second areas in the plurality of second areas degrades, the first network element needs to re-aggregate one or more the third area to obtain a fourth area. In this case, the first network element determines a second policy for a fourth area based on the second network performance information, where the second policy for the fourth area includes one or more background data transfer policies. In this case, the third area in step 711 to step 715 may be replaced with the fourth area. Details are not described below again. Alternatively, the first network element determines, based on the network performance information in the some second areas, one or more updated background data transfer policies for the some second areas, where a background data transfer policy for a remaining area in which network performance information does not change remains unchanged.

For example, an aggregated TA is obtained by aggregating TA1 and TA2. If one or more background data transfer policies for the aggregated TA include BDT1 and BDT2, and network performance information in TA2 subsequently degrades, the first network element determines, based on updated network performance information in TA2, that BDT policies for TA2 are BDT3 and BDT4, where BDT policies for TA1 are still BDT1 and BDT2. This is because network performance information in TA1 does not change and the BDT policies for the aggregated TA to which TA1 belongs may be determined as the BDT policies for TA1. Alternatively, if the network performance information in TA2 degrades, and the first network element determines, based on the updated network performance information in TA2, that the network performance information in TA1 is the same as the updated network performance information in TA2, TA1 and TA2 may still be aggregated to obtain the aggregated TA. Then, the BDT policies for the aggregated TA are determined based on the updated network performance information in TA2.

The foregoing example describes a manner of updating only a BDT policy that is for an aggregated TA or a sub-TA when network performance information in the sub-TA included in the aggregated TA degrades. In other words, the first network element does not update a BDT policy for another aggregation TA. Certainly, when network performance information in a sub-TA included in an aggregated TA degrades, the first network element may alternatively re-aggregate all aggregation TAs, to determine an updated BDT policy for each aggregation TA obtained through re-aggregation.

In a possible implementation, the method provided in this embodiment of this application further includes: If the first network element determines, based on the second network performance information, that the first policy for the third area is unavailable, but cannot determine the second policy for the third area based on the second network performance information, the first network element may not delete the first policy for the third area that is stored in the network storage network element. In other words, the first network element needs to reserve the first policy for the third area that is stored in the network storage network element. In this way, when the first network element cannot determine the second policy for the third area, the first policy for the third area is still available.

In a possible embodiment, when the first network element can determine the second policy for the third area based on the second network performance information, refer to FIG. 7A and FIG. 7B. After step 710, the method provided in this embodiment of this application may further include the following step.

Step 711. The first network element sends the second policy for the third area and time information to the requesting device. Correspondingly, the requesting device receives the second policy for the third area and the time information from the first network element. Alternatively, when the first network element sends the second policy for the third area to the requesting device, the first network element sets time information. Correspondingly, the requesting device receives the second policy for the third area from the first network element. The time information (for example, a timer or a time window) is used to indicate a maximum response time period of the requesting device for the second policy that is for the third area.

In a possible implementation, the second policy for the third area and the time information may be carried in a same message, or may be carried in different messages. In this embodiment of this application, if the first network element and the requesting device negotiate about the maximum response time period in advance, or the maximum response time period is predefined in a protocol, the time information in step 711 may be omitted.

In a possible embodiment, as shown in FIG. 7A and FIG. 7B, the method provided in this embodiment of this application may further include step 712 and step 713.

Step 712. The first network element receives, in the maximum response time period, a second target background data transfer policy fed back by the requesting device, where the second target background data transfer policy is one of the plurality of background data transfer policies included in the second policy.

For example, the first network element receives, in the maximum response time period, an acknowledgment message fed back by the requesting device, where the acknowledgment message is used to indicate that the requesting device selects the second target background data transfer policy from the plurality of background data transfer policies included in the second policy.

Step 713. The first network element sends the second target background data transfer policy and one or both of an identifier of the second target background data transfer policy and the information about the third area to the network storage network element.

It may be understood that, by performing step 713, the first network element may update (or replace) the first target background data transfer policy to (or with) the second target background data transfer policy based on the identifier of the second target background data transfer policy or the information about the third area.

In a possible embodiment, as shown in FIG. 7A and FIG. 7B, the method provided in this embodiment of this application may further include step 714 and step 715. Step 714. The first network element determines to delete the first target background data transfer policy for the third area.

In a possible implementation, step 714 in this embodiment of this application may be implemented in the following manner: If the first network element does not receive, from the requesting device in the maximum response time period, the second target background data transfer policy selected by the requesting device from the plurality of background data transfer policies included in the second policy, the first network element determines to delete the first target background data transfer policy for the third area.

In another possible implementation, step 714 in this embodiment of this application may be implemented in the following manner: The requesting device sends first indication information to the first network element, where the first indication information is used to indicate that the requesting device has not selected a target background data transfer policy from the plurality of background data transfer policies included in the second policy. Correspondingly, if the first network element receives the first indication information from the requesting device, the first network element determines, based on the first indication information, to delete the first target background data transfer policy that is for the third area.

In a possible implementation, the first indication information is sent by the requesting device to the first network element in the maximum response time period. In other words, if the first network element receives the first indication information from the requesting device in the maximum response time period, the first network element determines, based on the first indication information, to delete the first target background data transfer policy that is for the third area. It should be understood that, if the first network element does not send the time information to the requesting device when sending the second policy for the third area to the requesting device, the requesting device does not need to feed back on the second policy for the third area in the maximum response time period.

In a possible implementation, that the first network element determines to delete the first target background data transfer policy that is for the third area includes: After the first network element sends the second policy for the third area to the requesting device, if the first network element determines that the requesting device has not selected a target background data transfer policy from the second policy for the third area, the first network element determines to delete the first target background data transfer policy that is for the third area.

For example, that the first network element determines that the requesting device has not selected a target background data transfer policy from the second policy for the third area includes: If the first network element determines that feedback indicating that the requesting device selects a target background data transfer policy from the second policy for the third area is not received, the first network element determines that the requesting device has not selected a target background data transfer policy from the second policy for the third area. Alternatively, the first network element determines, based on the first indication information, that the requesting device has not selected a target background data transfer policy from the second policy for the third area.

In a possible implementation, it is assumed that the updated second network performance information in the second area in step 709 is network performance information in the second area that is obtained by updating the first network performance information in the third time period, where the third time period may not be a sub-period of the first time period, or may not be in the range of the first time period. In this case, a recommended transmission time window in the one or more background data transfer policies in the second policy, for the third area, determined by the first network element in step 710 may not be a sub-period of the first time period or may not be in the range of the first time period. Further, the requesting device may not select the second target background data transfer policy from the second policy for the third area. Therefore, the requesting device sends the first indication information or does not send the second target background data transfer policy to the first network element in the maximum response time period.

Step 715. The first network element sends a first deletion message to the network storage network element. Correspondingly, the network storage network element receives the first deletion message from the first network element.

The first deletion message is used to indicate the network storage network element to delete the first target background data transfer policy that is for the third area.

For example, the first deletion message may include fourth indication information, and the fourth indication information is used to indicate the network storage network element to delete the first target background data transfer policy that is for the third area. For example, the first deletion message may further carry the identifier of the first target background data transfer policy or the information about the third area.

It should be understood that after the network storage network element receives the first deletion message, the network storage network element may delete the first target background data transfer policy that is for the third area. It should be noted that, if the network storage network element is a storage device inside the first network element, the first network element may delete the first target background data transfer policy that is for the third area.

Figure 8A:
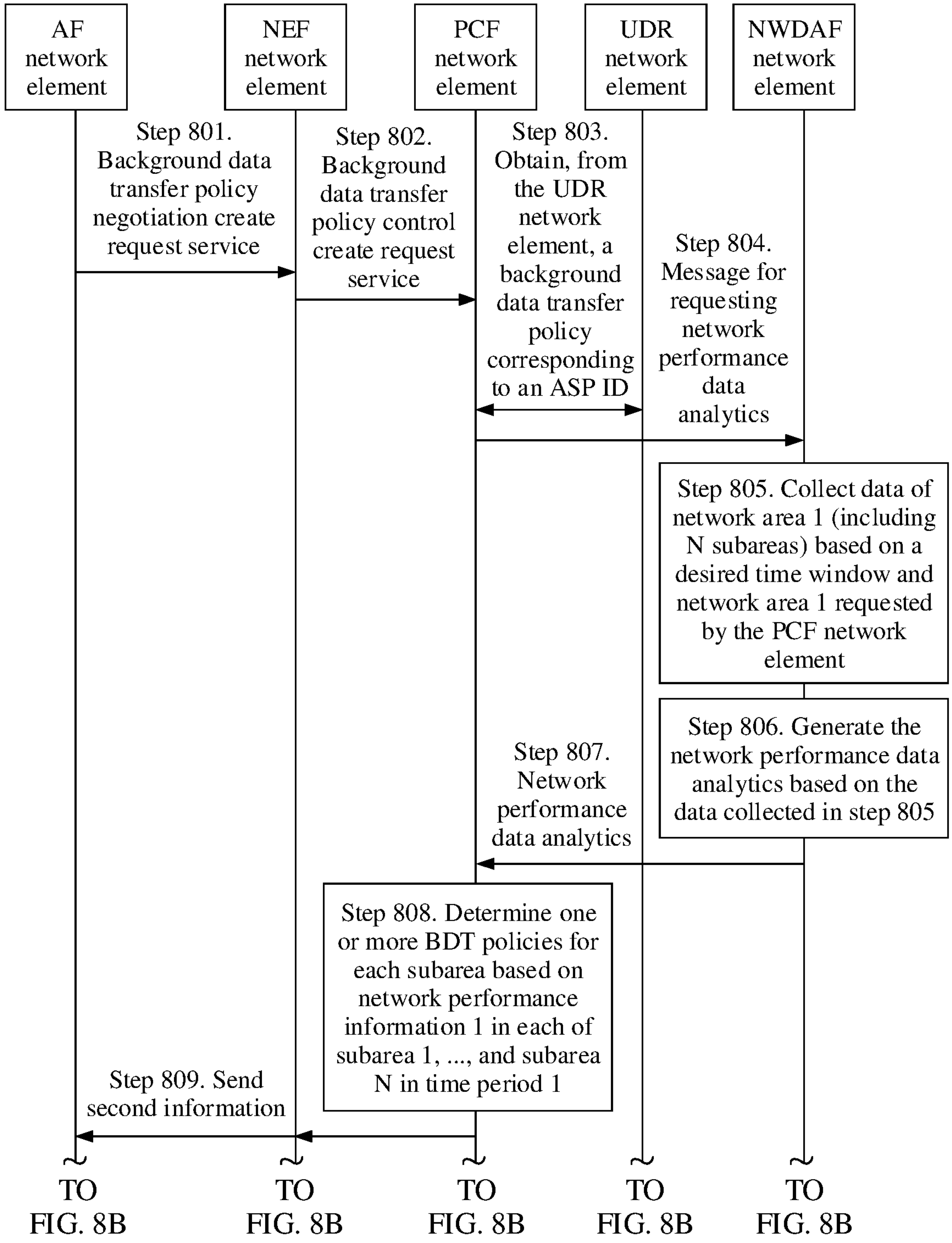
FIG. 8A to FIG. 8C are a schematic diagram of a specific embodiment of determining a background data transfer policy according to an embodiment of this application.
Figure 8B:
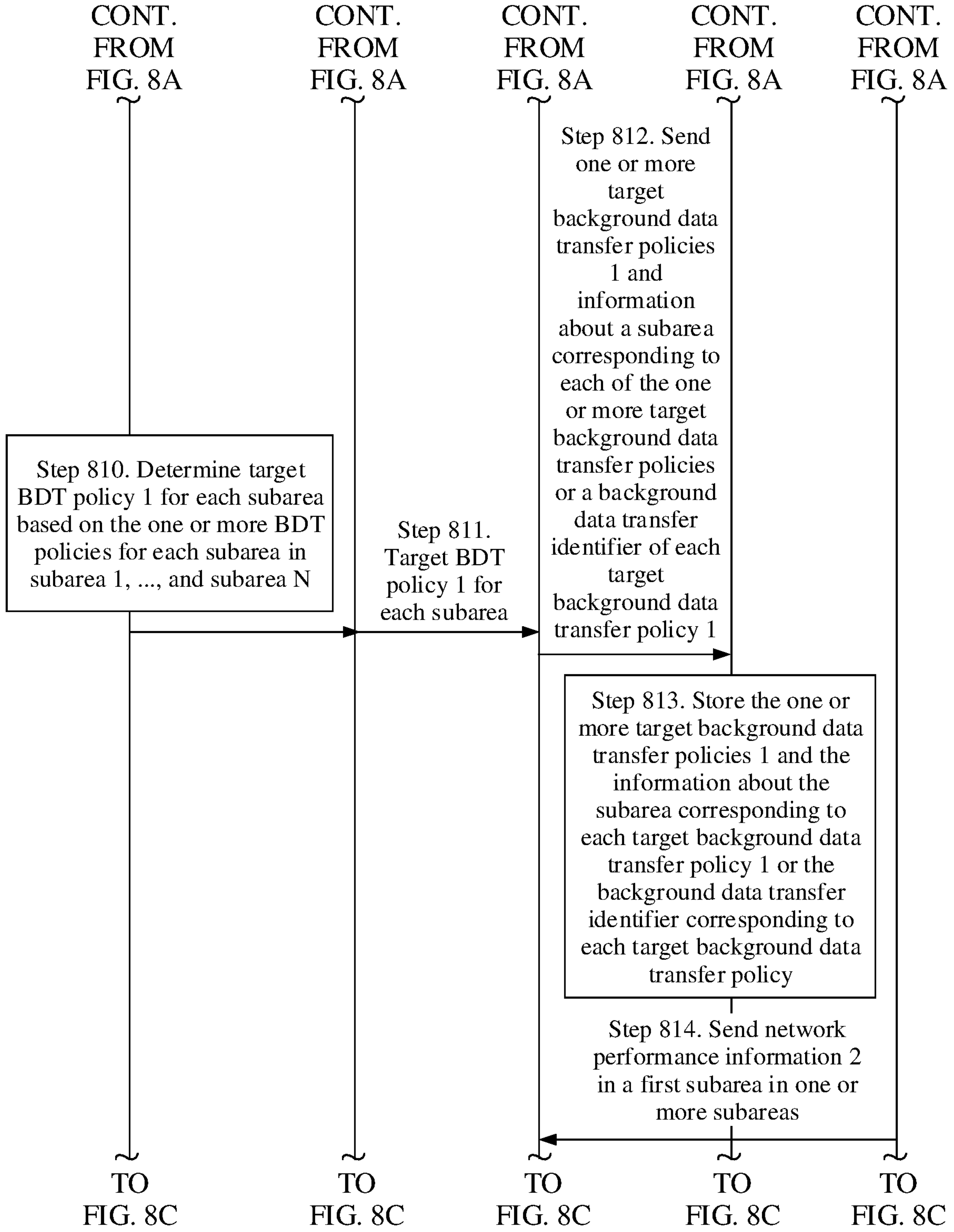
Figure 8C:
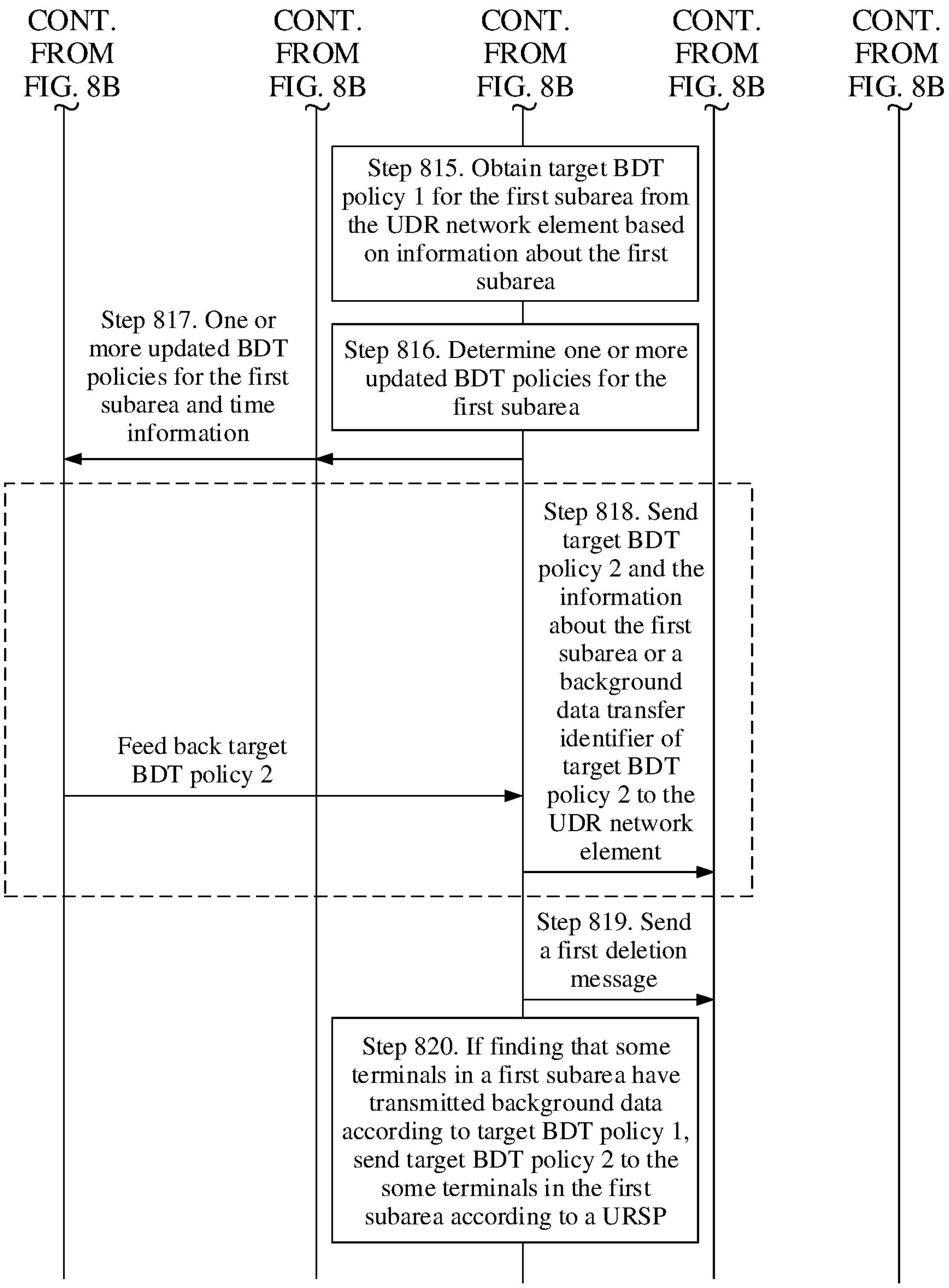

FIG. 8A to FIG. 8C specifically describe a background data transfer policy determining method by using an example in which the requesting device is an AF network element, the data analytics network element is an NWDAF network element, the first network element is a PCF network element, the network storage network element is a UDR network element, the first area is a network area 1, and the second area is any one or more of subarea 1 to subarea N, that is, a quantity of subareas is N. The method includes the following steps.

Step 801. An AF network element sends a background data transfer policy negotiation create request (Nnef_BDTPNegotiation_Create Request) service to an NEF network element. Correspondingly, the NEF network element receives the Nnef_BDTPNegotiation_Create request service from the AF network element.

The Nnef_BDTPNegotiation_Create request service indicates that the AF network element may trigger a BDTPNegotiation_Create request service operation to the NEF network element through an interface between the AF network element and the NEF network element. In other words, in this embodiment of this application, the BDTPNegotiation_Create request service triggered by the AF network element to the NEF network element through the interface between the AF network element and the NEF network element may be described as an Nnef_BDTPNegotiation_Create request service operation. For various services exchanged between other network elements, refer to descriptions herein. Details are not described subsequently.

The BDTPNegotiation_Create request service is for requesting a background data transfer policy (Background Data Transfer Policy), and the BDTPNegotiation_Create request service carries background data transmission requirement information. The background data transmission requirement information is used to indicate a background data transfer policy desired by the AF network element.

It may be understood that the BDTPNegotiation_Create request service is a form used by the AF network element to send the background data transmission requirement information to the NEF network element. Certainly, the background data transmission requirement information may alternatively be carried in an Nnef_Trigger_Delivery request service or other information exchanged between the AF network element and the NEF network element. This is not limited in this embodiment of this application.

For example, content of the background data transmission requirement information is listed in Table 1:

TABLE 1 background data transmission requirement information

| Information | Data source | Description |
|---|---|---|
| Application service provider identifier (ASP ID) | AF network element | Identifies a service server, for example, the vehicle control center of XX automobile enterprise |
| volume per UE | AF network element | Volume of background data to be transmitted by each terminal |
| Quantity of terminals (Number of UEs) | AF network element | Quantity of terminals that need to transmit background data |
| Desired time window | AF network element | Time window, desired by a service server, for transmitting background data |
| Network area information (Optional) | AF network element | For determining network area 1 in which a terminal that needs to transmit background data is located |

Optionally, the BDTPNegotiation_Create request service further carries indication information x (corresponding to the foregoing third indication information), and the indication information x is used to indicate to request a background data transfer policy.

It may be understood that the NEF network element is an example of a network exposure function network element, and the NEF network element in step 801 and step 802 may be alternatively replaced with another network exposure function network element. This is not limited in this embodiment of this application.

Step 802. The NEF network element sends a background data transfer policy control create request (Npcf_BDTPolicyControl_Create Request) service to a PCF network element. Correspondingly, the PCF network element receives the Npcf_BDTPolicyControl_Create request service from the NEF network element.

The background data transfer policy control create request service carries the BDTPNegotiation_Create request service.

It should be noted that, if the AF network element does not send the network area information to the PCF network element, it indicates that the AF network element requests a background data transfer policy that is for an entire network from the PCF network element, that is, it indicates that the AF network element requests, from the PCF network element, background data transfer policies corresponding to all network areas served by the AF network element in the entire operator network. If the AF network element provides the network area information for the PCF network element, it indicates that the AF network element requests, from the PCF network element, the background data transfer policy that is for the network area 1 and that is determined by using the network area information.

It may be understood that, in the foregoing step, an example in which the AF network element sends the background data transmission requirement information to the PCF network element via the NEF network element. Certainly, the AF network element may alternatively send the background data transmission requirement information to the PCF network element through an interface between the AF network element and the PCF network element.

Step 803. If the PCF network element does not locally have a background data transfer policy corresponding to the ASP ID, the PCF network element obtains, from a UDR network element, the background data transfer policy corresponding to the ASP ID.

It may be understood that herein, the PCF network element mainly obtains historical background data transfer policies from the UDR network element based on the ASP ID, so that the PCF network element determines, based on first network performance information, whether these historical background data transfer policies are still valid. In other words, the background data transfer policies obtained herein may be used as an input for formulating one or more background data transfer policies in step 808.

In an example, that the PCF network element obtains, from the UDR network element, the background data transfer policy corresponding to the ASP ID may be implemented in the following manner: The PCF network element triggers a data management query request (Nudr_DM_Query Request) service operation to the UDR network element. Correspondingly, the UDR network element receives the Nudr_DM_Query request service operation from the PCF network element. The Nudr_DM_Query request service is for requesting the background data transfer policy corresponding to the ASP ID. For example, the Nudr_DM_Query request service carries an ASP identifier from the AF network element. Then, the UDR network element sends a data management query response (Nudr_DM_Query Response) service to the PCF network element. Correspondingly, the PCF network element receives the data management query response from the UDR network element. The data management query response includes a background data transfer policy that is being used by the server and that corresponds to the ASP ID.

It should be noted that if the PCF network element has the background data transfer policy corresponding to the ASP ID, step 803 may be omitted.

Step 804. The PCF network element sends, to an NWDAF network element, a message for requesting network performance data analytics. Correspondingly, the NWDAF network element receives, from the PCF network element, the message for requesting the network performance data analytics.

For example, the message for requesting the network performance data analytics may be a data analytics exposure subscribe (Nnwdaf_AnalyticsExposure_Subscribe) service, or the message for requesting the network performance data analytics may be a Npcf_PolicyAuthorization_Create request service.

The message for requesting the network performance data analytics carries an analytics identifier, an analytics filter, a desired time window, and a target of analytics reporting.

For example, the analytics ID is used to indicate that content requested by the PCF network element is network performance information, the analytics filter is network area 1, and the target of analytics reporting is accessing information about one or more terminals in network area 1.

It may be understood that the message for requesting a network performance data analytics is used by the PCF network element to request, from the NWDAF network element, a network performance data analytics corresponding to network area 1 in the desired time window.

For example, the message for requesting the network performance data analytics may further carry indication information y, and indication information y (corresponding to the second indication information in the foregoing embodiment) is used to indicate to request the network performance data analytics.

Step 805. The NWDAF network element collects data of network area 1 (including N subareas) based on the desired time window and network area 1 requested by the PCF network element.

Specifically, the NWDAF network element obtains, from an OAM network element, an NRF network element, and an AMF network element, data of each of the N subareas in a sub-period included in the desired time window.

For example, the data collected by the NWDAF network element in step 805 is listed in Table 2.

TABLE 2

| Input data for network performance analytics | | |
|---|---|---|
| Data Type | Data source | Description |
| Load and performance information | OAM network element | First information and performance information of a gNB or a RAN corresponding to each subarea in network area 1 |
| First information of a network element (for example, a UPF, an AMF, an SMF, or a PCF) | NRF network element | Reflects load of a network element (for example, a UPF, an AMF, an SMF, or a PCF) |
| Quantity of terminals (Number of UEs) | AMF network element | Quantity of terminals in each subarea in network area 1 |

Step 806. The NWDAF network element generates the network performance data analytics based on the data collected in step 805.

For example, the network performance data analytics is listed in the following Table 3.

TABLE 3

| Network performance data analytics | |
|---|---|
| Information | Description |
| List of network performance information (1 . . . N) | Includes network performance information 1 in each of the N subareas |
| Subset list (Area subset), for example, subarea 1, . . . , subarea N (where N is a positive integer) | Identifier of one or more subareas included in network area 1 |
| >>Analytics target period subset | Sub-period in the desired time window |
| >>gNB status information | Proportion of full-load gNBs (average value or variance) |
| >>gNB resource usage | Average resource usage (CPU, memory, and disk) (average value or variance) |
| >>Network function load (NF Load) | Network function load (average value or variance) |
| >>Quantity of terminals (Number of UEs) | Quantity of terminals (average value or variance) |
| >>Communication performance | PDU session creation (average value or variance) |
| >>Mobility performance | Terminal handover success rate (average value or variance) |

It may be understood that in step 806 in this embodiment of this application, the NWDAF network element divides network area 1 into N subareas (for example, subarea 1, . . . , and subarea N). Then, the NWDAF network element determines network performance analytics (including gNB status information, gNB resource usage, network function load (NF Load), a quantity of terminals (Number of UEs), communication performance, mobility performance, information about each subarea (per Area Subset), and a quantity of terminals in each subarea (Number of UE per Area Subset)) of a network in each of the N subareas in different time periods.

It may be understood that the network performance data analytics includes network performance information 1 of the network in each of subarea 1, . . . , and subarea N in time period 1.

Step 807. The NWDAF network element sends the network performance data analytics to the PCF network element. Correspondingly, the PCF network element receives the network performance data analytics from the NWDAF network element.

Specifically, the NWDAF network element triggers an Nnwdaf_AnalyticsSubscription_Notify service operation to the PCF network element, where the Nnwdaf_AnalyticsSubscription_Notify service operation carries network performance information 1 of the network in each of subarea 1, . . . , and subarea N in time period 1.

For example, time period 1 is a sub-period of the desired time window. For example, the desired time window is from Apr. 1, 2019 to Apr. 30, 2019. In this case, time period 1 may be 11:00 p.m. of each day to 7:00 a.m. of the next day from Apr. 1, 2019 to Apr. 30, 2019.

It should be noted that, in the N subareas, some subareas may correspond to different time periods 1, or some other subareas may correspond to same time period 1. For example, time period 1 of subarea 1 may be 11:00 p.m. of each day to 7:00 a.m. of the next day from Apr. 1, 2019 to Apr. 3, 2019, and time period 1 of subarea 2 may be 11:00 p.m. of each day to 7:00 a.m. of the next day from Apr. 2, 2019 to Apr. 4, 2019. Time periods 1 corresponding to different subareas in the N subareas may be the same. For example, the NWDAF network element provides the PCF network element with network performance analytics of the network in each of subarea 1 to subarea N from 11:00 p.m. of each day to 7:00 a.m. of the next day from Apr. 1, 2019 to Apr. 30, 2019.

Certainly, there may alternatively be one or more time periods 1, and the one or more time periods 1 may be consecutive or inconsecutive. For example, the NWDAF network element provides the PCF network element with network performance analytics of the network in subarea 1 between 11:00 p.m. of each day to 7:00 a.m. of the next day from Apr. 1, 2019 to Apr. 15, 2019 and network performance analytics of the network in subarea 1 in each holiday from Apr. 1, 2019 to Apr. 30, 2019.

Step 808. The PCF network element determines one or more BDT policies for each subarea based on network performance information 1 in each of subarea 1, . . . , and subarea N in time period 1.

In a possible implementation, in this embodiment of this application, network performance information 1 in each subarea in time period 1 may be obtained by the NWDAF network element through analytics. In another possible implementation, the PCF network element determines target network performance information from network performance information 1 in the N subareas, and the PCF network element determines the target network performance information as network performance information 1 in the N subareas. The target network performance information may be worst network performance information in network performance information 1 in the N subareas.

In an example, step 808 in this embodiment of this application may be implemented in the following manner: The PCF network element determines the one or more BDT policies for subarea 1 based on network performance information 1 in subarea 1 in time period 1. For a manner in which the PCF network element determines one or more BDT policies for another subarea in subarea 1, . . . , and subarea N, refer to the manner in which the PCF network element determines the one or more BDT policies for subarea 1. Details are not described herein again.

It may be understood that quantities of one or more BDT policies for different subareas in subarea 1, . . . , and subarea N may be the same or may be different. This is not limited in this embodiment of this application.

For example, content of the one or more BDT policies for each subarea may be listed in Table 4.

TABLE 4

| BDT policy | |
|---|---|
| Information | Description |
| Subarea list (List of Area Subset) (1 . . . N) | Subarea 1 to subarea N |
| >Subarea (Area subset) (1 . . . N) | |
| >background data transfer identifier | Identifies a BDT policy for a subarea |
| >List of background data transfer policies (List of BDT policy) | One or more background data transfer policies for each of subarea 1 to subarea N |
| >>Recommended time window | For recommending that the AF network element transmit background data in the recommended time window |
| >>Charging rate | Charging rate for transmitting background data in the recommended time window |
| >>(Optional) Maximum aggregated bitrate | (Optional) Maximum aggregated bitrate |

It may be understood that, in step 808, the PCF network element determines one or more BDT policies for a first subarea based on network performance information 1 in the first subarea in different time periods. The PCF network element allocates one BDT reference ID to each of the one or more BDT policies for the first subarea. The first subarea in this embodiment of this application is any one of one or more subareas, and does not have any indicative meaning.

It should be noted that one or more BDT policies for different subareas are different, and a plurality of BDT policies for a same subarea may also be different. For example, a plurality of BDT policies for subarea 1 are BDT policy 1 and BDT policy 2. A recommended time window included in BDT policy 1 is time window 1, and a recommended time window included in BDT policy 2 is time window 2. Alternatively, recommended time window 1, maximum aggregated bitrate X, and charging rate N are included in BDT policy 1, and recommended time window 1, maximum aggregated bitrate Y, and charging rate M are included in BDT policy 2, where X is greater than Y, and N is greater than M.

Step 809. The PCF network element sends second information to the AF network element. Correspondingly, the AF network element receives the second information from the PCF network element.

The second information may include <subarea 1, one or more BDT policies, BDT Reference ID of each of one or more BDT policies>, <subarea 2, one or more BDT policies, BDT Reference ID of each of one or more BDT policies>, . . . , and <subarea N, one or more BDT policies, BDT Reference ID of each of one or more BDT policies>.

For example, the second information may be carried in a background data transfer policy negotiation create response (BDTPNegotiation_Create Response) service, and the BDTPNegotiation_Create response service may be sent by the PCF network element to the AF network element via the NEF network element. For example, the PCF network element sends a background data transfer policy control create response (Npcf_BDTPolicyControl_Create response) service to the NEF network element. The Npcf_BDTPolicyControl_Create response service carries a BDTPNegotiation_Create response service. Then, the NEF network element sends an Nnef_BDTPNegotiation_Create response service to the AF network element.

In addition, one or more BDT policies for different subareas, a BDT reference ID of each BDT policy, and information about the subareas may be carried in a same message. Certainly, one or more BDT policies for different subareas, a BDT reference ID of each BDT policy, and information about the subareas may be carried in different messages.

Step 810. The AF network element determines target BDT policy 1 for each subarea based on the one or more BDT policies for each of subarea 1, . . . , and subarea N.

Target BDT policy 1 for the subarea is a policy used when a terminal that accesses the subarea transmits background data.

Step 811. The AF network element sends target BDT policy 1 for each subarea to the PCF network element. Correspondingly, the PCF network element receives target BDT policy 1 for each subarea from the AF network element.

If the PCF network element provides one BDT policy that is for each subarea for the AF network element, step 811 may be omitted. Correspondingly, the AF network element determines the BDT policy that is for each subarea as target BDT policy 1 for each subarea.

If the PCF network element provides a plurality of BDT policies for each subarea for the AF network element, that is, each subarea corresponds to a plurality of BDT policies, the AF network element may select one BDT policy from the plurality of BDT policies for the first subarea as target BDT policy 1 in the first subarea.

In a specific implementation, in this embodiment of this application, the AF network element may determine, when triggered by the PCF network element, to send target BDT policy 1 for each subarea to the PCF network element. For example, the PCF network element sends a background data transfer policy negotiation update request (Nnef_BDTPNegotiation_update Request) service to the AF network element. The background data transfer policy negotiation update request is used to indicate the AF network element to feed back target BDT policy 1 for each subarea to the PCF network element.

In a possible implementation, that the PCF network element sends the background data transfer policy negotiation update request service to the AF network element may be implemented in the following manner: The PCF network element triggers a background data transfer policy control update request (Npcf_BDTPolicyControl_update request) service to the NEF network element, where the Npcf_BDTPolicyControl_update request service carries the Nnef_BDTPNegotiation_update request service. Then, the NEF network element triggers the Nnef_BDTPNegotiation_update request service to the AF network element through an interface between the NEF network element and the AF network element. Optionally, the Nnef_BDTPNegotiation_update request service may carry indication information y, and indication information y is used to indicate the AF network element to feed back target BDT policy 1 for each subarea to the PCF network element.

It should be noted that if the PCF network element further sends indication information y to the AF network element when sending the first information to the AF network element, the process in which the PCF network element sends the Npcf_BDTPolicyControl_update request service to the NEF network element and the process in which the NEF network element sends the Nnef_BDTPNegotiation_update request service to the AF network element may be omitted.

In another specific implementation, in this embodiment of this application, the AF network element may negotiate with the PCF network element in advance. If the PCF network element feeds back a plurality of BDT policies for each subarea, the AF network element needs to feed back target BDT policy 1 selected by the AF network element.

In a specific implementation, step 811 in this embodiment of this application may be implemented in the following manner: The AF network element sends a background data transfer policy negotiation update response (BDTPNegotiation_update response) service to the PCF network element. The background data transfer policy negotiation update response service carries target BDT policy 1 for each subarea. Specifically, the AF network element triggers an Nnef_BDTPNegotiation_update response service to the NEF network element through an interface between the AF network element and the NEF network element. Then, the NEF network element triggers a background data transfer policy update response (Npcf_BDTPolicyControl_update response) service to the PCF network element through an interface between the NEF network element and the PCF network element. The Npcf_BDTPolicyControl_update response service carries the BDTPNegotiation_update response service.

It should be noted that a format of target BDT policy 1 for each subarea sent by the AF network element to the PCF network element in step 811 is listed in Table 5, and each BDT reference ID corresponds to one set of selected target BDT policies 1.

TABLE 5

| Information | Description |
|---|---|
| List of background data transfer identifiers (List of BDT Reference IDs) | Specifies target BDT policy 1 for each subarea |
| >background data transfer identifier | Uniquely identifies target BDT policy 1 for the subarea during current negotiation |
| >Recommended time window | Recommended time window included in target BDT policy 1 |
| >Charging rate | Charging rate for transmitting background data in the recommended time window |
| >(Optional) Maximum aggregated bitrate | (Optional) Maximum aggregated bitrate when the target BDR policy 1 is used to transmit background data |

It may be understood that the AF network element may send one or more background data transfer identifiers to the PCF network element, so that the PCF network element determines a target background data transfer policy for each subarea based on the one or more background data transfer identifiers. In addition, the AF network element not only sends the one or more background data transfer identifiers to the PCF network element, but also sends content of the target background data transfer policy for each subarea to the PCF network element.

It may be understood that the target background data transfer policy is a policy that is negotiated by the PCF network element and the AF network element and that is used by a terminal in each area to transmit background data.

It may be understood that after the PCF network element and the AF network element negotiate about the target background data transfer policy, the AF network element may send a target background data transfer policy for the first subarea to a terminal in the first subarea, so that the terminal in the first subarea transmits background data according to the target background data transfer policy for the first subarea. Alternatively, the AF network element obtains a corresponding BDT policy from the UDR network element via the PCF network element based on an identifier of the target background data transfer policy or information about a third area, and then the PCF network element sends the BDT policy to a terminal according to a user equipment route selection policy (URSP). Alternatively, the PCF obtains a corresponding BDT policy from the UDR network element based on an identifier of the target background data transfer policy or information about a third area, and then the PCF network element sends the BDT policy to a terminal according to a URSP.

Step 812. The PCF network element sends, to the UDR network element, one or more target background data transfer policies 1 and information about a subarea corresponding to each of the one or more target background data transfer policies or a background data transfer identifier of each target background data transfer policy 1. Correspondingly, the UDR network element receives, from the PCF network element, the one or more target background data transfer policies 1 and the information about the subarea corresponding to each of the one or more target background data transfer policies 1 or the background data transfer identifier corresponding to each target background data transfer policy 1.

Step 813. The UDR network element stores the one or more target background data transfer policies 1 and the information about the subarea corresponding to each target background data transfer policy 1 or the background data transfer identifier corresponding to each target background data transfer policy.

It may be understood that the UDR network element stores the one or more target background data transfer policies 1, the information about the subarea associated with each target background data transfer policy 1, and the background data transfer identifier associated with each target background data transfer policy 1.

Specifically, as listed in Table 6, the UDR network element may store the one or more target background data transfer policies based on a storage format in Table 6.

TABLE 6

| Information | Description |
|---|---|
| Subarea list (List of Area Subset) (1 . . . N) | List of subareas |
| >Subarea (Area subset) (1 . . . N) | Requests a subarea identifier in an area |
| >background data transfer identifier | Uniquely identifies target BDT policy 1 for a subarea in a process of negotiation between the PCF network element and the AF network element |
| >Recommended time window | Recommended time window in target BDT policy 1 |
| >Charging rate (Charging rate) | Charging rate for transmitting background data in the recommended time window |
| >(Optional) Maximum aggregated bitrate | (Optional) Maximum aggregated bitrate when a target BDR policy is used to transmit background data |

In a possible implementation, in this embodiment of this application, after storing the one or more target background data transfer policies and the information about the subarea corresponding to each of the one or more target background data transfer policies or the background data transfer identifier corresponding to each target background data transfer policy, the UDR may further send a response message to the PCF network element, to indicate that the one or more target background data transfer policies and the information about the area corresponding to each of the one or more target background data transfer policies or the background data transfer identifier corresponding to each target background data transfer policy have been successfully stored.

Network performance information in a subarea does not always remain unchanged, but changes with a quantity of terminals accessing the subarea. Therefore, when network performance information in a subarea changes from network performance information 1 to network performance information 2, to enable a background data transfer policy for the subarea to adapt to network performance information in the subarea, the PCF network element may update one or more background data transfer policies for the subarea. Based on this, in a possible embodiment, after step 813, the method provided in this embodiment of this application may further include the following steps.

Step 814. The NWDAF network element sends network performance information 2 in the first subarea in the one or more subareas to the PCF network element. Correspondingly, the PCF network element receives network performance information 2 in the first subarea from the NWDAF network element.

In a specific implementation, in this embodiment of this application, the NWDAF network element may actively send network performance information 2 in the first subarea to the PCF network element when finding that network performance information in the first subarea in the one or more subareas changes. In another specific implementation, in this embodiment of this application, the NWDAF network element may send network performance information 2 in the first subarea to the PCF network element at a request of the PCF network element. In still another specific implementation, in this embodiment of this application, the PCF network element may send a subscription request to the NWDAF network element. The subscription request is used to subscribe to changed network performance information 2 in each of the one or more subareas. In this way, once the NWDAF network element determines that network performance information in the first subarea changes, network performance information 2 in the first subarea may be fed back to the PCF network element in a timely manner.

In a possible implementation, step 814 in this embodiment of this application may be implemented in the following manner: The NWDAF network element sends an analytics subscription notify (Nnwdaf_AnalyticsSubscription_Notify) service to the PCF network element, where the analytics subscription notify service includes information about the first subarea and network performance information 2 in the first subarea.

It may be understood that the first subarea may represent one or more subareas.

Network performance information 2 in the first subarea degrades relative to the network performance information 1 of the first subarea.

Step 815. The PCF network element obtains target BDT policy 1 for the first subarea from the UDR network element based on the information about the first subarea. As described in step 803, a function of obtaining, by the PCF network element, the historical target BDT policies from the UDR network element is to use the historical target BDT policies as an input for generating a new BDT policy, for example, determine whether these BDT policies are invalid.

For example, the PCF network element sends the Nudr_DM_Query request service to the UDR network element, where the Nudr_DM_Query request service includes the information about the first subarea or a background data transfer identifier of target BDT policy 1 for the first subarea. The UDR network element serves the Nudr_DM_Query response service, where the Nudr_DM_Query response service includes target BDT policy 1 for the first subarea.

Optionally, the PCF network element has a mapping relationship between the first subarea and the background data transfer identifier of target BDT policy 1 for the first subarea, and the PCF may obtain the background data transfer identifier of target BDT policy 1 for the first subarea based on the information about the first subarea, and further, may obtain target BDT policy 1 for the first subarea from the UDR network element based on the background data transfer identifier of target BDT policy 1 for the first subarea.

Step 816. The PCF network element determines one or more updated BDT policies for the first subarea based on network performance information 2 in the first subarea.

In this embodiment of this application, when sending network performance information 2 in the first subarea to the PCF network element, the NWDAF network element may indicate, to the PCF network element, that the network performance information in the first subarea degrades. Alternatively, the PCF network element determines, based on network performance information 2 in the first subarea and network performance information 1 in the first subarea, that the network performance information in the first subarea degrades. Alternatively, the PCF network element determines, based on network performance information 2 in the first subarea, that target BDT policy 1 for the first subarea needs to be updated, and therefore performs step 816.

In a possible implementation, if the PCF network element determines, based on network performance information 2 in the first subarea, that target BDT policy 1 for the first subarea is unavailable, but cannot determine the one or more updated BDT policies for the first subarea based on network performance information 2 in the first subarea, the PCF network element cannot delete target BDT policy 1 for the first subarea that is stored in the UDR network element. In other words, the PCF network element needs to reserve target BDT policy 1 for the first subarea that is stored in the UDR network element. In this way, when the PCF network element cannot determine the one or more updated BDT policies for the first subarea, target BDT policy 1 for the first subarea is still available.

Step 817. The PCF network element sends the one or more updated BDT policies for the first subarea and time information to the AF network element. The AF network element receives the one or more updated BDT policies for the first subarea and the time information from the PCF network element. Alternatively, when the PCF network element sends the one or more updated BDT policies for the first subarea to the AF network element, the PCF network element sets time information. Correspondingly, the AF network element receives the one or more updated BDT policies for the first subarea from the PCF network element. The time information (for example, a timer or a time window) is used to indicate a maximum response time period of the AF network element for the one or more updated BDT policies for the first subarea.

Step 818. The PCF network element receives, in the maximum response time period, target BDT policy 2 selected by the AF network element from the one or more updated BDT policies for the first subarea, the PCF network element sends target BDT policy 2 and the information about the first subarea or a background data transfer identifier of target BDT policy 2 to the UDR network element.

It may be understood that, by performing step 818, the PCF network element may update (or replace) target BDT policy 1 to (or with) target BDT policy 2 based on the information about the first subarea or the background data transfer identifier of target BDT policy 1.

Step 819. If the PCF network element does not receive, in the maximum response time period, target BDT policy 2 selected by the AF network element from the one or more updated BDT policies for the first subarea, the PCF network element sends a first deletion message to the UDR network element, where the first deletion message is used to indicate the UDR network element to delete target background data transfer policy 1 for the first subarea.

It should be noted that, in a BDT policy update phase, regardless of whether there are one or more updated BDT policies for the first subarea, the PCF network element sends the one or more updated BDT policies to the AF network element, and sends the time information, or the PCF network element locally sets a timer. In this way, if the PCF network element receives, in the maximum response time period, target background data transfer policy 2 fed back by the AF network element, it indicates that the AF agrees to use target background data transfer policy 2 to transmit background data. In this case, the PCF network element updates a target BDT policy for the first subarea served by the UDR network element. This avoids a system exception caused by rashly transmitting target BDT policy 1 for the first subarea without consent of the AF network element.

In a possible implementation, step 819 in this embodiment of this application may be replaced with the following manner: The PCF network element determines to delete target BDT policy 1 for the first subarea, and the PCF network element sends a first deletion message to the UDR network element.

For example, that the PCF network element determines to delete target BDT policy 1 for the first subarea includes: After the PCF network element sends the one or more updated BDT policies for the first subarea to the AF network element, if the PCF network element determines that the AF network element has not selected target BDT policy 2 from the one or more updated BDT policies for the first subarea, the first network element determines to delete target BDT policy 1 for the first subarea.

For example, that the PCF network element determines that the AF network element has not selected target BDT policy 2 from the one or more updated BDT policies for the first subarea includes: If the PCF network element determines that feedback indicating that the AF network element selects target BDT policy 2 from the one or more updated BDT policies for the first subarea is not received, the PCF network element determines that the AF network element has not selected target BDT policy 2 from the one or more updated BDT policies for the first subarea. Alternatively, the PCF network element receives indication information a (corresponding to the foregoing first indication information) from the AF network element, and the PCF network element determines, based on indication information a, that the AF network element has not selected target BDT policy 2 from the one or more updated BDT policies for the first subarea, where indication information a is used to indicate that the AF network element has not selected target BDT policy 2 from one or more updated BDT policies for the first subarea.

In a possible implementation, if network performance information 2 in the first subarea in the one or more subareas in step 814 is network performance information obtained by updating network performance information 1 in the first subarea in the one or more subareas in time period 2, time period 2 may not be a sub-period of the desired time window, or may not be in the range of the desired time window. In this case, a recommended transmission time period in the one or more BDT policies, determined by the PCF network element based on network performance information 2 in the first subarea in step 816, for the first subarea may not be a sub-period of the desired time window may not be in the range of the desired time window. Further, the AF network element may not select target BDT policy 2 from the one or more updated BDT policies for the first subarea. Therefore, the AF network element sends indication information a or cannot send target BDT policy 2 to the PCF network element in the maximum response time period.

Step 820. If the PCF network element finds that some terminals in a first subarea have transmitted background data according to target background data transfer policy 1, the PCF network element sends target background data transfer policy 2 to the some terminals in the first subarea according to a URSP.

In the embodiment shown in FIG. 8A to FIG. 8C, the desired time window corresponds to the first time period in the foregoing embodiments, time period 1 corresponds to the second time period in the foregoing embodiments, the first subarea corresponds to the second area in which the network performance information changes in the foregoing embodiments, network performance information 2 corresponds to the second network performance information in the foregoing embodiments, network performance information 1 corresponds to the first network performance information in the foregoing embodiments, target BDT policy 1 corresponds to the first target background data transfer policy in the foregoing embodiments, target BDT policy 2 corresponds to the second target background data transfer policy in the foregoing embodiments, the one or more updated BDT policies for the first subarea correspond to the second policy for the third area in the foregoing embodiments, and one or more BDT policies for any subarea correspond to the first policy for the third area in the foregoing embodiments.

Figure 9A:
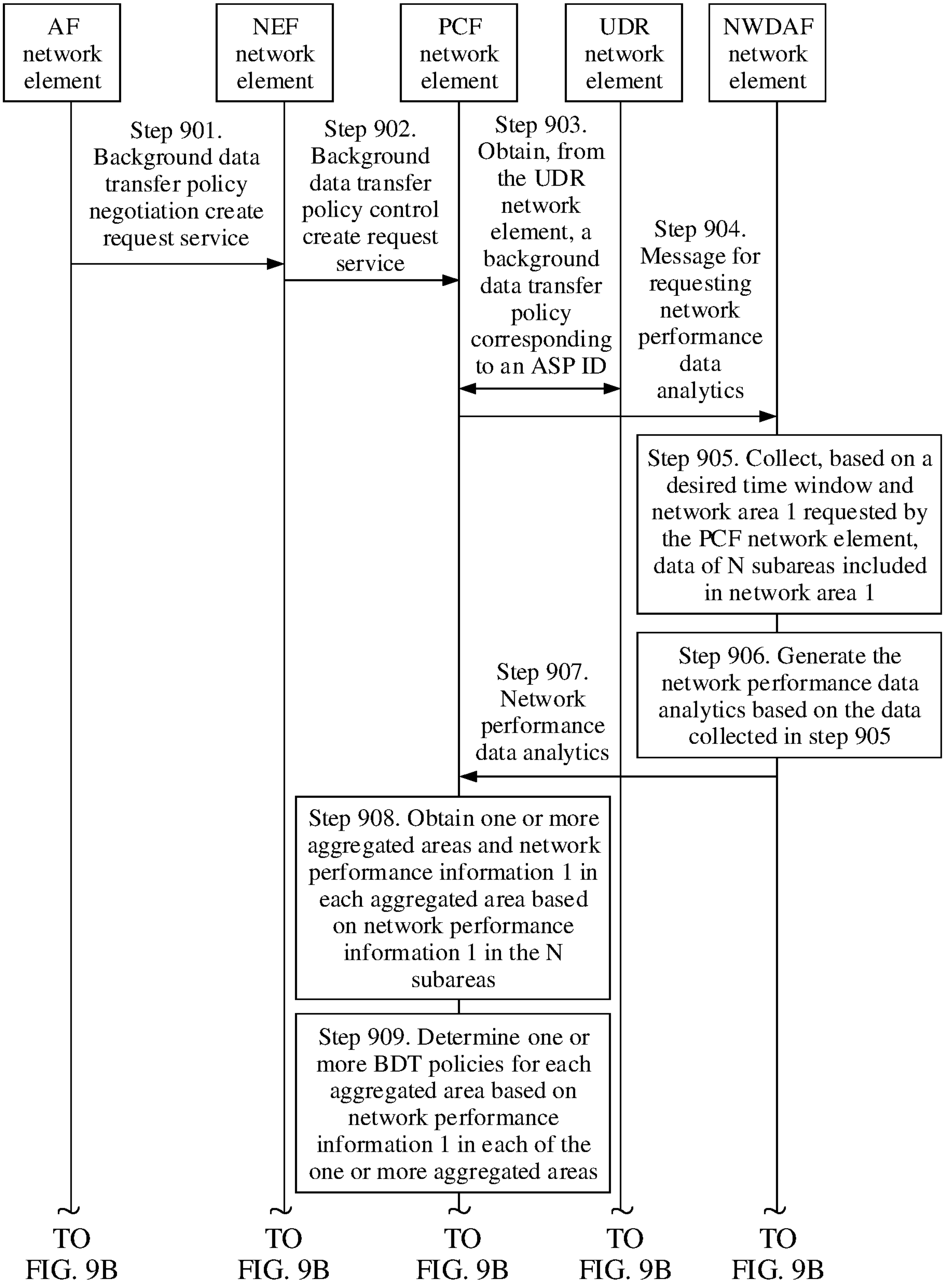
FIG. 9A to FIG. 9C are a schematic diagram of another specific embodiment of determining a background data transfer policy according to an embodiment of this application.
Figure 9B:
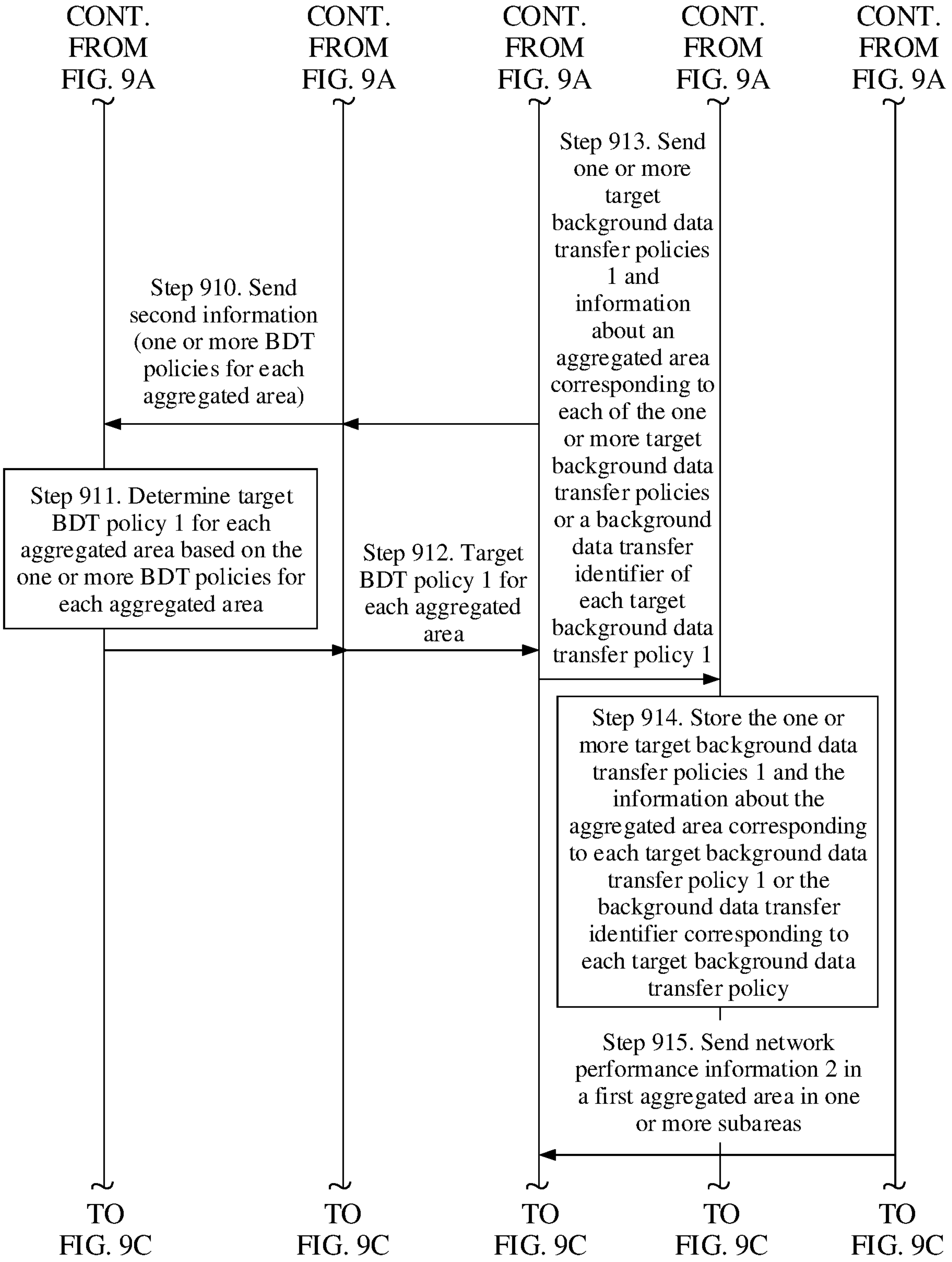
Figure 9C:
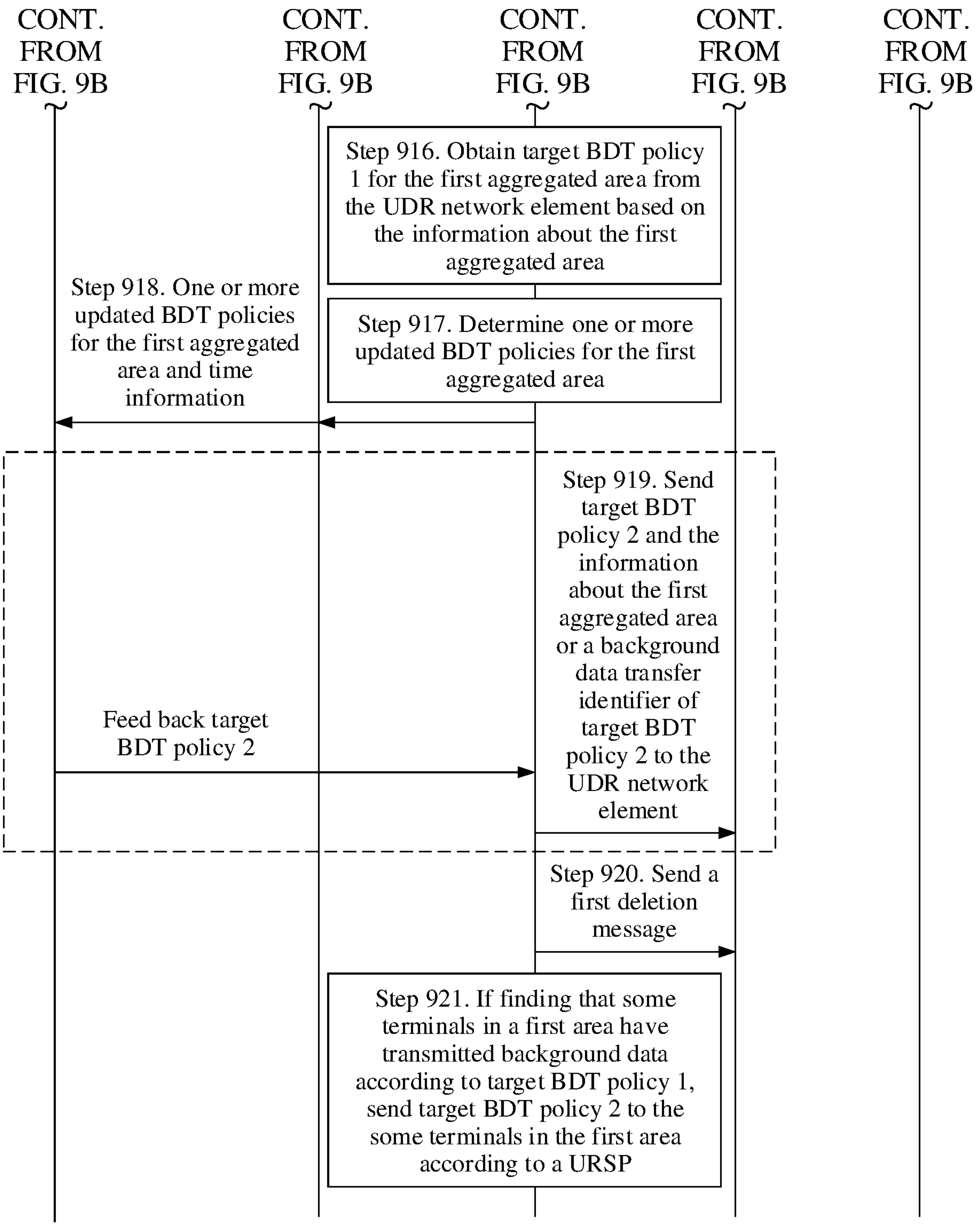

FIG. 9A to FIG. 9C show another background data transfer policy determining method according to this application. A difference between the method and the embodiment shown in FIG. 8A to FIG. 8C lies in that: In FIG. 8A to FIG. 8C, the PCF network element determines one or more BDT policies for different each subarea. In FIG. 9A to FIG. 9C, a PCF network element may aggregate N subareas based on network performance in the N subareas, to obtain one or more aggregated areas, and then, the PCF network element determines one or more BDT policies for each of the one or more aggregated areas. The method includes the following steps.

Step 901 to step 907 are the same as step 801 to step 807. Details are not described herein again.

Step 908. The PCF network element obtains one or more aggregated areas and network performance information 1 in each aggregated area based on network performance information 1 in the N subareas.

In a possible implementation, step 908 in this embodiment of this application may be implemented in the following manner: The PCF network element aggregates subareas that have same network performance information 1 in the N subareas, to obtain one or more aggregated areas. Network performance information 1 in any aggregated area is the same as network performance information 1 in a subarea corresponding to the aggregated area.

For example, the N subareas are TA1 to TA10. If TA1, TA2, TA8, TA9, and TA10 have same network performance information 1, the PCF network element aggregates TA1, TA2, TA8, TA9, and TA10 to obtain aggregated area 1. If TA3, TA4, TA5, TA6, and TA7 have same network performance information 1, the PCF network element aggregates TA3, TA4, TA5, TA6, and TA7 to obtain aggregated area 1.

It should be noted that if the NWDAF network element performs area aggregation, the NWDAF network element sends network performance information 1 in the one or more aggregated areas to the PCF network element in step 907.

Step 909. The PCF network element determines one or more BDT policies for each aggregated area based on network performance information 1 in each of the one or more aggregated areas. For example, the PCF network element determines one or more BDT policies for aggregated area 1 based on network performance information 1 in aggregated area 1.

Step 910 to step 921 are the same as step 809 to step 820. A difference lies in that the subarea in the embodiment involved in step 809 to step 820 is replaced with the aggregated area.

In the embodiment shown in FIG. 9A to FIG. 9C, the desired time window corresponds to the first time period in the foregoing embodiments, time period 1 corresponds to the second time period in the foregoing embodiments, the first subarea corresponds to the second area in which the network performance information changes in the foregoing embodiments, network performance information 2 corresponds to the second network performance information in the foregoing embodiments, network performance information 1 corresponds to the first network performance information in the foregoing embodiments, target BDT policy 1 corresponds to the first target background data transfer policy in the foregoing embodiments, target BDT policy 2 corresponds to the second target background data transfer policy in the foregoing embodiments, one or more updated BDT policies for a first aggregated area correspond to the second policy for the third area in the foregoing embodiments, and one or more BDT policies for any aggregated area correspond to the first policy for the third area in the foregoing embodiments. In other words, the aggregated area in the embodiment shown in FIG. 9A to FIG. 9C corresponds to the third area.

Figure 10A:
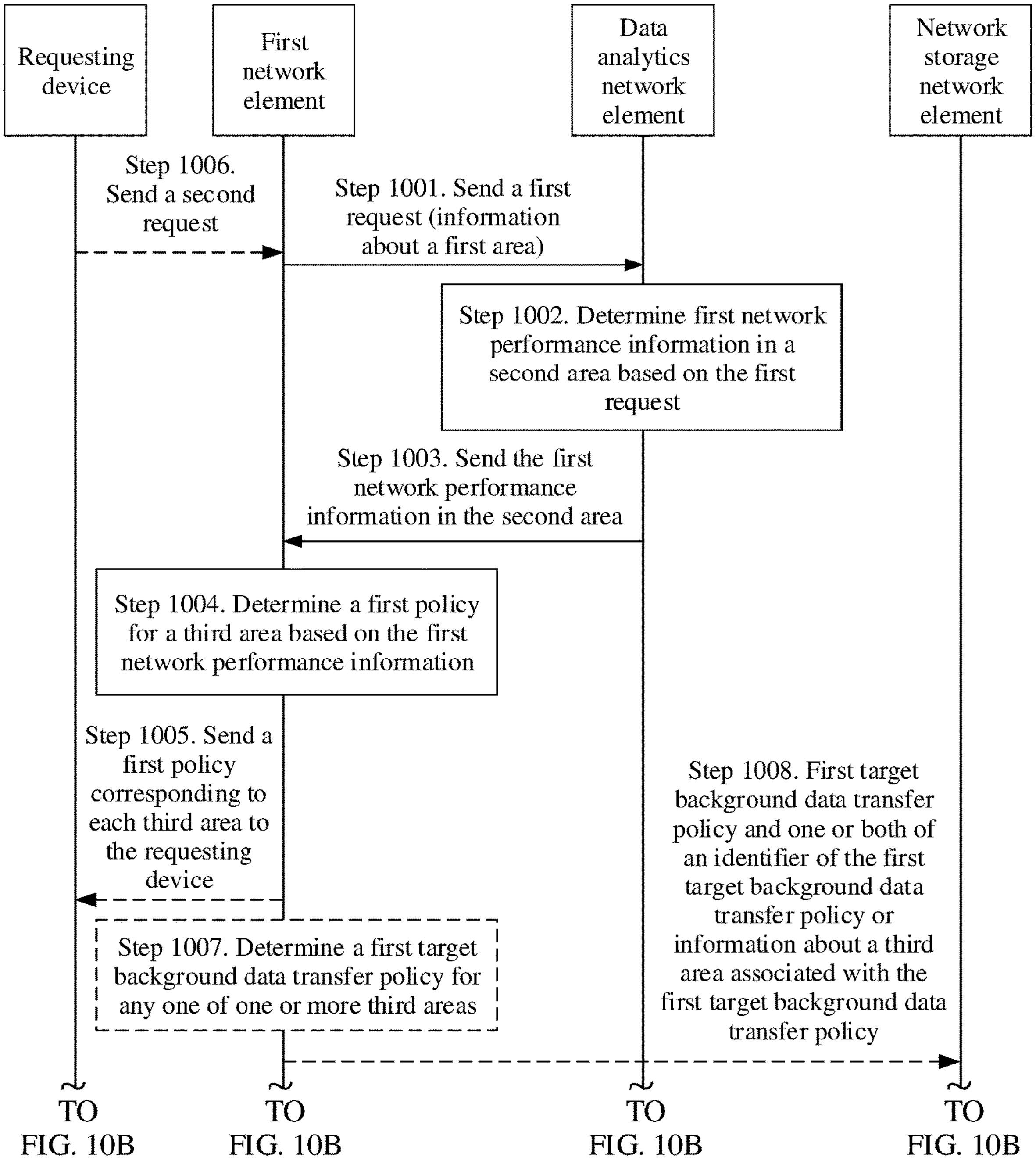
FIG. 10A and FIG. 10B are a schematic flowchart of still another policy determining method according to an embodiment of this application.
Figure 10B:
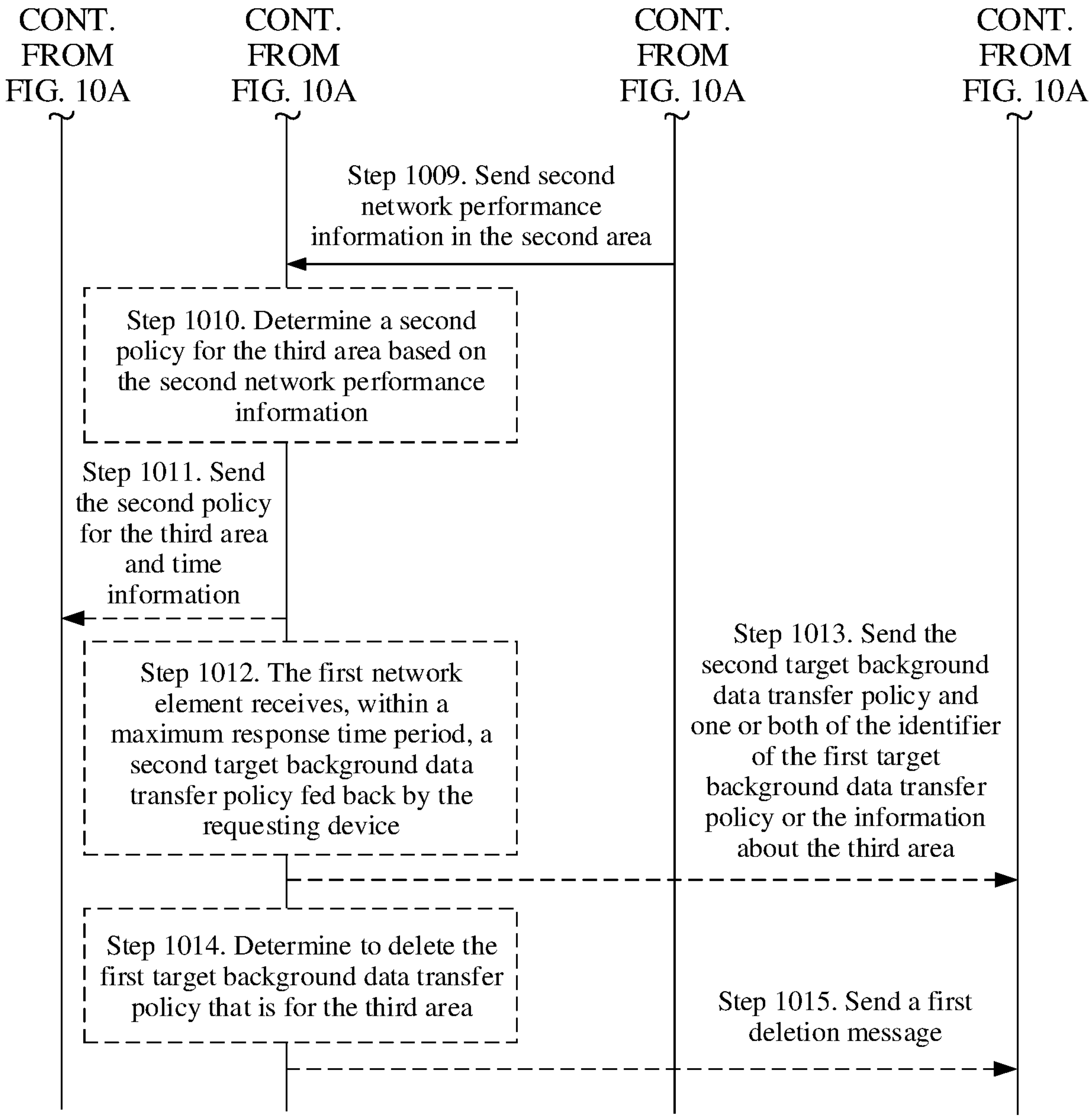

FIG. 10A and FIG. 10B show another policy determining method according to an embodiment of this application. The method includes the following steps.

Step 1001. A first network element sends, to a data analytics network element, a first request for requesting network performance information. Correspondingly, the data analytics network element receives, from the first network element, the first request for requesting the network performance information.

The first request includes information about a first area.

For details of step 1001, refer to related descriptions in step 501. A difference lies in that the first request in step 1001 does not carry information about a first time period.

It should be noted that, if a plurality of subareas may be aggregated into the first area, and the first area is divided into a plurality of subareas by the first network element, the information about the first area in the first request may be replaced with information about one or more second areas. In other words, the first network element requests, from the data analytics network element, network performance information in each of one or more subareas included in the first area.

Step 1002. The data analytics network element determines first network performance information in a second area based on the first request. The first area includes one or more second areas.

For example, when the first area includes one second area, the second area is the first area. When the first area includes a plurality of second areas, the data analytics network element determines first network performance information in each of the plurality of second areas.

The first network performance information in the second area includes one or both of first information in the second area and a quantity of terminals in the second area. The second area is a subarea of the first area, and there are one or more second areas.

Step 1003. The data analytics network element sends the first network performance information in the second area to the first network element. Correspondingly, the first network element receives the first network performance information in the second area from the data analytics network element. The first network performance information includes one or both of the first information and the quantity of terminals. The second area is a subarea of the first area, and there are one or more second areas.

Step 1004. The first network element determines a first policy for a third area based on the first network performance information, where the third area includes one or more second areas, there are a plurality of third areas, and the third area is a subarea of the first area.

Step 1005. The first network element sends a first policy corresponding to each of the plurality of third areas to a requesting device.

For descriptions of the first policy corresponding to the third area, refer to the descriptions in the embodiment shown in FIG. 5. Details are not described herein again.

In a possible implementation, the embodiment shown in FIG. 10A and FIG. 10B may further include step 1006 that is the same as step 701 and step 1007 to step 1015 that are the same as step 707 to step 715. Details are not described herein again.

In a possible implementation, if the first request carries the information about the first time period, or the first network element further sends the information about the first time period to the data analytics network element after sending the first request to the data analytics network element, the first network performance information includes one or both of first information in the second area in a second time period and a quantity of terminals in the second area in the second time period.

For example, the second time period may be the first time period, or the second time period may be a sub-period of the first time period. When the second time period is a sub-period of the first time period, there may be a plurality of second time periods.

In a possible implementation, it is assumed that the updated second network performance information in the second area in step 1109 is network performance information in the second area that is obtained by updating the first network performance information in the third time period, where the third time period may not be a sub-period of the first time period, or may not be in the range of the first time period. In this case, a recommended transmission time window in the one or more background data transfer policies in the second policy, for the third area, determined by the first network element in step 1110 may not be a sub-period of the first time period or may not be in the range of the first time period. Further, the requesting device may not select the second target background data transfer policy from the second policy for the third area. Therefore, the requesting device sends the first indication information or does not send the second target background data transfer policy to the first network element in the maximum response time period.

In a possible implementation, even if the first network element does not send the information about the first time period to the data analytics network element, the data analytics network element may autonomously determine information about a time period corresponding to the first network performance information in each of the plurality of second areas. Therefore, the data analytics network element may further send, to the first network element, the information about the time period corresponding to the first network performance information in each second area. In this case, data of each second area may include time period X (for example, Jan. 1, 2019 to Dec. 31, 2019) that is relatively long. If the data analytics network element obtains first network performance information in any second area based on data of any second area in entire time period X, processing load of the data analytics network element increases. Therefore, the data analytics network element may autonomously select, from time period X, sub-period Y that is close to a current time point, and obtain first network performance information in any second area based on data of the second area in sub-period Y.

For example, the first network element requests network performance information in a TA list (including TA1 and TA2) from the data analytics network element. It is assumed that the data analytics network element determines first network performance information in TA1 based on data of TA1 in T1, and determines first network performance information in TA2 based on data of TA2 in T2. Subsequently, the data analytics network element may send, to the first network element, the first network performance information in TA1 corresponding to T1, and send, to the first network element, the first network performance information in TA2 corresponding to T2. In this way, the first network element can determine that the first network performance information in TA1 is network performance information in TA1 in T1, and determines that the first network performance information in TA2 is network performance information in TA2 in T2.

It should be noted that the embodiment shown in FIG. 10A and FIG. 10B in embodiments of this application may further correspond to a specific embodiment. The specific embodiment includes step 1 to step 20. For step 1 to step 20, refer to step 801 to step 820 in the embodiment shown in FIG. 8A to FIG. 8C in a one-to-one manner. A difference lies in: If a message sent to the NWDAF network element in step 4 by the PCF network element for requesting network performance data analytics does not carry a desired time window, the NWDAF network element obtains data of each subarea from an OAM network element, an NRF network element, and an AMF network element in step 5. In this case, the data of each subarea includes at least data of each subarea in the desired time window. Therefore, the network performance data analytics generated by the NWDAF network element in step 6 includes network performance information 1 of a network in each of subarea 1 to subarea N. Then, the PCF network element obtains one or more BDT policies for each subarea based on network performance information 1 of the network in each subarea.

It should be understood that, if the message sent to the NWDAF network element for requesting the network performance data analytics carries the desired time window, the data of each subarea obtained by the NWDAF network element from the OAM network element, the NRF network element, and the AMF network element in step 5 is data of each subarea in the desired time window or data of each subarea in a sub-period included in the desired time window. In addition, the network performance data analytics generated by the NWDAF network element in step 6 includes network performance information 1 of the network in each of subarea 1 to subarea N in the sub-period in the desired time window.

The foregoing mainly describes the solutions in embodiments of this application from a perspective of interaction between network elements. It may be understood that, to implement the foregoing functions, the network elements such as the first network element and the data analytics network element include corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into functional units may be performed on the first network element and the data analytics network element based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in embodiments of this application, division into the units is an example, and is merely a logical function division. In actual implementation, another division manner may be used.

The foregoing describes the methods in embodiments of this application with reference to FIG. 5 to FIG. 10B. The following describes communication apparatuses that are provided in embodiments of this application and that perform the foregoing methods. A person skilled in the art may understand that the methods and the apparatuses may be mutually combined and referenced. The communication apparatuses provided in embodiments of this application may perform the steps performed by the first network element and the data analytics network element in the foregoing policy determining methods.

Figure 11:
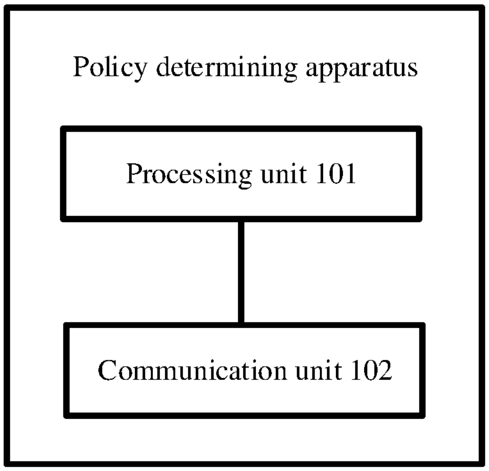
FIG. 11 is a schematic diagram of a structure of a policy determining apparatus according to an embodiment of this application.

When an integrated unit is used, FIG. 11 shows a policy determining apparatus in the foregoing embodiments. The policy determining apparatus may include a communication unit 102 and a processing unit lot 101.

In an example, the policy determining apparatus is a first network element or a chip used in the first network element. In this case, the communication unit 102 is configured to support the policy determining apparatus in performing a sending action performed by the first network element in step 501 in FIG. 5 in the foregoing embodiment. The communication unit 102 is configured to support the policy determining apparatus in performing a receiving action performed by the first network element in step 503 in FIG. 5. The processing unit is configured to support the communication apparatus in performing step 504 in the foregoing embodiment.

In a possible embodiment, the communication unit 102 is further configured to support the policy determining apparatus in performing sending actions performed by the first network element in step 702, step 706, step 711, step 713, step 715, and step 708 in the foregoing embodiment. The communication unit 102 is further configured to support the policy determining apparatus in performing receiving actions performed by the first network element in step 701, step 704, and step 709 in the foregoing embodiment.

The processing unit 101 is further configured to support the policy determining apparatus in performing step 707, step 710, step 712, and step 714 in the foregoing embodiment.

In another example, the policy determining apparatus is a data analytics network element or a chip used in the data analytics network element. In this case, the communication unit 102 is configured to support the policy determining apparatus in performing a receiving action performed by the data analytics network element in step 501 in the foregoing embodiment. The processing unit 101 is configured to support the policy determining apparatus in performing step 502 in the foregoing embodiment. The communication unit 102 is further configured to support the policy determining apparatus in performing a sending action performed by the data analytics network element in step 503 in the foregoing embodiment.

In a possible implementation, the communication unit 102 is further configured to support the policy determining apparatus in performing a sending action performed by the data analytics network element in step 709 in the foregoing embodiment.

In an example, the policy determining apparatus is a first network element or a chip used in the first network element. In this case, the communication unit 102 is configured to support the policy determining apparatus in performing sending actions performed by the first network element in step 1001 and step 1005 in FIG. 10A and FIG. 10B in the foregoing embodiment. The communication unit 102 is configured to support the policy determining apparatus in performing a receiving action performed by the first network element in step 1003 in FIG. 10A and FIG. 10B. The processing unit is further configured to support the communication apparatus in performing step 1004 in the foregoing embodiment.

In a possible embodiment, the communication unit 102 is further configured to support the policy determining apparatus in performing sending actions performed by the first network element in step 1002, step 1006, step 1011, step 1013, step 1015, and step 1008 in the foregoing embodiment. The communication unit 102 is further configured to support the policy determining apparatus in performing receiving actions performed by the first network element in step 1006, step 1004, and step 1009 in the foregoing embodiment.

The processing unit 101 is further configured to support the policy determining apparatus in performing step 1007, step 1010, step 1012, and step 1014 in the foregoing embodiment.

In another example, the policy determining apparatus is a data analytics network element or a chip used in the data analytics network element. In this case, the communication unit 102 is configured to support the policy determining apparatus in performing a receiving action performed by the data analytics network element in step 1001 in the foregoing embodiment. The processing unit 101 is configured to support the policy determining apparatus in performing step 1002 in the foregoing embodiment. The communication unit 102 is further configured to support the policy determining apparatus in performing a sending action performed by the data analytics network element in step 1003 in the foregoing embodiment.

In a possible implementation, the communication unit 102 is further configured to support the policy determining apparatus in performing a sending action performed by the data analytics network element in step 1009 in the foregoing embodiment.

Figure 12:
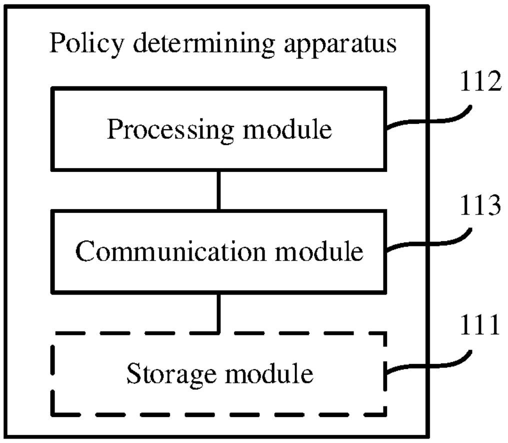
FIG. 12 is a schematic diagram of a structure of another policy determining apparatus according to an embodiment of this application.

When an integrated unit is used, FIG. 12 is a possible schematic diagram of a logical structure of a policy determining apparatus in the foregoing embodiments. The policy determining apparatus includes a processing module 112 and a communication module 113. The processing module 112 is configured to control and manage an action of the policy determining apparatus. For example, the processing module 112 is configured to perform a step of information/data processing on the policy determining apparatus. The communication module 113 is configured to support the policy determining apparatus in sending or receiving information/data.

In a possible embodiment, the policy determining apparatus may further include a storage module 111, configured to store program code and data of the policy determining apparatus.

In an example, the policy determining apparatus is a first network element or a chip used in the first network element. In this case, the communication module 113 is configured to support the policy determining apparatus in performing a sending action performed by the first network element in step 501 in FIG. 5 in the foregoing embodiment. The communication module 113 is configured to support the policy determining apparatus in performing a receiving action performed by the first network element in step 503 in FIG. 5. The processing module is further configured to support the communication apparatus in performing step 504 in the foregoing embodiment.

In a possible embodiment, the communication module 113 is further configured to support the policy determining apparatus in performing sending actions performed by the first network element in step 702, step 706, step 711, step 713, step 715, and step 708 in the foregoing embodiment. The communication module 113 is further configured to support the policy determining apparatus in performing receiving actions performed by the first network element in step 701, step 704, and step 709 in the foregoing embodiment.

The processing module 112 is further configured to support the policy determining apparatus in performing step 707, step 710, step 712, and step 714 in the foregoing embodiment.

In another example, the policy determining apparatus is a data analytics network element or a chip used in the data analytics network element. In this case, the communication module 113 is configured to support the policy determining apparatus in performing a receiving action performed by the data analytics network element in step 501 in the foregoing embodiment. The processing module 112 is configured to support the policy determining apparatus in performing step 502 in the foregoing embodiment. The communication module 113 is further configured to support the policy determining apparatus in performing a sending action performed by the data analytics network element in step 503 in the foregoing embodiment.

In a possible implementation, the communication module 113 is further configured to support the policy determining apparatus in performing a sending action performed by the data analytics network element in step 709 in the foregoing embodiment.

The processing module 112 may be a processor or a controller, for example, may be a central processing unit, a general-purpose processor, a digital signal processor, an application-specific integrated circuit, a field-programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The communication module 113 may be a transceiver, a transceiver circuit, a communication interface, or the like. The storage module 111 may be a memory.

Figure 13:
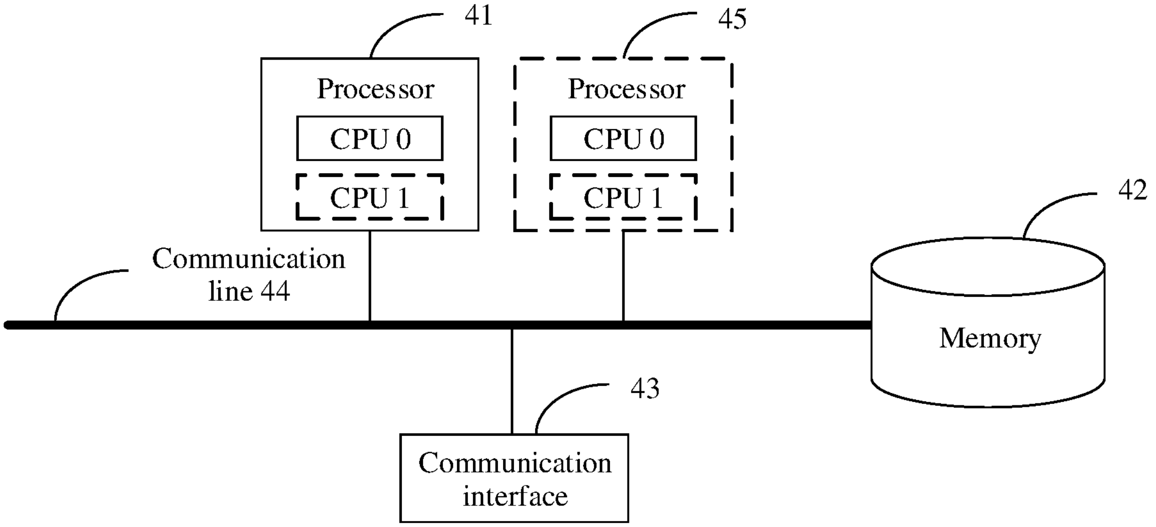
FIG. 13 is a schematic diagram of a structure of a communication device according to an embodiment of this application.

When the processing module 112 is a processor 41 or a processor 45, the communication module 113 is a communication interface 43, and the storage module 111 is a memory 42, the policy determining apparatus in this application may be a communication device shown in FIG. 13.

FIG. 13 is a schematic diagram of a hardware structure of the communication device according to an embodiment of this application. The communication device includes the processor 41, the communication line 44, and at least one communication interface (descriptions are provided merely by using an example in which the communication device includes the communication interface 43 in FIG. 13).

Optionally, the communication device may further include the memory 42.

The processor 41 may be a general-purpose central processing unit (CPU), a microprocessor, an application-specific integrated circuit (ASIC), or one or more integrated circuits configured to control program execution of the solutions of this application.

The communication line 44 may include a path for transferring information between the foregoing components.

The communication interface 43 is any apparatus such as a transceiver, and is configured to communicate with another device or a communication network such as the Ethernet, a radio access network (RAN), or a wireless local area network (WLAN).

The memory 42 may be a read-only memory (ROM) or another type of static storage device that can store static information and instructions, or a random access memory (RAM) or another type of dynamic storage device that can store information and instructions. The memory 42 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in a form of instructions or a data structure and that is accessible by a computer, but is not limited thereto. The memory may exist independently, and is connected to the processor through the communication line 44. The memory may alternatively be integrated with the processor.

The memory 42 is configured to store computer-executable instructions for executing the solutions of this application, and the processor 41 controls the execution. The processor 41 is configured to execute the computer-executable instructions stored in the memory 42, to implement the policy determining method provided in the foregoing embodiments of this application.

Optionally, the computer-executable instructions in this embodiment of this application may also be referred to as application program code. This is not specifically limited in this embodiment of this application.

During specific implementation, in an embodiment, the processor 41 may include one or more CPUs, for example, a CPU 0 and a CPU 1 in FIG. 12.

During specific implementation, in an embodiment, the communication device may include a plurality of processors, for example, the processor 41 and the processor 45 in FIG. 12. Each of the processors may be a single-core (single-CPU) processor, or may be a multi-core (multi-CPU) processor. The processor herein may be one or more devices, circuits, and/or processing cores configured to process data (for example, computer program instructions).

In an example, the communication device is a first network element or a chip used in the first network element. In this case, the communication interface 43 is configured to support the communication device in performing a sending action performed by the first network element in step 501 in FIG. 5 in the foregoing embodiment. The communication interface 43 is configured to support the communication device in performing a receiving action performed by the first network element in step 503 in FIG. 5. The processor is further configured to support the communication device in performing step 504 in the foregoing embodiment.

In a possible embodiment, the communication interface 43 is further configured to support the communication device in performing sending actions performed by the first network element in step 702, step 706, step 711, step 713, step 715, and step 708 in the foregoing embodiment. The communication interface 43 is further configured to support the communication device in performing receiving actions performed by the first network element in step 701, step 704, and step 709 in the foregoing embodiment.

The processor 41 and the processor 45 are further configured to support the communication device in performing step 707, step 710, step 712, and step 714 in the foregoing embodiment.

In another example, the communication device is a data analytics network element or a chip used in the data analytics network element. In this case, the communication interface 43 is configured to support the communication device in performing a receiving action performed by the data analytics network element in step 501 in the foregoing embodiment. The processor 41 and the processor 45 are configured to support the communication device in performing step 502 in the foregoing embodiment. The communication interface 43 is further configured to support the communication device in performing a sending action performed by the data analytics network element in step 503 in the foregoing embodiment.

In a possible implementation, the communication interface 43 is further configured to support the communication device in performing a sending action performed by the data analytics network element in step 709 in the foregoing embodiment.

In an example, the communication device is a first network element or a chip used in the first network element. In this case, the communication interface 43 is configured to support the communication device in performing sending actions performed by the first network element in step 1001 and step 1005 in FIG. 10A and FIG. 10B in the foregoing embodiment. The communication interface 43 is configured to support the communication device in performing a receiving action performed by the first network element in step 1003 in FIG. 10A and FIG. 10B. The processing unit is further configured to support the communication apparatus in performing step 1004 in the foregoing embodiment.

In a possible embodiment, the communication interface 43 is further configured to support the communication device in performing sending actions performed by the first network element in step 1002, step 1006, step 1011, step 1013, step 1015, and step 1008 in the foregoing embodiment. The communication interface 43 is further configured to support the communication device in performing a receiving action performed by the first network element in step 1006, step 1004, and step 1009 in the foregoing embodiment.

The processor 41 and the processor 45 are further configured to support the communication device in performing step 1007, step 1010, step 1012, and step 1014 in the foregoing embodiment.

In another example, the communication device is a data analytics network element or a chip used in the data analytics network element. In this case, the processor 41 and the processor 45 are configured to support the communication device in performing step 1002 in the foregoing embodiment. The communication interface 43 is further configured to support the communication device in performing a sending action performed by the data analytics network element in step 1003 in the foregoing embodiment.

In a possible implementation, the communication interface 43 is further configured to support the communication device in performing a sending action performed by the data analytics network element in step 1009 in the foregoing embodiment.

Figure 14:
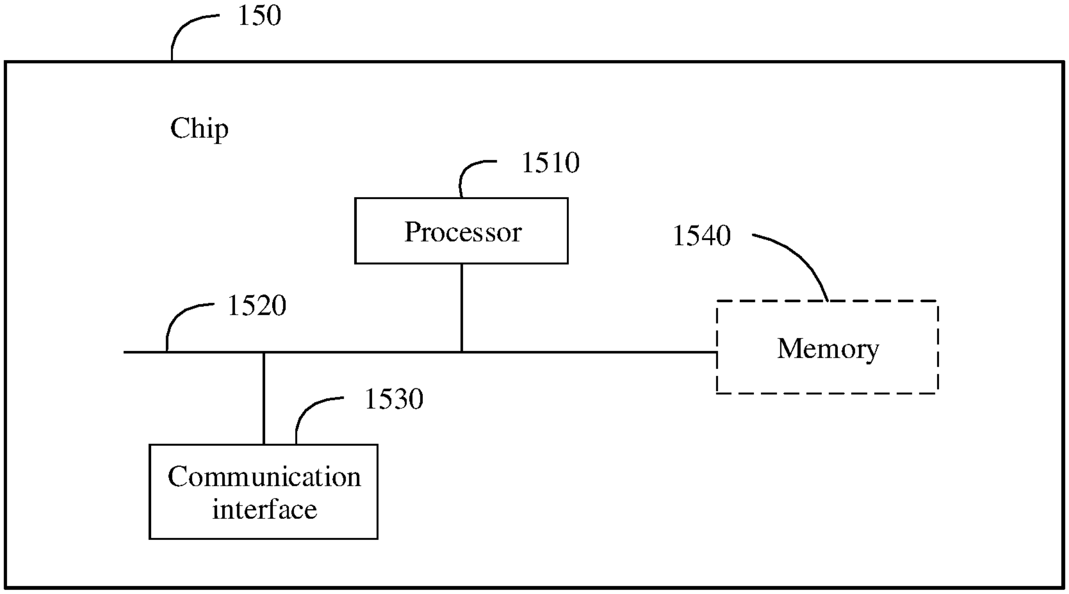
FIG. 14 is a schematic diagram of a structure of a chip according to an embodiment of this application.

FIG. 14 is a schematic diagram of a structure of a chip 150 according to an embodiment of this application. The chip 150 includes one or more (including two) processors 1510 and a communication interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an executable module or a data structure, a subset thereof, or an extended set thereof.

In this embodiment of this application, the operation instructions stored in the memory 1540 (where the operation instructions may be stored in an operating system) are invoked to perform a corresponding operation.

In a possible implementation, structures of chips used by a first network element and a data analytics network element are similar, and different apparatuses may use different chips to implement respective functions.

The processor 1510 controls a processing operation of either the first network element or the data analytics network element, and the processor 1510 may also be referred to as a central processing unit (CPU).

The memory 1540 may include a read-only memory and a random access memory, and provide instructions and data for the processor 1510. The part of the memory 1540 may further include the NVRAM. For example, in an application, the memory 1540, the communication interface 1530, and the memory 1540 are coupled together by using a bus system 1520. The bus system 1520 may further include a power bus, a control bus, a status signal bus, and the like in addition to a data bus. However, for clear description, various types of buses in FIG. 14 are denoted as the bus system 1520.

The methods disclosed in the foregoing embodiments of this application may be applied to the processor 1510, or may be implemented by the processor 1510. The processor 1510 may be an integrated circuit chip, and has a signal processing capability. In an implementation process, the steps in the foregoing method may be implemented by using a hardware integrated logical circuit in the processor 1510, or by using instructions in a form of software. The processor 1510 may be a general-purpose processor, a digital signal processor (DSP), an ASIC, a field-programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communication interface 1530 is configured to perform receiving and sending steps performed by the first network element and the data analytics network element in the embodiments shown in FIG. 5 to FIG. 9C. The processor 1510 is configured to perform processing steps performed by the first network element and the data analytics network element in the embodiments shown in FIG. 5 to FIG. 9C.

The communication unit may be a communication interface of the apparatus, and is configured to receive a signal from another apparatus. For example, when the apparatus is implemented as a chip, the transceiver unit is a communication interface used by the chip to receive a signal from or send a signal to another chip or apparatus.

According to an aspect, a computer-readable storage medium is provided. The computer-readable storage medium stores instructions. When the instructions are run, functions of the first network element in FIG. 5 to FIG. 7B are implemented.

According to an aspect, a computer-readable storage medium is provided. The computer-readable storage medium stores instructions. When the instructions are run, functions of the data analytics network element in FIG. 5 to FIG. 7B are implemented.

According to an aspect, a computer program product including instructions is provided. The computer program product includes the instructions. When the instructions are run, functions of the first network element in FIG. 5 to FIG. 7B are implemented.

According to another aspect, a computer program product including instructions is provided. The computer program product includes the instructions. When the instructions are run, functions of the data analytics network element in FIG. 5 to FIG. 7B are implemented.

According to an aspect, a chip is provided. The chip is used in a first network element. The chip includes at least one processor and a communication interface. The communication interface is coupled to the at least one processor. The processor is configured to run instructions, to implement functions of the first network element in FIG. 5 to FIG. 7B.

According to another aspect, a chip is provided. The chip is used in a data analytics network element. The chip includes at least one processor and a communication interface. The communication interface is coupled to the at least one processor. The processor is configured to run instructions, to implement functions of the data analytics network element in FIG. 5 to FIG. 7B.

An embodiment of this application provides a communication system. The communication system includes a first network element and a data analytics network element. The first network element is configured to perform any function of the first network element in FIG. 5 to FIG. 7B, and the data analytics network element is configured to perform any step performed by the data analytics network element in FIG. 5 to FIG. 7B.

Optionally, the communication system may further include an AF network element. The AF network element is configured to perform a function performed by the requesting device in FIG. 7A and FIG. 7B.

All or some of the foregoing embodiments may be implemented by using software, hardware, firmware, or any combination thereof. When software is used to implement embodiments, all or some of embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or may be a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

Although this application is described with reference to embodiments, in a process of implementing this application that claims protection, persons skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A policy determining method, comprising:

sending a first request to a data analytics network device, wherein the first request is for requesting network performance information, the first request comprises information about a first area and information about a first time period, the first area comprises a plurality of second areas, and the first time period comprises a plurality of second time periods;

receiving first network performance information for at least one second area of the plurality of second areas from the data analytics network device, wherein the plurality of second areas have the same first network performance information, the first network performance information comprises one or both of first information for the at least one second area in a second time period of the plurality of second time periods and a quantity of terminals in the at least one second area in the second time period, the second time period is a sub-period of the first time period, and the at least one second area is a subarea of the first area;

determining a first policy for the first area comprising one or more background data transfer policies based on the first network performance information;

receiving second network performance information from the data analytics network device, wherein the second network performance information is degraded network performance information compared with the first network performance information;

generating a second policy for the first area based on the second network performance information, wherein the second policy comprises one or more background data transfer policies;

sending the second policy to a requesting device; and setting time information, wherein the time information represents a maximum response time period during which a device sending the second policy waits for the requesting device to respond to the second policy.

2. The method according to claim 1, wherein the first information comprises an average value of one or more of the following information of a network in the at least one second area in the second time period:

a session creation success rate, a terminal handover success rate, a terminal registration success rate, resource usage of a base station or a core network device, a usage ratio of the base station or the core network device, and load of the base station or the core network device.

3. The method according to claim 1, wherein the first policy is a first policy for the first area, there are one or more first areas, and the first policy for the first area comprises one or more background data transfer policies.

4. The method according to claim 3, wherein the method further comprises:

determining a first target background data transfer policy for the first area, wherein the first target background data transfer policy is one of the one or more background data transfer policies; and sending the first target background data transfer policy and one or both of an identifier of the first target background data transfer policy and the information about the first area to a network storage network device.

5. The method according to claim 4, wherein the determining a first target background data transfer policy for the first area comprises:

the first policy for the first area comprises one background data transfer policy, determining the background data transfer policy as the first target background data transfer policy; or the first policy for the first area comprises a plurality of background data transfer policies, receiving the first target background data transfer policy from the requesting device.

6. The method according to claim 1, wherein the method further comprises:

receiving in the maximum response time period, a second target background data transfer policy fed back by the requesting device, wherein the second target background data transfer policy is one of the one or more background data transfer policies comprised in the second policy; and sending the second target background data transfer policy and one or both of an identifier of the second target background data transfer policy and the information about the first area to a network storage network device.

7. The method according to claim 1, wherein the method further comprises:

determining to delete a first target background data transfer policy that is for the first area; and sending a first deletion message to a network storage network device, wherein the first deletion message is used to notify the network storage network device to delete the first target background data transfer policy that is for the first area.

8. The method according to claim 7, wherein the determining to delete a first target background data transfer policy that is for the first area comprises:

in response to determining that a first network device does not receive, from the requesting device in the maximum response time period, a second target background data transfer policy selected by the requesting device from the one or more background data transfer policies comprised in the second policy, determining to delete the first target background data transfer policy that is for the first area.

9. An apparatus comprising:

a processor;

a non-transitory memory coupled to the processor and storing a program to be executed in the processor and a communication interface; and the apparatus is configured to send a first request to a data analytics network device, wherein the first request is for requesting network performance information, the first request comprises information about a first area and information about a first time period, the first area comprises a plurality of second areas, and the first time period comprises a plurality of second time periods, receive first network performance information for at least one second area of the plurality of second areas from the data analytics network device, wherein the plurality of second areas have the same first network performance information, the first network performance information comprises one or both of first information for the at least one second area in a second time period of the plurality of second time periods and a quantity of terminals in the at least one second area in the second time period, the second time period is a sub-period of the first time period, and the at least one second area is a subarea of the first area, receive second network performance information from the data analytics network device, wherein the second network performance information is degraded network performance information compared with the first network performance information, determine a first policy for the first area comprising one or more background data transfer policies based on the first network performance information, generate a second policy for the first area based on the second network performance information, wherein the second policy comprises one or more background data transfer policies, send the second policy to a requesting device, and set time information, wherein the time information indicates a maximum response time period during which the apparatus waits for the requesting device to respond to the second policy.

10. The apparatus according to claim 9, wherein the first information comprises an average value of one or more of the following information of a network in the at least one second area in the second time period:

a session creation success rate, a terminal handover success rate, a terminal registration success rate, resource usage of a base station or a core network device, a usage ratio of the base station or the core network device, and load of the base station or the core network device.

11. The apparatus according to claim 9, wherein the first policy is a first policy for the first area, there are one or more first areas, and the first policy for the first area comprises one or more background data transfer policies.

12. The apparatus according to claim 11, wherein the apparatus is further configured to determine a first target background data transfer policy for the first area, wherein the first target background data transfer policy is one of the one or more background data transfer policies; and send the first target background data transfer policy and one or both of an identifier of the first target background data transfer policy and the information about the first area to a network storage network device.

13. The apparatus according to claim 12, wherein the determining a first target background data transfer policy for the first area comprises:

determining one single background data transfer policy comprised in the first policy for the first area as the first target background data transfer policy; or determining a background data transfer policy received from the requesting device as the first target background data transfer policy, wherein the first policy for the first area comprises a plurality of background data transfer policies.

14. The apparatus according to claim 9, wherein the apparatus is further configured to determine to delete a first target background data transfer policy that is for the first area; and send a first deletion message to a network storage network device, wherein the first deletion message is used to notify the network storage network device to delete the first target background data transfer policy that is for the first area.

15. The apparatus according to claim 14, wherein the determining to delete a first target background data transfer policy that is for the first area comprises:

in response to determining that a first network device does not receive, from the requesting device in the maximum response time period, a second target background data transfer policy selected by the requesting device from the one or more background data transfer policies comprised in the second policy, determining to delete the first target background data transfer policy that is for the first area.

16. The apparatus according to claim 9, wherein the apparatus is further configured to:

receive in the maximum response time period, a second target background data transfer policy fed back by the requesting device, wherein the second target background data transfer policy is one of the one or more background data transfer policies comprised in the second policy; and send the second target background data transfer policy and one or both of an identifier of the second target background data transfer policy and the information about the first area to a network storage network device.

17. A communication system comprising:

an apparatus; and a data analytics network device that communicates with the apparatus, wherein the apparatus is configured to:

send a first request to the data analytics network device, wherein the first request is for requesting network performance information, the first request comprises information about a first area and information about a first time period, the first area comprises a plurality of second areas, and the first time period comprises a plurality of second time periods, receive first network performance information for at least one second area of the plurality of second areas from the data analytics network device, wherein the plurality of second areas have the same first network performance information, the first network performance information comprises one or both of first information for the at least one second area in a second time period of the plurality of second time periods and a quantity of terminals in the at least one second area in the second time period, the second time period is a sub-period of the first time period, and the at least one second area is a subarea of the first area, receive second network performance information from the data analytics network device, wherein the second network performance information is degraded network performance information compared with the first network performance information, determine first policy for the first area comprising one or more background data transfer policies based on the first network performance information, generate a second policy for the first area based on the second network performance information, wherein the second policy comprises one or more background data transfer policies, send the second policy to a requesting device, set time information wherein the time information indicates a maximum response time period during which the apparatus waits for the requesting device to respond to the second policy; and the data analytics network device is configured to:

provide first network performance information of a network in the at least one second area for the apparatus, the first network performance information of the network comprises first information and/or a quantity of terminals of the network in the second time period, and provide second network performance information for the apparatus, wherein the second network performance information is degraded network performance information compared with the first network performance information.

18. The communication system according to claim 17, wherein the apparatus is further configured to:

determine a first target background data transfer policy for the first area, wherein the first target background data transfer policy is one of the one or more background data transfer policies; and send the first target background data transfer policy and one or both of an identifier of the first target background data transfer policy and the information about the first area to a network storage network device.

19. The communication system according to claim 17, wherein the apparatus is further configured to:

receive in the maximum response time period, a second target background data transfer policy fed back by the requesting device, wherein the second target background data transfer policy is one of the one or more background data transfer policies comprised in the second policy; and send the second target background data transfer policy and one or both of an identifier of the second target background data transfer policy and the information about the first area to a network storage network device.

20. The communication system according to claim 17, wherein the apparatus is further configured to:

determine to delete a first target background data transfer policy that is for the first area; and send a first deletion message to a network storage network device, wherein the first deletion message is used to notify the network storage network device to delete the first target background data transfer policy that is for the first area.

* * * * *